United States Patent
Rozinsky et al.

(10) Patent No.: US 9,502,951 B2
(45) Date of Patent: Nov. 22, 2016

(54) ELECTRICAL MACHINE

(75) Inventors: Eliyahu Rozinsky, Petah Tikva (IL); Viktor Kislev, Jerusalem (IL); Ruslan Shabinski, Ma'ale Adumim (IL)

(73) Assignee: EVR MOTORS LTD., Ashkelon (IL)

( * ) Notice: Subject to any disclaimer, the term of this patent is extended or adjusted under 35 U.S.C. 154(b) by 904 days.

(21) Appl. No.: 13/147,650

(22) PCT Filed: Jan. 5, 2010

(86) PCT No.: PCT/IL2010/000007
§ 371 (c)(1),
(2), (4) Date: Sep. 27, 2011

(87) PCT Pub. No.: WO2010/089734
PCT Pub. Date: Aug. 12, 2010

(65) Prior Publication Data
US 2012/0007458 A1    Jan. 12, 2012

Related U.S. Application Data

(60) Provisional application No. 61/150,037, filed on Feb. 5, 2009, provisional application No. 61/235,371, filed on Aug. 20, 2009.

(51) Int. Cl.
*H02K 21/12* (2006.01)
*H02K 1/02* (2006.01)
(Continued)

(52) U.S. Cl.
CPC .............. *H02K 21/38* (2013.01); *B60L 15/20* (2013.01); *B60L 15/2036* (2013.01);
(Continued)

(58) Field of Classification Search
CPC ...... H02K 1/145; H02K 1/182; H02K 15/12; H02K 15/022; H02K 2201/12
USPC ....... 310/216.106, 268, 112, 156.43–156.49, 310/266
See application file for complete search history.

(56) References Cited

U.S. PATENT DOCUMENTS

| 3,330,975 A | 7/1967 | Osterwalder |
| 4,899,074 A | 2/1990 | West |

(Continued)

FOREIGN PATENT DOCUMENTS

| CN | 101262159 | 9/2008 |
| CN | 102388524 A | 3/2012 |

(Continued)

OTHER PUBLICATIONS

International Search Report and Written Opinion dated Nov. 23, 2010 in corresponding International Application No. PCT/IL2010/000007.

(Continued)

*Primary Examiner* — Dang Le
*Assistant Examiner* — Leda Pham
(74) *Attorney, Agent, or Firm* — Dorsey & Whitney LLP

(57) ABSTRACT

An electrical machine including a stator and a rotor rotatable relative to the stator with an air gap therebetween. The stator includes a first plurality of sources of magnetic field, which is equally spaced in a circumferential configuration over the stator. The rotor includes a second plurality of sources of magnetic field, which is equally spaced in a circumferential configuration over the rotor. The magnetic sources of at least one plurality are electromagnets and electromagnet includes at least one magnet coil resting on a magnet conductor. The magnetic conductor includes at least one member made of magnetically isotropic and/or anisotropic materials.

35 Claims, 59 Drawing Sheets

(51) Int. Cl.
  H02K 21/38    (2006.01)
  H02K 1/06     (2006.01)
  H02K 1/14     (2006.01)
  H02K 1/17     (2006.01)
  H02K 1/27     (2006.01)
  H02K 16/00    (2006.01)
  H02K 16/02    (2006.01)
  H02K 19/10    (2006.01)
  H02K 21/24    (2006.01)
  H02K 21/26    (2006.01)
  H02K 21/28    (2006.01)
  B60L 15/20    (2006.01)
  H02K 1/04     (2006.01)
  H02K 1/18     (2006.01)

(52) U.S. Cl.
  CPC ............ *B60L 15/2045* (2013.01); *H02K 1/02* (2013.01); *H02K 1/06* (2013.01); *H02K 1/14* (2013.01); *H02K 1/141* (2013.01); *H02K 1/17* (2013.01); *H02K 1/27* (2013.01); *H02K 16/00* (2013.01); *H02K 16/02* (2013.01); *H02K 19/10* (2013.01); *H02K 21/12* (2013.01); *H02K 21/24* (2013.01); *H02K 21/26* (2013.01); *H02K 21/28* (2013.01); *B60L 2220/52* (2013.01); *B60L 2240/423* (2013.01); *B60L 2260/26* (2013.01); *B60L 2270/145* (2013.01); *H02K 1/04* (2013.01); *H02K 1/18* (2013.01); *Y02T 10/641* (2013.01); *Y02T 10/645* (2013.01); *Y02T 10/72* (2013.01); *Y02T 10/7283* (2013.01)

(56) References Cited

U.S. PATENT DOCUMENTS

| | | | |
|---|---|---|---|
| 5,051,641 A | 9/1991 | Weh | |
| 5,258,697 A | 11/1993 | Ford et al. | |
| 5,289,072 A | 2/1994 | Lange | |
| 5,651,841 A | 7/1997 | Moro et al. | |
| 5,696,419 A * | 12/1997 | Rakestraw et al. | 310/268 |
| 5,808,392 A | 9/1998 | Sakai et al. | |
| 6,097,118 A | 8/2000 | Hull | |
| 6,188,159 B1 | 2/2001 | Fan | |
| 6,492,756 B1 | 12/2002 | Maslov et al. | |
| 6,552,460 B2 | 4/2003 | Bales | |
| 6,617,746 B1 | 9/2003 | Maslov et al. | |
| 6,841,916 B2 | 1/2005 | Chiarenza | |
| 7,081,696 B2 * | 7/2006 | Ritchey | 310/114 |
| 7,285,889 B2 * | 10/2007 | Shkondin | 310/148 |
| 7,432,623 B2 | 10/2008 | Ritz, Jr. et al. | |
| 7,595,574 B2 * | 9/2009 | Ritchey | H02K 7/108 310/100 |
| 7,723,888 B2 * | 5/2010 | Petek | H02K 16/04 310/112 |
| 7,800,275 B2 | 9/2010 | Calley | |
| 7,816,830 B2 | 10/2010 | Dickes | |
| 7,851,965 B2 | 12/2010 | Calley et al. | |
| 7,863,784 B2 | 1/2011 | Ritz, Jr. et al. | |
| 7,868,510 B2 | 1/2011 | Rittenhouse | |
| 8,040,011 B2 | 10/2011 | Mueller et al. | |
| 8,339,009 B2 | 12/2012 | Mueller et al. | |
| 2002/0125781 A1 | 9/2002 | Bales | |
| 2004/0207281 A1 * | 10/2004 | Detela | H02K 11/0005 310/162 |
| 2004/0251767 A1 | 12/2004 | Chiarenza | |
| 2005/0110365 A1 * | 5/2005 | Shkondin | B60K 7/0007 310/266 |
| 2005/0204545 A1 | 9/2005 | Gieras et al. | |
| 2005/0212381 A1 * | 9/2005 | Gilmour | H02K 1/145 310/266 |
| 2006/0006745 A1 | 1/2006 | Lopatinsky et al. | |
| 2006/0232154 A1 * | 10/2006 | Shkondin | 310/148 |
| 2008/0169720 A1 | 7/2008 | Petek | |
| 2008/0179982 A1 | 7/2008 | Kramer | |
| 2008/0246362 A1 | 10/2008 | Hirzel | |
| 2009/0140526 A1 | 6/2009 | Jansen et al. | |
| 2013/0113320 A1 | 5/2013 | Calley et al. | |
| 2013/0214633 A1 | 8/2013 | Dajaku | |

FOREIGN PATENT DOCUMENTS

| | | |
|---|---|---|
| EP | 1115127 A2 | 7/2001 |
| EP | 1283276 A1 | 2/2003 |
| EP | 2317633 A2 | 5/2011 |
| GB | 30167 | 0/1911 |
| GB | 1525959 A | 9/1978 |
| JP | 2007129154 A | 5/2007 |
| WO | WO/95/04399 | 2/1995 |
| WO | 9960692 A2 | 11/1999 |
| WO | 02/03527 A2 | 1/2002 |
| WO | 0237651 A2 | 5/2002 |
| WO | 03003385 A2 | 1/2003 |
| WO | 2013102444 A1 | 7/2013 |

OTHER PUBLICATIONS

Israeli Patent Office, "International Search Report in corresponding International Application No. PCT/IL2014/050837", Jan. 5, 2015, Israel.

* cited by examiner

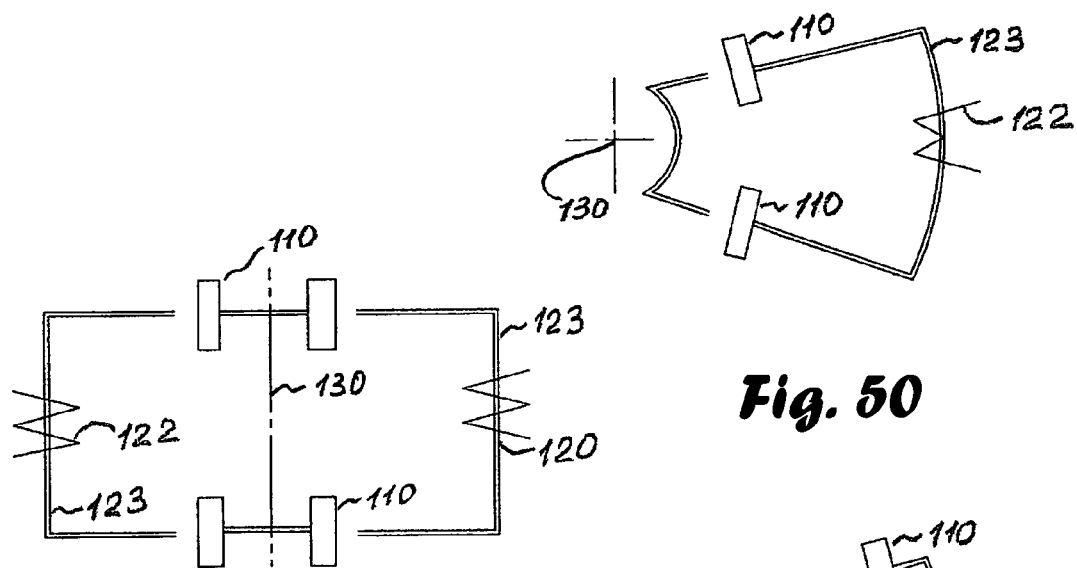
Fig. 50
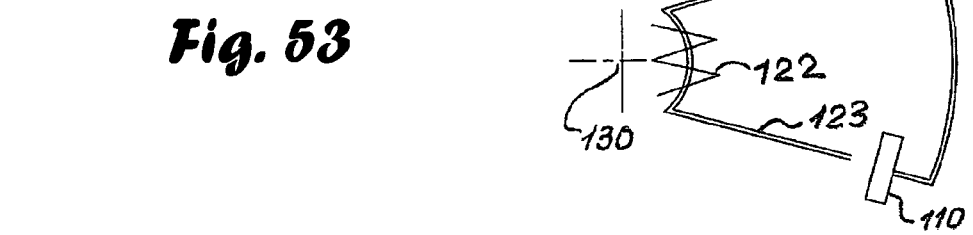
Fig. 51
Fig. 53
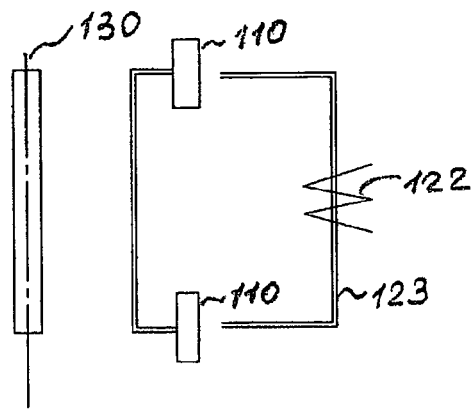
Fig. 54
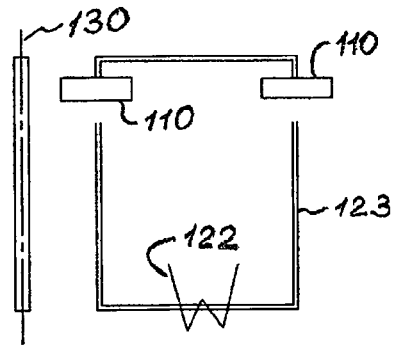
Fig. 52

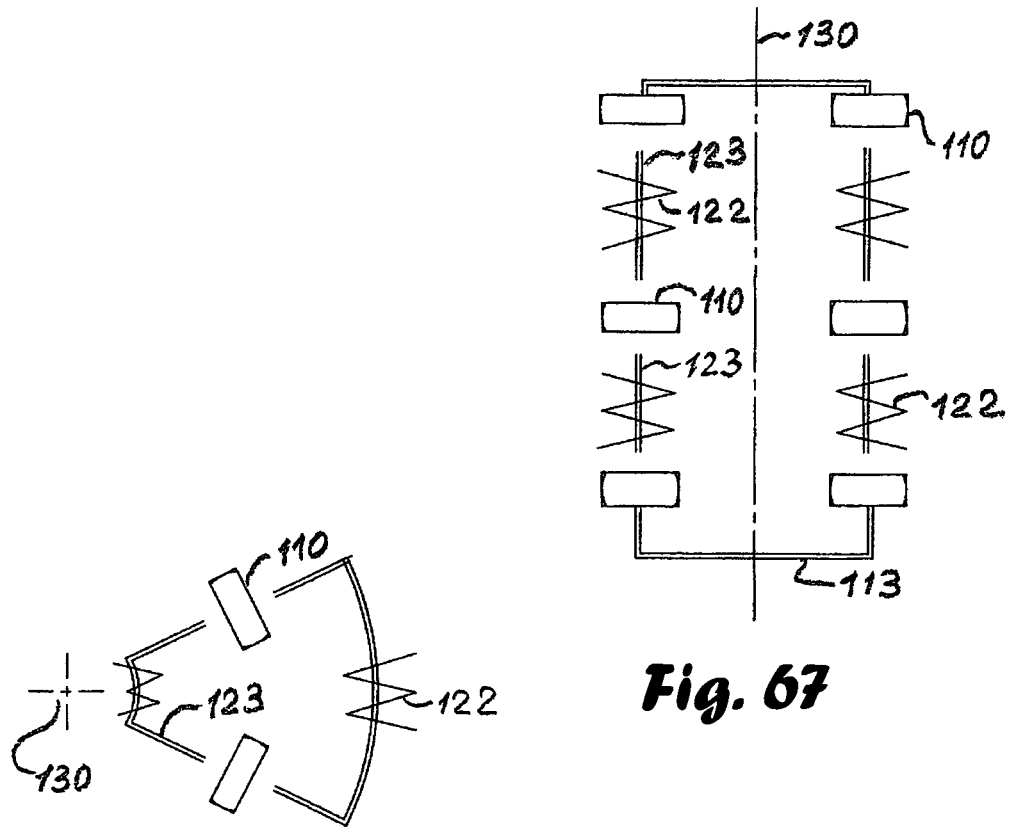
Fig. 67
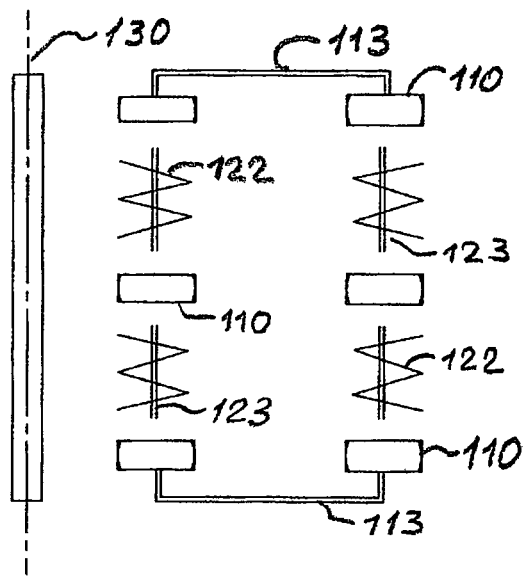
Fig. 69
Fig. 68

ELECTRICAL MACHINE

FIELD OF THE INVENTION

The present invention relates to electrical machines with electromagnetic excitation and/or with excitation by permanent magnets, and, more specifically, to electrical machines provided with magnetic conductors made of magnetically isotropic and anisotropic materials and their combination to reduce losses in the aforesaid circuits.

BACKGROUND OF THE INVENTION

Magnetic conductors of electric machines provide low magnetic reluctance when magnetic fluxes pass therethough. The magnetic fluxes are created by sources of magnetic field, specifically, an electromagnet coil and a permanent magnet. When the magnetic flux is conduct through the magnetic conductors, occurring losses define efficiency of an electrical machine.

A first group of losses is determined by and a configuration of magnetic conductor and a material from which the aforesaid magnetic conductor is made. These loses are heat generation when a slowly varying is conducted by the magnetic conductor. The losses are caused by eddy-currents (Foucault currents) and hysteresis losses (magnetic reversal). Herewith, a material of magnetic conductor should be characterized by high saturation magnetic induction.

To reduce eddy-current losses, the magnetic conductor is made of non-conductive material. For example, the magnetic conductor is stacked of steel stampings coated with non-conductive organosilicon polymers. The stampings are oriented in a certain manner relative to the magnetic flux which is conducted through the magnetic conductor. An alternative technical solution is a powdery ferromagnetic material comprising an isolating filling compound.

The hysteresis losses are reduced by use of materials characterized by a narrow hysteresis loop and high value of magnetic permeability. In the case of a magnetic conductor made of an anisotropic material, minimal losses appear along a direction of easy magnetization.

However, a classical arrangement of an electrical machine comprises a magnetic conductor made of rolled steel to which the magnets are connected. Referring to FIG. 8, a stator plate 180 of 4-pole electric machine cut from steel sheet laminated by organosilicon polymers. As seen in FIG. 8, only a portion of a magnetic flux $\Phi$ is parallel to a direction of easy magnetization.

Use of isotropic material is limited by technical problems with producing magnetic conductors of large dimension and complex configuration which link sources of magnetic field in the electric machine.

A second group of losses is attributed to the electrical machine with permanent magnets.

The permanent magnets are demagnetized under influence of magnetic fluxes of the electromagnets. The aforesaid demagnetization results in depression of magnetic flux and, correspondingly, decrease in rotational torque and power.

Additionally, in the electrical machines with permanent magnets, a cogging torque ripple makes starting of the electrical machine from rest difficult and slows it down at work. The permanent magnets are in an effort to be in position corresponding to minimal reluctance of a closed path of magnetic flux.

In accordance with the abovementioned discussion, reduction of losses of the first and second groups is a long-felt and unmet need which is relevant to both electric-power production by an electrical generator and electric energy consumption by an electrical motor. Specifically, as to the electrical machine with permanent magnets, a long-felt need is to prevent the aforesaid permanent magnets from demagnetization and reduce cogging torque ripple.

SUMMARY OF THE INVENTION

It is hence one object of the invention to disclose an electrical machine comprising a stator and a rotor rotatable relative to the stator with an air gap therebetween. The aforesaid stator is provided with a first plurality of sources of magnetic field which is equally spaced in a circumferential configuration over the stator. The rotor is provided with a second plurality of sources of magnetic field which is equally spaced in a circumferential configuration over the rotor; the magnetic sources of at least one plurality being electromagnets. Each electromagnet comprises at least one magnet coil resting on a magnet conductor.

It is a core purpose of the invention to provide the conductor comprises at least one member made of a material selected from the group consisting of a magnetically isotropic material, a magnetically anisotropic material and any combination thereof. The isotropic and anisotropic materials are characterized electric resistance more than about $10^6$ Ohm·m, coercitive force less than about $100$ A·m$^{-1}$, relative magnetic permeability more than about 3000 and saturation magnetic induction more than about 0.6 Tl at frequency lower than about 10000 Hz.

Another object of the invention is to disclose the conductor members made of the magnetically anisotropic material are configured so that a magnet flux created by the magnetic source is conducted along a direction of easy magnetization.

A further object of the invention is to disclose the magnetic sources of the first plurality which are electromagnets spaced over the stator. The magnetic sources of the second plurality are permanent magnets heteropolarly spaced over the rotor.

A further object of the invention is to disclose the magnetic sources of the first plurality permanent magnets which are heteropolarly spaced over the stator. The magnetic sources of the second plurality are electric magnets spaced over the rotor provided with coils connected with a commutator by means of brushes.

A further object of the invention is to disclose the magnetic sources of the first and second pluralities which are electric magnets. The electric magnets of the second plurality are provided with coils connected with a commutator by means of brushes.

A further object of the invention is to disclose at least one plurality of the magnetic field sources magnetically independent between each other.

A further object of the invention is to disclose an orientation of an axis of the coil of each electric magnet of the first plurality selected from the group consisting of: an orientation sufficiently parallel to a rotation axis of the rotor, an orientation, sufficiently radially directed relative to the rotor, a circumferential orientation in a plane sufficiently perpendicular the rotation axis of the rotor and any combination thereof.

A further object of the invention is to disclose the magnetic axes of at least a part of the magnetic sources of the first and second pluralities which are parallel each other.

A further object of the invention is to disclose the magnetic axes of at least a part of the magnetic sources of the first and second pluralities which are perpendicular each other.

A further object of the invention is to disclose the magnetic circuits of the magnetic sources of the second plurality which is disposed inside the magnetic sources of the first plurality.

A further object of the invention is to disclose the magnetic circuits of the magnetic sources of the first plurality which is disposed inside the magnetic sources of the second plurality.

A further object of the invention is to disclose the a shape of the magnetic circuits of the electric magnet selected from the group consisting of an I-like shape; a U-like shape; a T-like shape; a C-like shape, X-like shape and any combination thereof.

A further object of the invention is to disclose the permanent magnets provided with extension members magnetically connected thereto; the extension members are adapted for shunting a magnetic flux generated by the electromagnets. The extension members are adapted for preventing the flux from passing though the permanent magnets when the permanent magnets face to neighbouring electromagnets so that transverse size of the extension members is greater than a distance between neighbouring electric magnets.

A further object of the invention is to disclose the extension members comprising at least one member made of a material selected from the group consisting of the magnetically isotropic material, the magnetically anisotropic material and any combination thereof.

A further object of the invention is to disclose the extension members are made of the magnetically anisotropic material are configured so that a magnet flux created by the magnetic source is conducted along a direction of easy magnetization.

A further object of the invention is to disclose a shape of the magnetic circuits of the source of magnetic field comprising the permanent magnet selected from the group consisting of an I-like shape; a U-like shape; a T-like shape; a C-like shape, X-like shape and any combination thereof.

A further object of the invention is to disclose the magnetic source extension member of the second plurality adapted for conducting a magnetic flux which passes through at least one surface of a core of the magnetic sources of the first plurality selected from butt surface and side surface.

A further object of the invention is to disclose the magnetic source extension member of the first plurality adapted for conducting a magnetic flux which passes through at least one surface of a core of the magnetic sources of the second plurality selected from butt surface and side surface.

A further object of the invention is to disclose the electrical machine adapted for using as an electrical motor, wherein the air gap is peripherally located relative to the rotation axis the rotor.

A further object of the invention is to disclose the electrical machine adapted for using as an electrical motor of wheel drive of a vehicle. The second plurality of magnetic field sources of the rotor is mechanically connected to the wheel. The first plurality of magnetic field sources of the stator, is mechanically connected to a vehicle body.

A further object of the invention is to disclose the second plurality of magnetic field sources of the rotor fastened to a wheel axis. The first plurality of magnetic field sources of the stator is mechanically connected to a vehicle body.

A further object of the invention is to disclose the electrical machine adapted for using as an electrical generator. The air gap is proximately located relative to the rotation axis the rotor.

A further object of the invention is to disclose the first and second pluralities layered so that layers pertaining to the first and second pluralities are interlayered therebetween.

A further object of the invention is to disclose a number of magnetic sources which is constant for each layer.

A further object of the invention is to disclose the number of magnetic sources which is variable for each layer.

A further object of the invention is to disclose the number of magnetic sources which increases with a layer radius.

A further object of the invention is to disclose the layer of circumferentially spaced magnetic sources of the first and second pluralities which are angularly displaced relative to each other in a successive manner so that an angular displacement between each previous and subsequent layer is less than a polar pitch.

A further object of the invention is to disclose the spaced magnetic sources of second plurality of each previous layer angularly shifted relative to spaced magnetic sources of second plurality of each subsequent layer for a predetermined angle which is less than the polar pitch.

A further object of the invention is to disclose the spaced magnetic sources of first plurality of each previous layer angularly shifted relative to spaced magnetic sources of first plurality of each subsequent layer for a predetermined angle which is less than the polar pitch.

A further object of the invention is to disclose the predetermined angle which equals to the polar pitch divided by a number of the layers.

A further object of the invention is to disclose the electrical machine having a sliced structure; electrical machine comprising slices spaced along the shaft axis. Each slice comprises magnetic sources of the first and second pluralities facing each other.

A further object of the invention is to disclose the rotor comprising a plurality of projections carrying the magnetic field sources of the second plurality at both sides thereof.

A further object of the invention is to disclose the stator comprising a plurality of projections carrying the magnetic field sources of the first plurality at both sides thereof.

A further object of the invention is to disclose a number of magnetic sources spaced along each slice which is constant.

A further object of the invention is to disclose a number of magnetic sources spaced along each slice which is variable.

A further object of the invention is to disclose the magnetic sources of the first and second pluralities spaced along a subsequent section angularly displaced relative to magnetic sources spaced along previous section for an angular distance $\phi$ which is less than a polar pitch.

A further object of the invention is to disclose the magnetic sources of the second pluralities of each previous section angularly displaced relative to each subsequent section so that an angular displacement between each previous and subsequent sections is less than a polar pitch.

A further object of the invention is to disclose the spaced magnetic sources of first plurality of each previous section angularly shifted relative to spaced magnetic sources of first plurality of each subsequent section for a predetermined angle which is less than the polar pitch.

A further object of the invention is to disclose the predetermined angle which equals to the polar pitch divided by a number of the sections.

A further object of the invention is to disclose a method of use of an electrical machine; the aforesaid method comprises the steps of (a) providing a electrical machine comprising a stator and a rotor rotatable relative to said stator with an air gap therebetween; the stator provided with a first plurality of sources of magnetic field equally spaced in a circumferential configuration over the stator; the rotor provided with a second plurality of sources of magnetic field equally spaced in a circumferential configuration over the rotor; the magnetic sources of at least one plurality being electromagnets; each electromagnet comprising at least one magnet coil resting on a magnet conductor;

(b) converting electrical energy into rotation of a machine shaft or inversely;

It is a core purpose of the invention to provide the conductor provided with at least one member made of a material selected from the group consisting of a magnetically isotropic material, a magnetically anisotropic material and any combination thereof; said isotropic and anisotropic materials are characterized by an electric resistance greater than about $10^6$ Ohm·m, coercitive force less than about 100 A·m$^{-1}$, relative magnetic permeability greater than about 3000 and saturation magnetic induction greater than about 0.6 Tl at a frequency lower than about −10000 Hz.

LIST OF REFERENCE NUMERALS 100 electrical machine
110 permanent magnet
112 pole extension of the permanent magnet
113 magnetic conductor of the permanent magnet
115 pole extension of the magnetic conductor of the permanent magnet
120 electromagnet
122 electromagnet coil
123 magnetic conductor of the electromagnet
125 pole extension of the magnetic conductor of the electromagnet
127 brushes interconnecting the electromagnet coil and the commutator
130 rotational axis (shaft)
140 rotor
143 magnetic source disposed at the rotor
145 rotor base made of the non-magnetic material
150 stator
153 magnetic source disposed at the stator
155 stator base made of the non-magnetic material
160 gap between magnetic sources of the stator and the rotor
170 magnetic conductor made of the isotropic material
180—magnetic conductor made of the anisotropic material
190—direction of easy magnetization
200—axis of magnetization of the magnetic source
Φ magnetic flux created by the magnetic source
$\Phi_{em}$ magnetic flux created by the electromagnet
$\Phi_{pm}$—magnetic flux created by the permanent magnet

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide electrical machines provided-with-magnetic conductors made of magnetically isotropic and anisotropic material to reduce losses in the aforesaid conductors.

The term "polar pitch τ" hereinafter refers to a portion of an electrical machine armature (rotor or stator) which falling on one pole. Specifically, τ=D/2p, where D is an armature diameter and 2p is a number of main poles in the electrical machine. The diameter D is measured in an area of the air gap in degrees.

Figure 1:
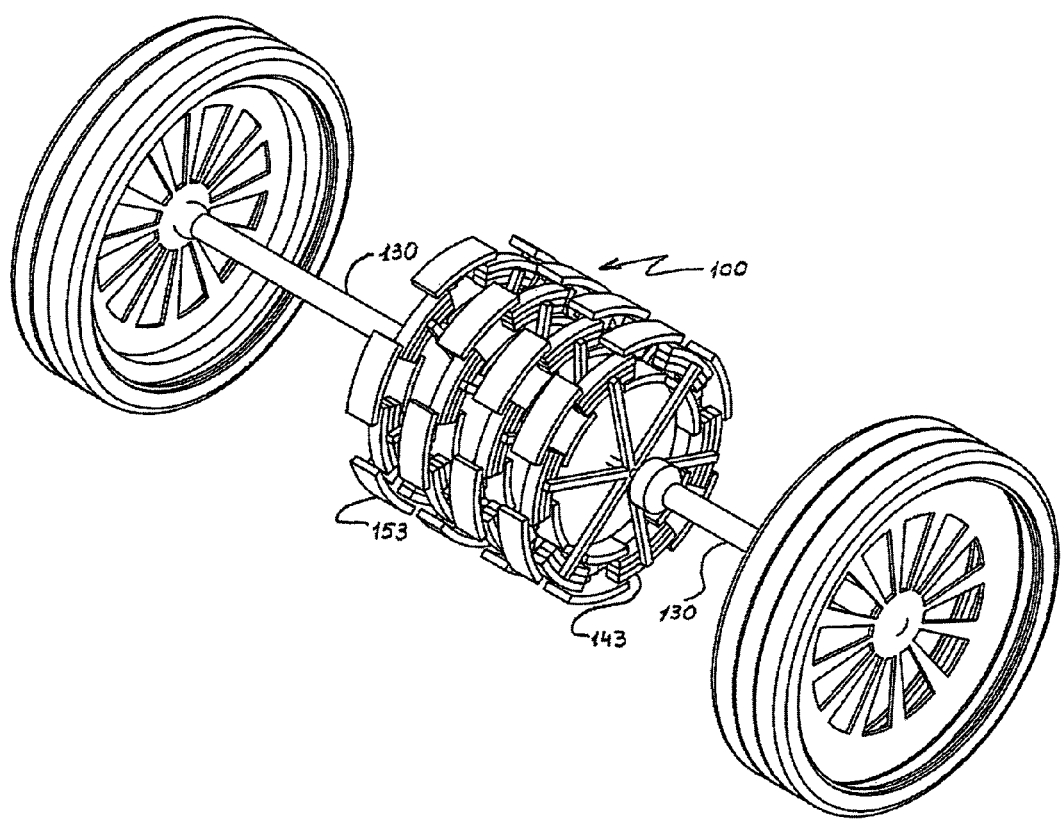
FIG. 1 is a schematic view of the electrical machine adapted for use as an electrical drive in the vehicle.

Reference is now made to FIG. 1, presenting an electrical machine 100 adapted for use as an electrical engine in a drive of a shaft 130 in a vehicle (not shown). The electrical engine 100 comprises four sections. A first plurality of magnetic field sources 153 of a stator is fixed to a vehicle body (not shown). A second plurality of magnetic field sources 143 of a rotor is fixed to a wheel shaft 130.

In most of the drawings, the electrical machine 100, the coils of the electromagnets, housing elements and end shields are not shown to simplify understanding of the proposed technical solution.

Figure 2:
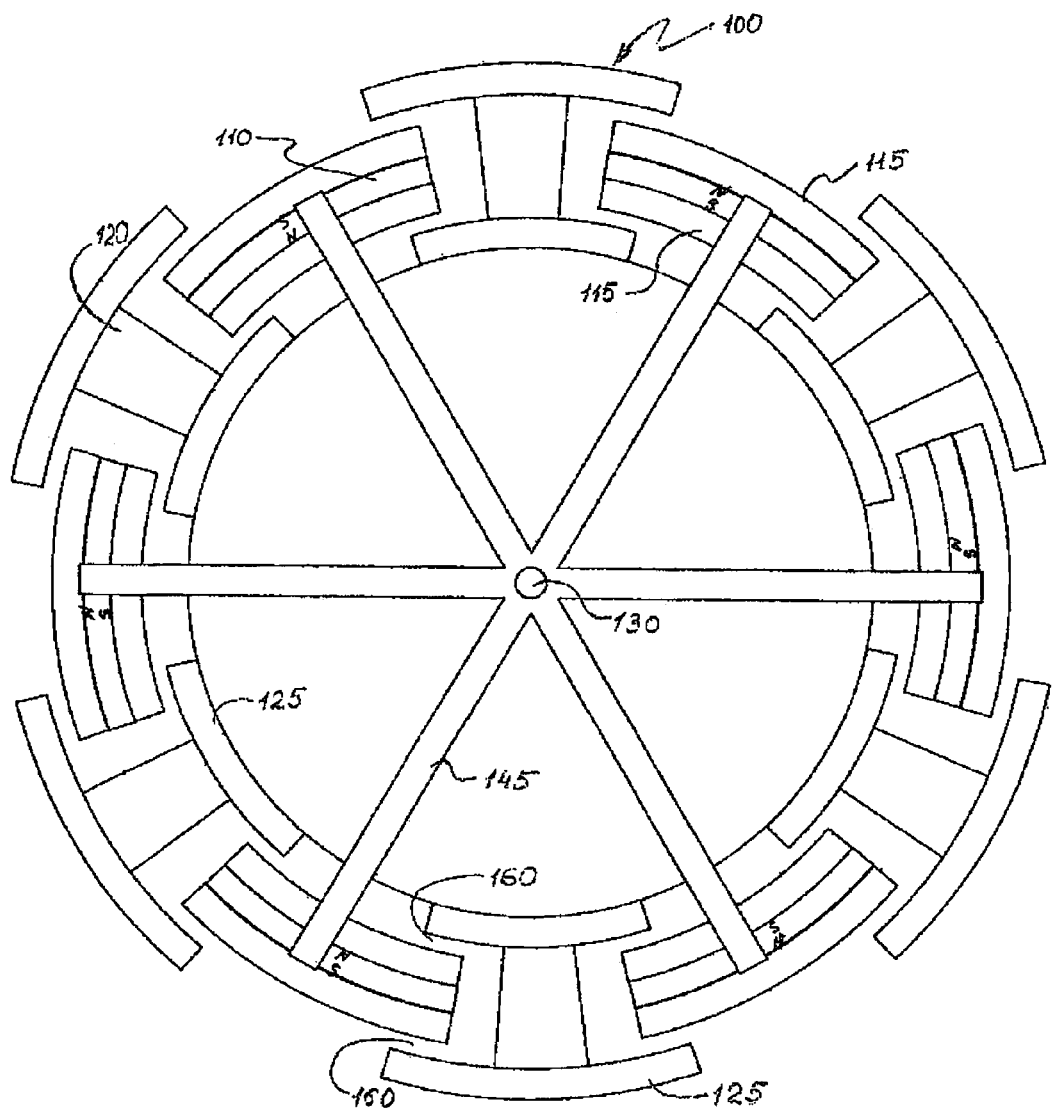
FIG. 2 is a sectional view of the electrical machine depicted in FIG. 1.

Reference is now made to FIG. 2, presenting a cross-sectional view of one of the sections of the aforesaid electrical machine 100. The magnetic field sources of the first plurality comprise electromagnets 120 provided with pole extensions 125. The magnetic field sources of the second plurality are permanent magnet 110 with pole extensions 115 which are mechanically connected to a rotor base 145 rotatably disposed on an axis 130 inside the extensions 125 with an air gap 160. The magnetic field sources of the first plurality are configured into a U-like shape while magnetic field sources of the second plurality into an I-like shape.

Figure 3:
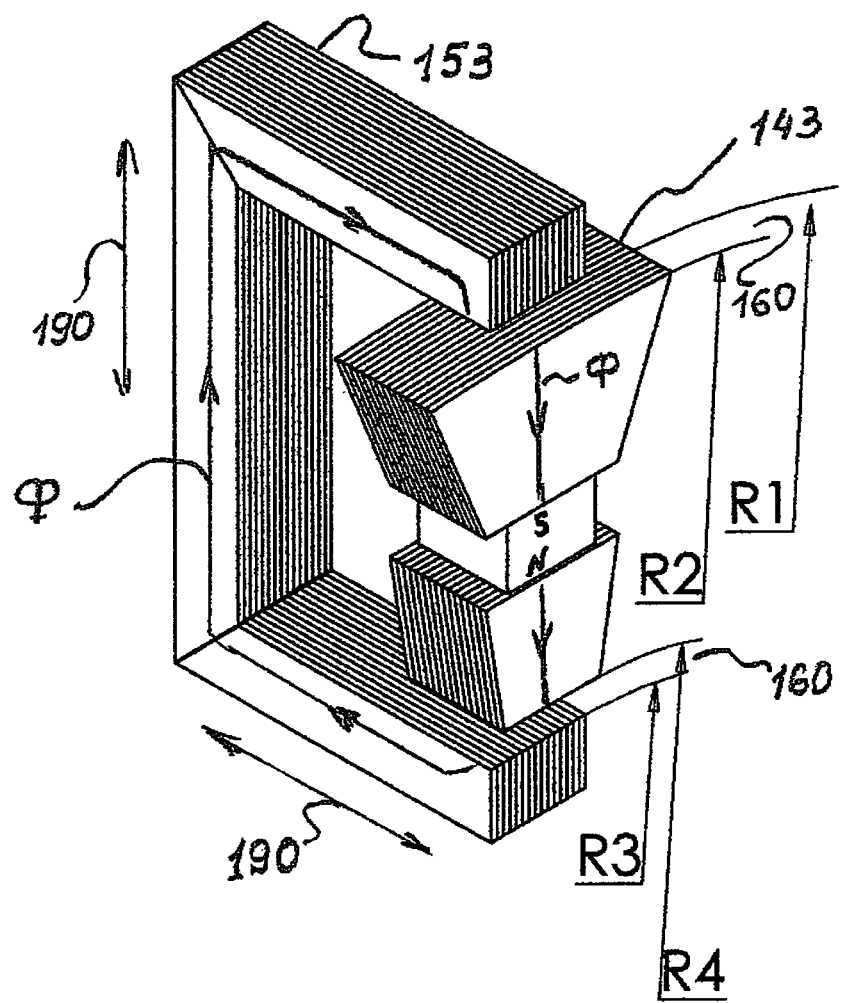
FIG. 3 is a schematic view of the U-like magnetic field source provided with the I-like magnetic field source in the interior.

Reference-is-now made to FIG. 3, showing an exemplary non-limiting embodiment of the magnetic field sources 143 and 153 configured into I- and U-like shape such that the magnetic field source 143 is disposed inside the source 153. The constant air gap 160 in the course of electrical machine operation is provided by radii R1, R2, R3 и R4. The Path of the magnetic flux Φ substantially keeps along a direction of easy magnetization 190.

Figure 4:
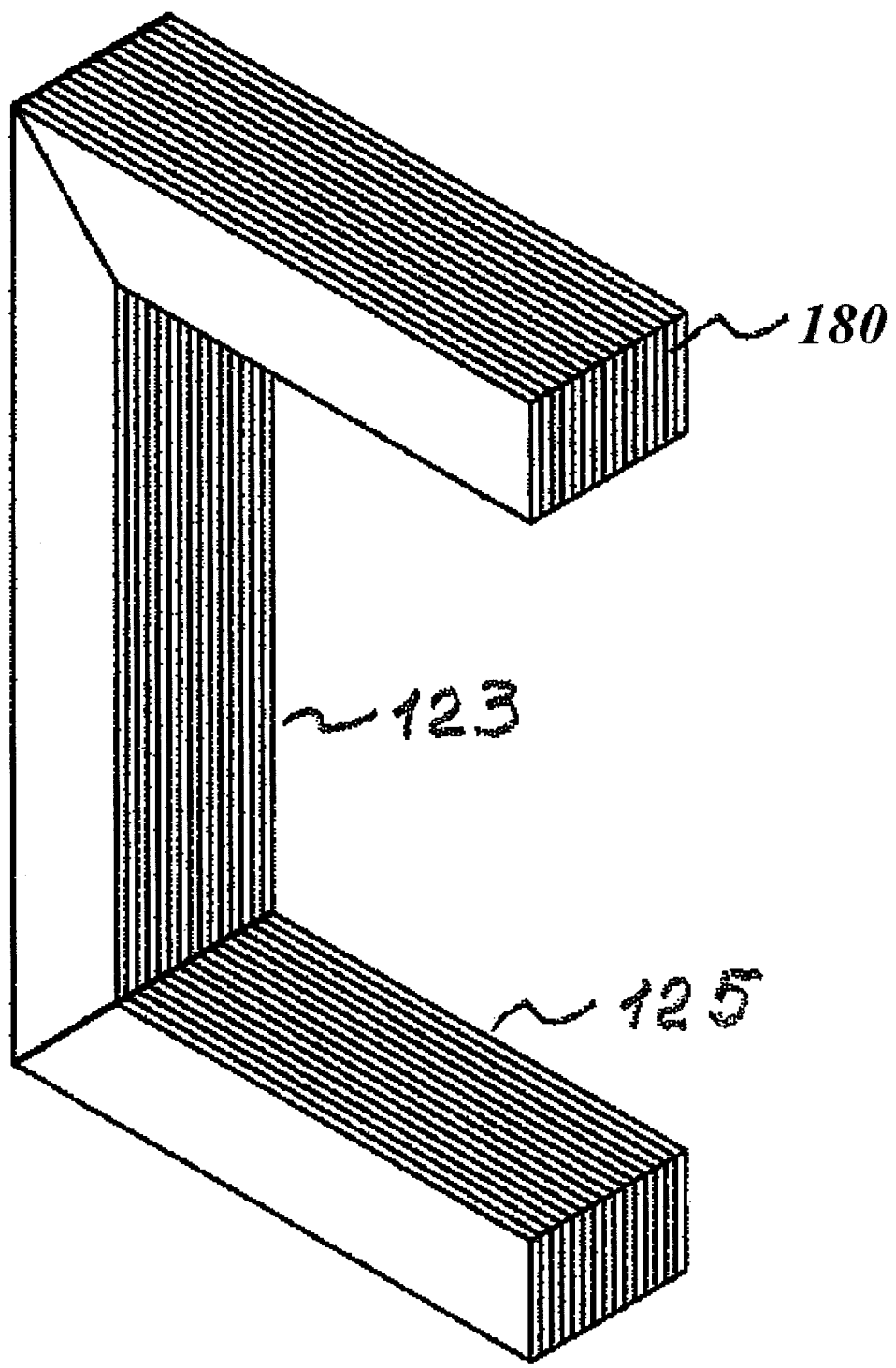
FIG. 4 is a schematic view of the magnetic conductor of the electromagnet.

Reference is now made to FIG. 4, presenting a magnetic conductor of the electromagnet 120 (not shown) of the source 153 (not shown). The aforesaid conductor comprises a magnetic conductor of the electromagnet coil (electromagnet core) 123 and pole extensions 125. The elements 123 and 125 constitute stacked electric steel sheets 180 which are characterized by magnetic anisotropy.

Figure 5:
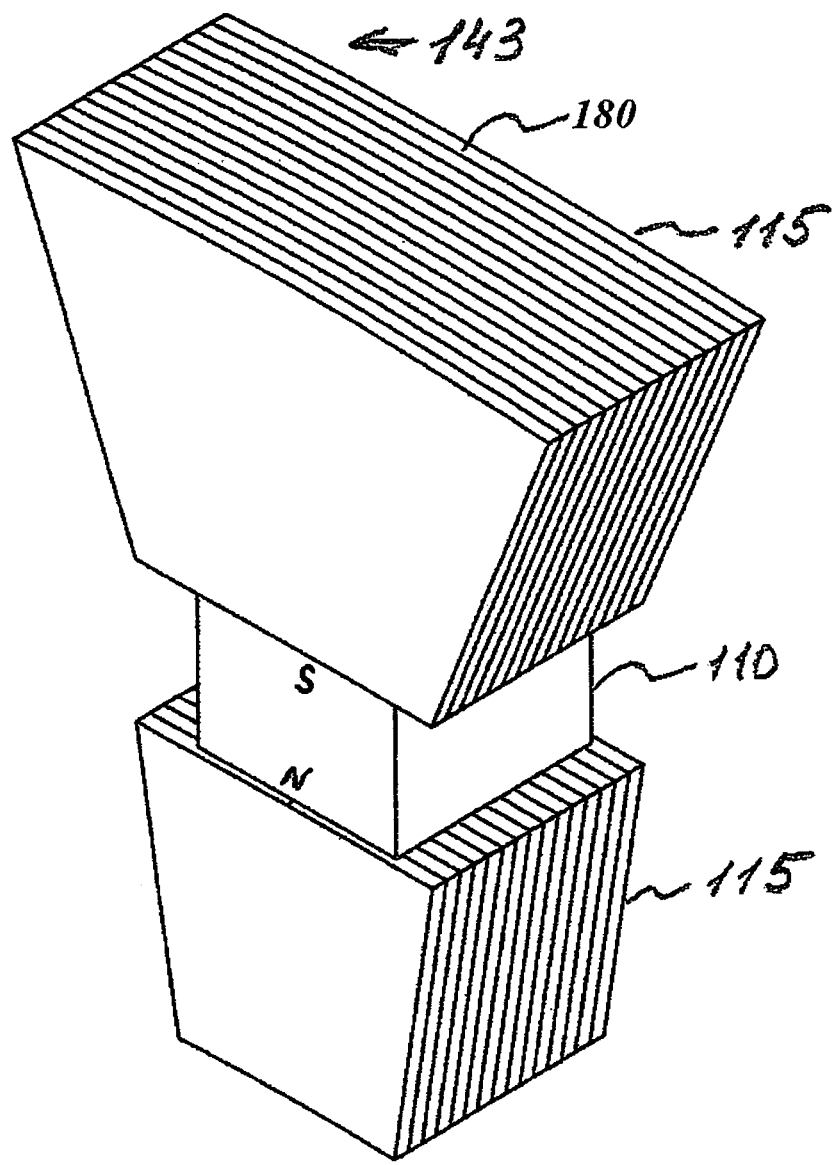
FIG. 5 is a schematic view of the permanent magnet provide with the pole extensions.

Reference is now made to FIG. 5, showing the magnetic field source 143 comprising the permanent magnet 110 provided with the pole extensions 115. The aforesaid extensions 115 constitute stacked electric steel sheets 180 which are characterized by magnetic anisotropy.

Figure 6:
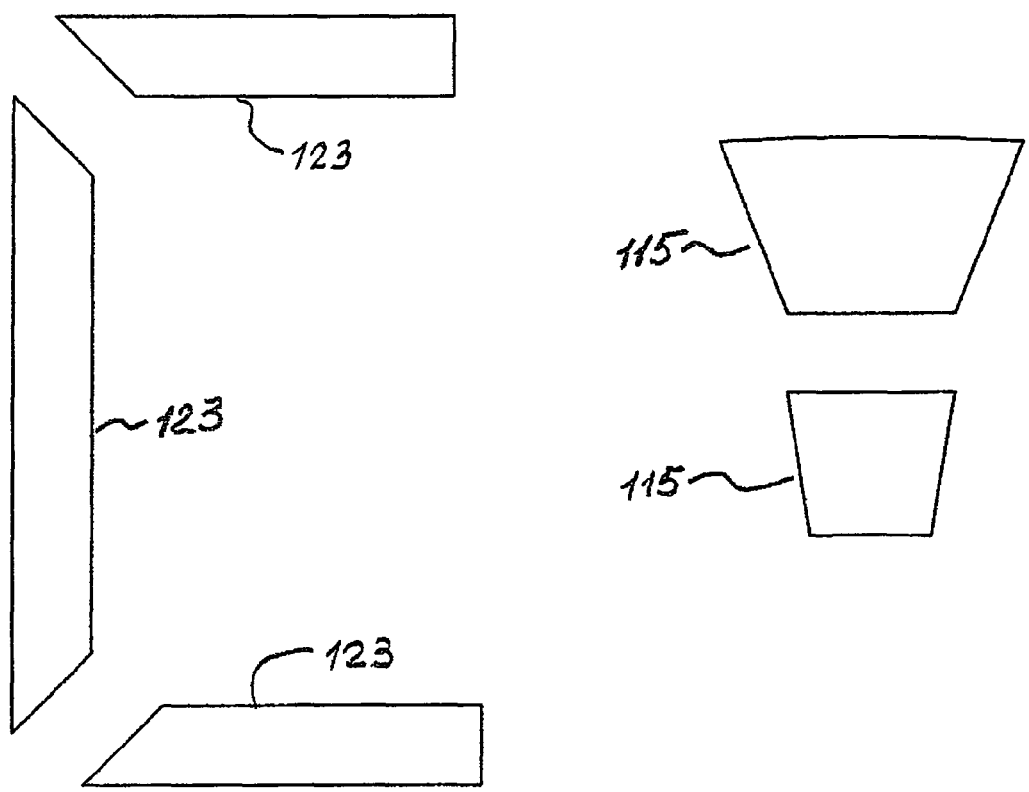
FIG. 6 is a schematic view of a magnetic conductor comprising a plurality of electrical steel.

Reference is now made to FIG. 6, presenting electric steel sheets stacked into packs of the magnetic conductors 115 and 123 shown in FIGS. 3 to 5. Variable cross section of the magnetic conductor 115 is resulted from difference between radii R2 и R3 shown in FIG. 3.

Figure 7:
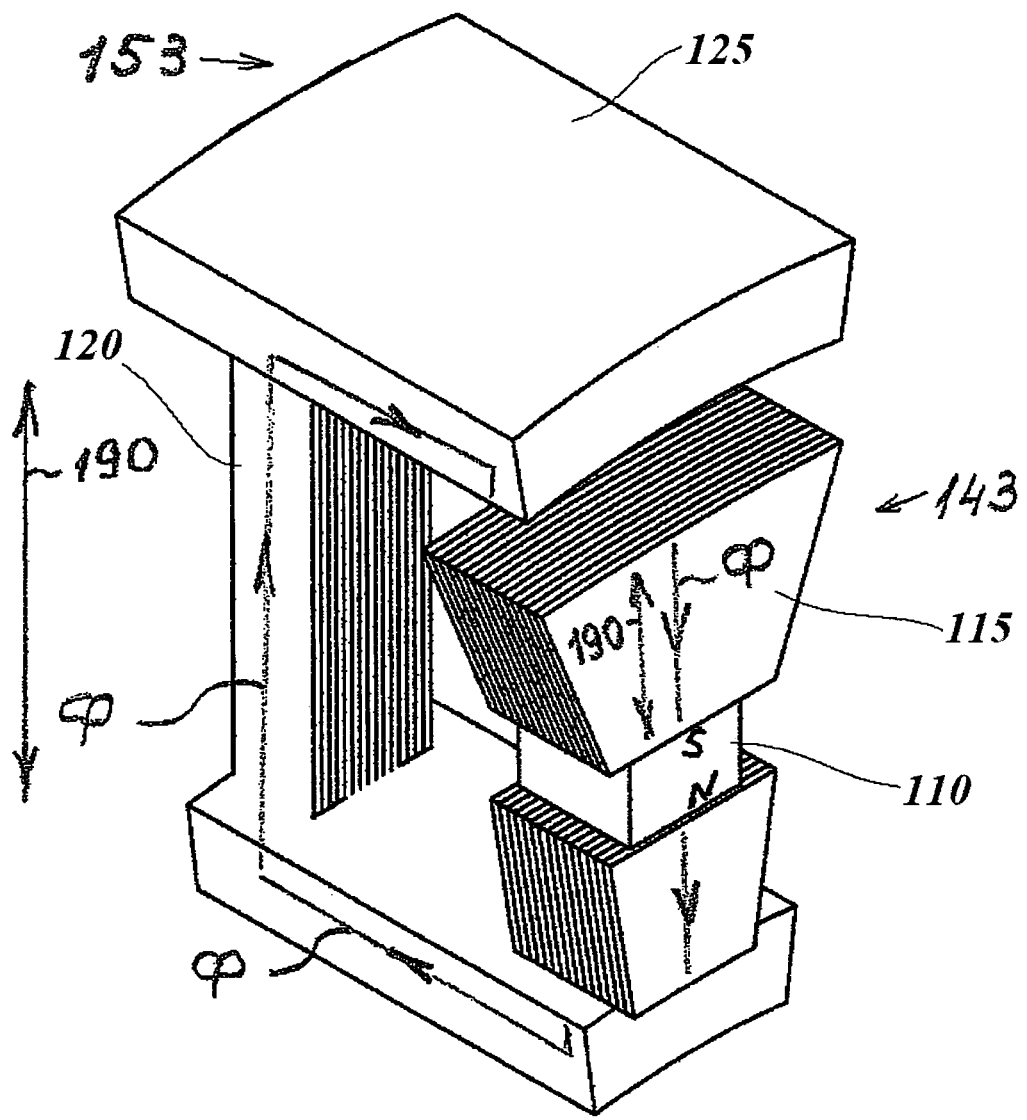
FIG. 7 a schematic view of the U-like magnetic field source provided with the I-like magnetic field source in the interior; electromagnet pole extensions re made of magnetically isotropic material.

Reference is now made to FIG. 7, showing an exemplary non-limiting embodiment of the magnetic field source 153 of U-like form (electromagnet coil is not shown) which comprises the core 123 stacked of electrical steel sheets and extensions 125 made of magnetically isotropic material. Inside the source 153, the I-like magnetic field source 143 is disposed. The path of the magnetic flux Φ coincides with direction of easy magnetization 190 in all elements of the magnetic circuit which are made of the anisotropic electrical steel sheets 180.

Figure 8:
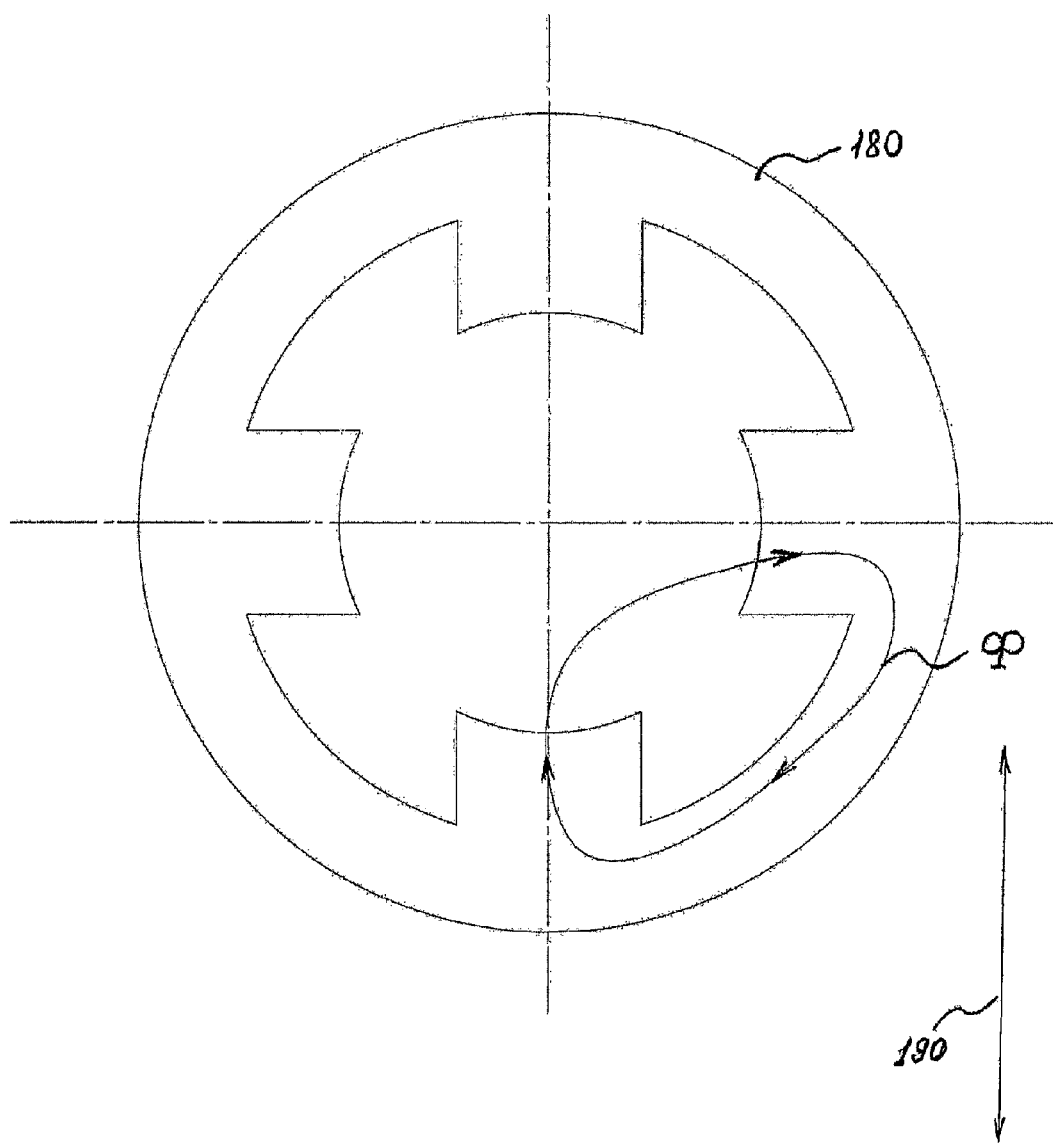
FIG. 8 is a schematic diagram of the path of the magnetic flux in the electric machine.

Reference is now made to FIG. 8, presenting a path of the magnetic flux Φ in stator magnetic circuit which is made of a magnetically anisotropic material. As seen in FIG. 8, the path of the magnetic flux just partially goes along the direction of easy magnetization 190.

Figure 9:
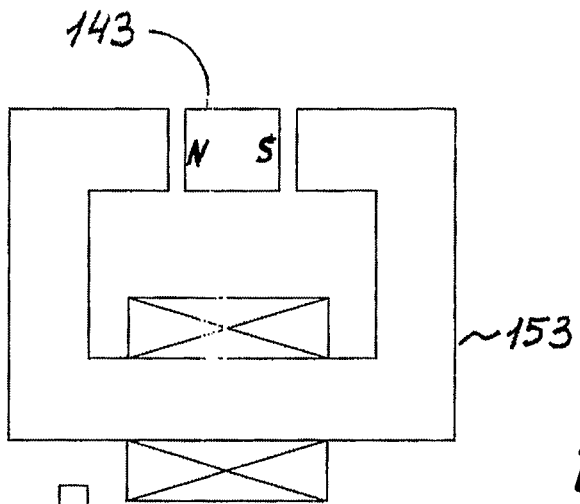
FIG. 9 is a schematic view of electrical machine provided with the permanent magnets of the second plurality which are disposed inside the electrical magnets of the first plurality.

Reference is now made to FIG. 9, showing a design solution of the electrical machine 100 provided with the permanent magnet 110 of the second plurality 143 disposed inside the electromagnet 120 of the first plurality 153.

Figure 10:
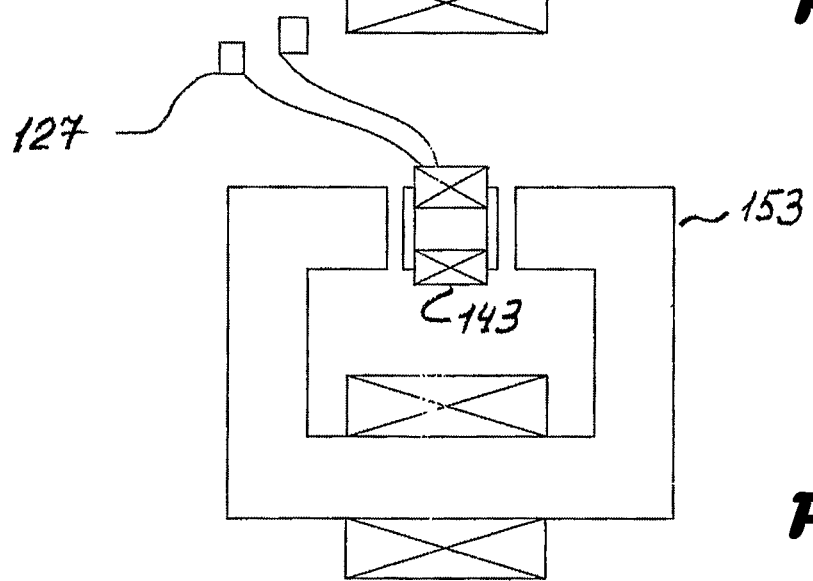
FIG. 10 is a schematic view of electrical machine provided with electrical magnets of the second plurality and brushes which are disposed inside the electrical magnets of the first plurality.

Reference is now made to FIG. 10, showing a design solution of the electrical machine 100 provided with the electromagnet of the second plurality 143 provided with brushes 127 which is disposed inside the electromagnet of the first plurality 153.

Figure 11:
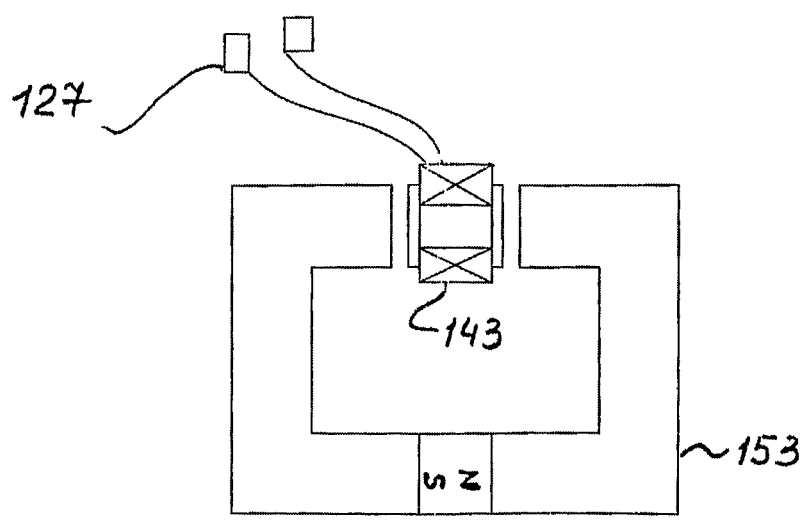
FIG. 11 is a schematic view of electrical machine provided with electrical magnets of the second plurality and brushes which are disposed inside the permanent magnets of the first plurality.

Reference is now made to FIG. 11, showing a design solution of the electrical machine 100 provided with the electromagnet of the second plurality 143 provided with the brushes 127 which is disposed inside the magnetic source 153 comprising the permanent magnet 110.

Figure 12:
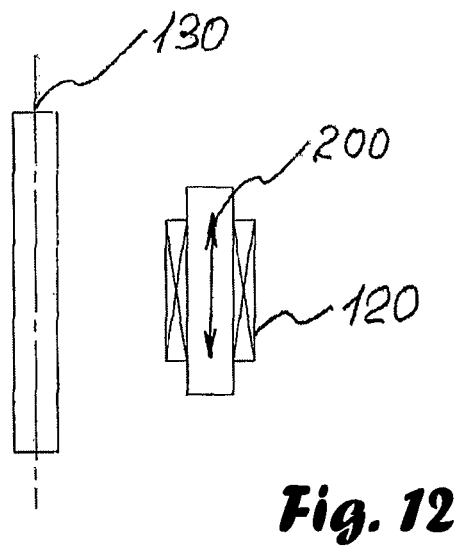
FIG. 12 is a schematic view of the electrical machine provided with the axis of magnetization of the electromagnet which is parallel to the shaft axis of the rotor.

Reference is now made to FIG. 12, showing a design solution of the electrical machine 100 wherein an axis of magnetization 200 of the electromagnet 120 is parallel to the shaft axis 130 of the rotor 140.

Figure 13:
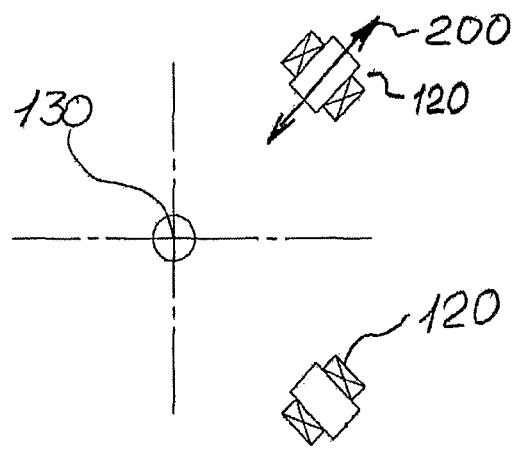
FIG. 13 is a schematic view of the electrical machine provided with the axis of magnetization of the electromagnet which is radially oriented to the shaft axis of the rotor.

Reference is now made to FIG. 13, showing a design solution of the electrical machine 100 wherein an axis of magnetization 200 of the electromagnet 120 is radially oriented to the shaft axis 130 of the rotor 140.

Figure 14:
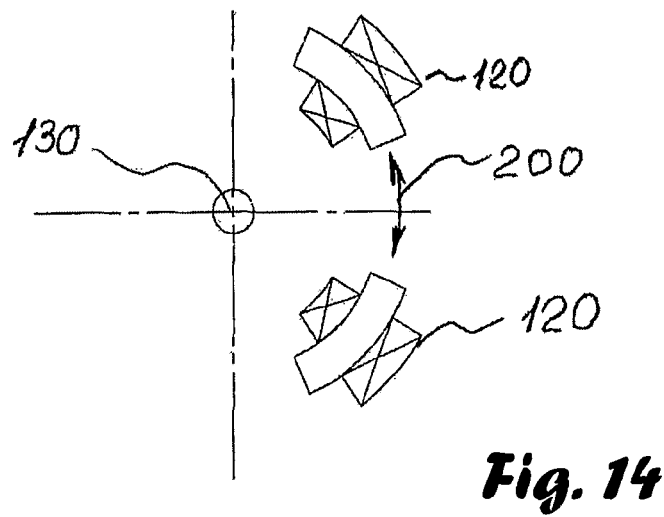
FIG. 14 is a schematic view of the electrical machine provided with the axis of magnetization of the electromagnet which is circumferentially configured in the plane perpendicular to the shaft axis of the rotor.

Reference is now made to FIG. 14, showing a design solution of the electrical machine 100 wherein an axis of magnetization 200 of the electromagnet 120 is circumferentially configured in a plane perpendicular to the shaft axis 130 of the rotor 140.

Figure 15:
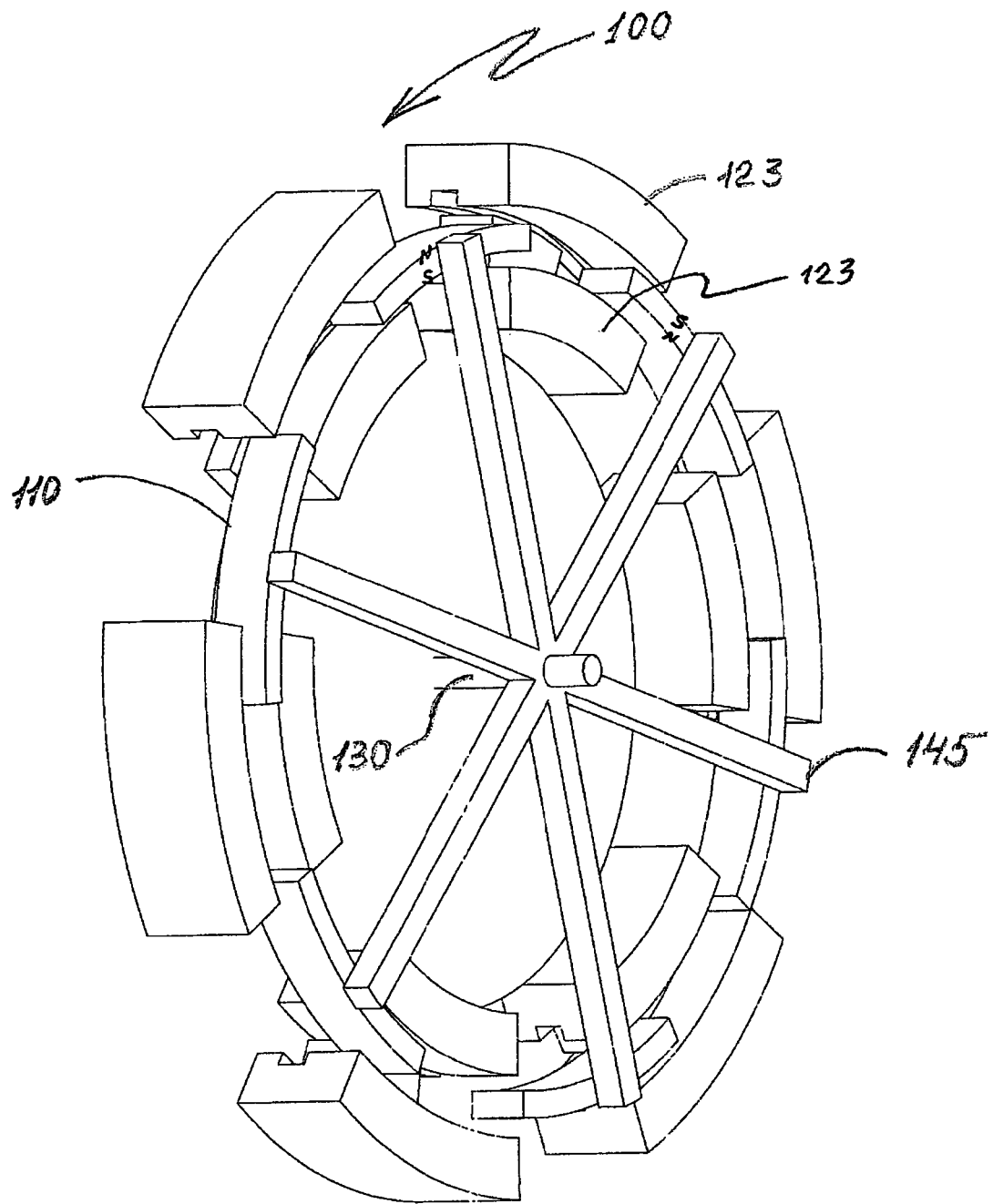
FIG. 15 is a isometric view of the electrical machine provided with the sources of magnetic field of the first plurality shaped in a U-like form and the sources of the second plurality shaped in an I-like form.

Reference is now made to FIG. 15, presenting an electrical machine 100 comprising a rotor 140. Sources of magnetic field of a first plurality 153 are electromagnets 120. Sources of magnetic field of a second plurality 143 are permanent magnets 110. The sources of magnetic field of the first plurality 153 shaped in a U-like form, while the sources 143 of the second plurality are shaped in an I-like form. The sources 143 are disposed inside the sources 153.

Figure 16:
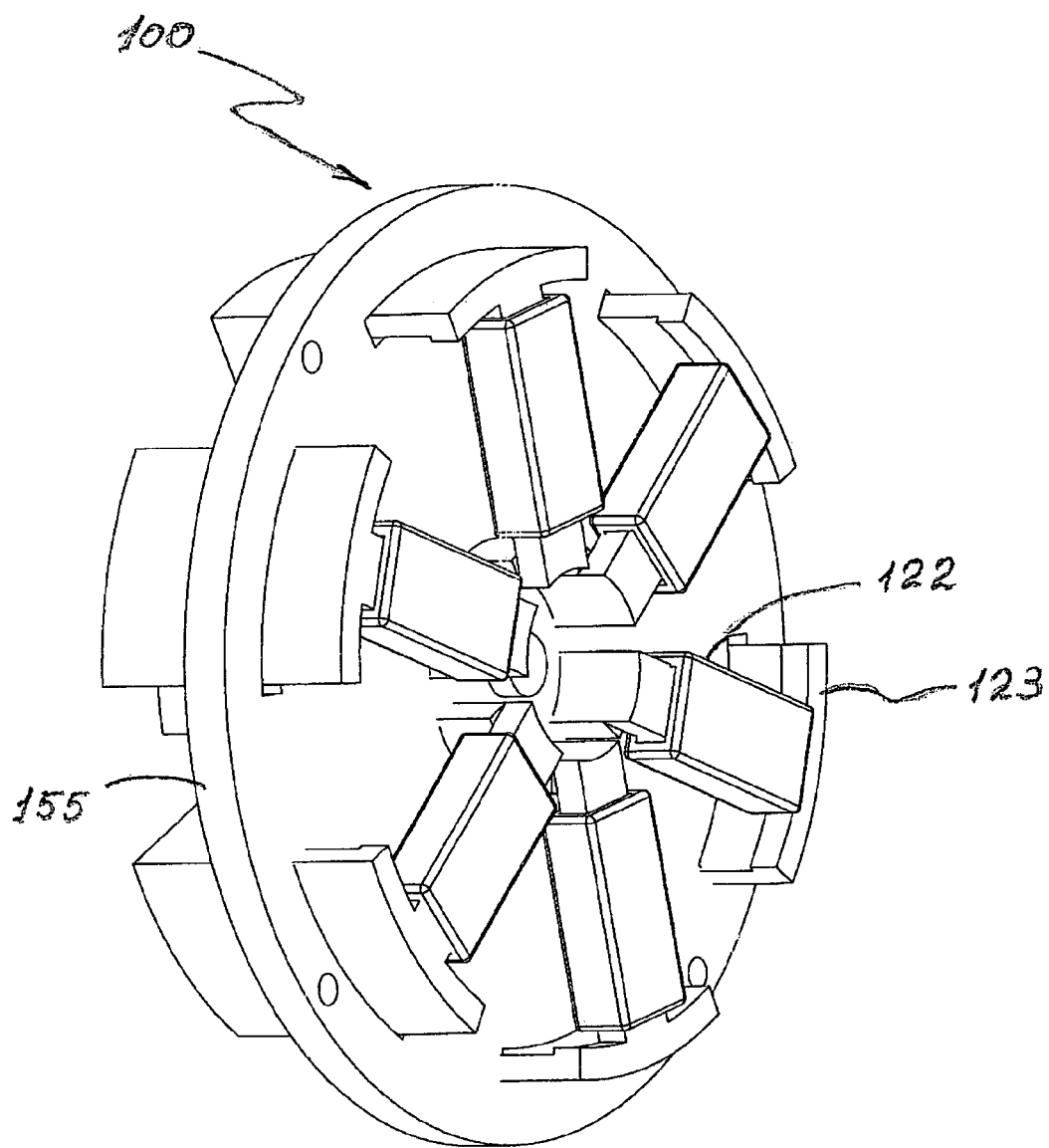
FIG. 16 is a side isometric view of the electrical machine from a side of the stator of the electrical machine.

Reference is now made to FIG. 16, presenting a view from a side of the stator 150 of the electrical machine 100.

Figure 17:
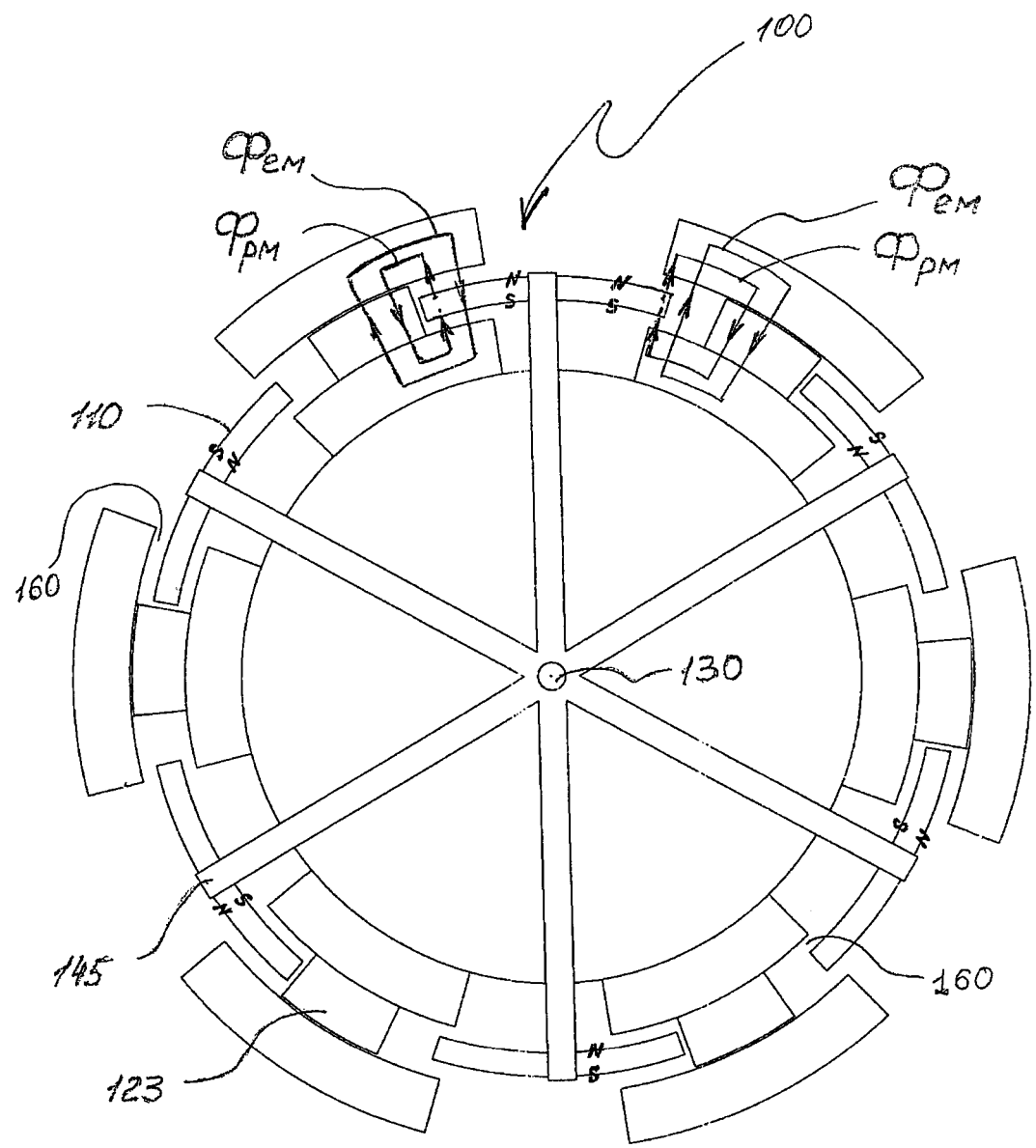
FIG. 17 is a schematic diagram of the paths of magnetic fluxes $\Phi_{em}$ and $\Phi_{pm}$ of the electrical machine.

Reference is now made to FIG. 17, showing paths of magnetic fluxes $\Phi_{em}$ and $\Phi_{pm}$ of the electrical machine 100.

Figure 18:
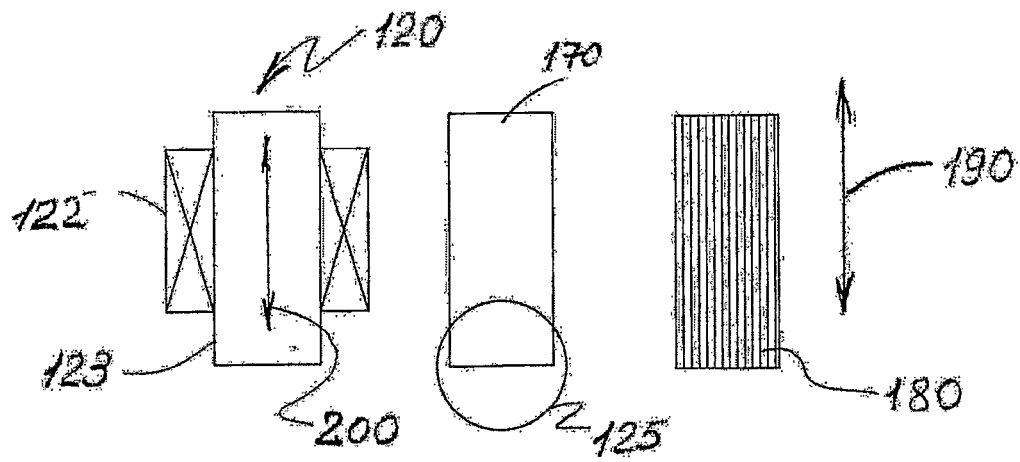
FIG. 18 is a schematic view of the I-like magnetic conductor of the electromagnet made of isotropic and anisotropic materials.
Figure 18:
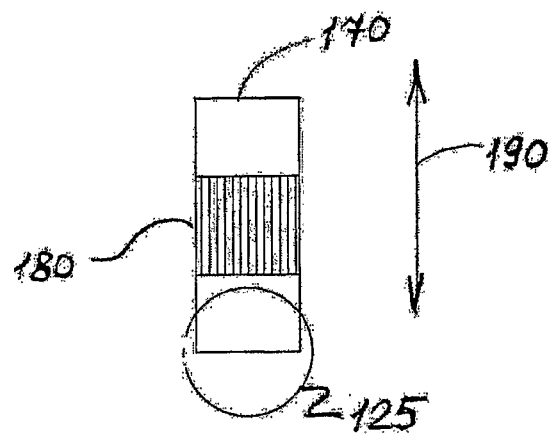
Figure 18:
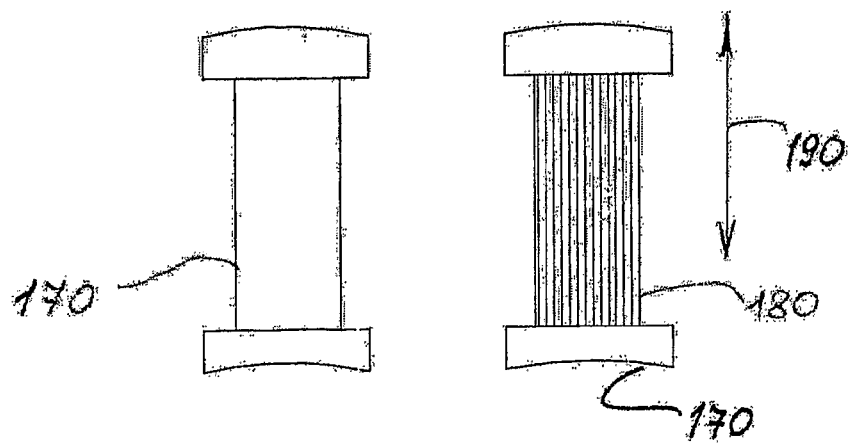

Reference is now made to FIG. 18, showing a design solution of an I-like magnetic conductor 123 of the electromagnet 120 made of an isotropic material 170 and an anisotropic material 180.

Figure 19:
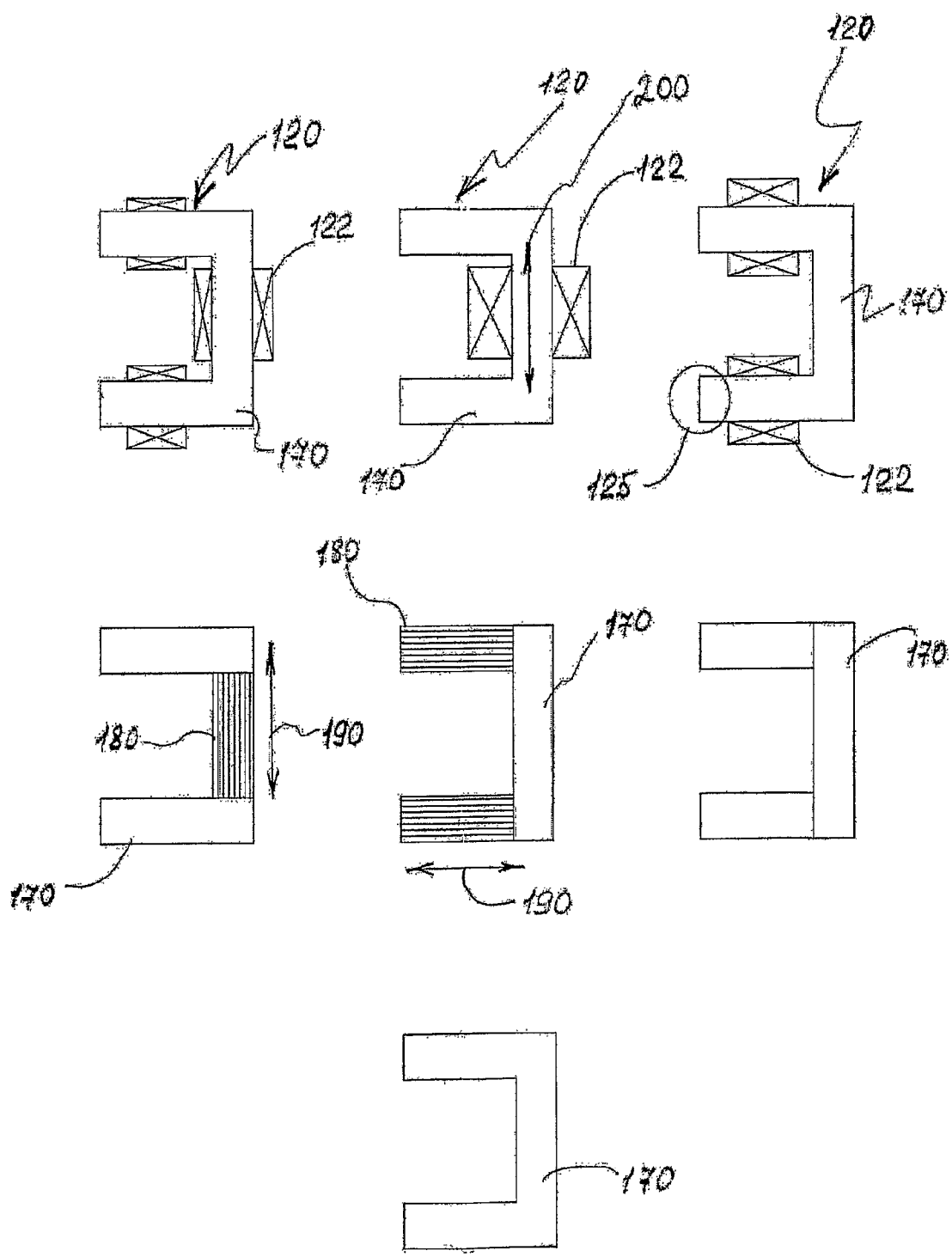
FIG. 19 is a schematic view of the U-like magnetic conductor of the electromagnet made of isotropic and anisotropic materials.

Reference is now made to FIG. 19, showing a design solution of a U-like magnetic conductor 123 of the electromagnet 120 made of an isotropic material 170 and an anisotropic material 180.

Figure 20:
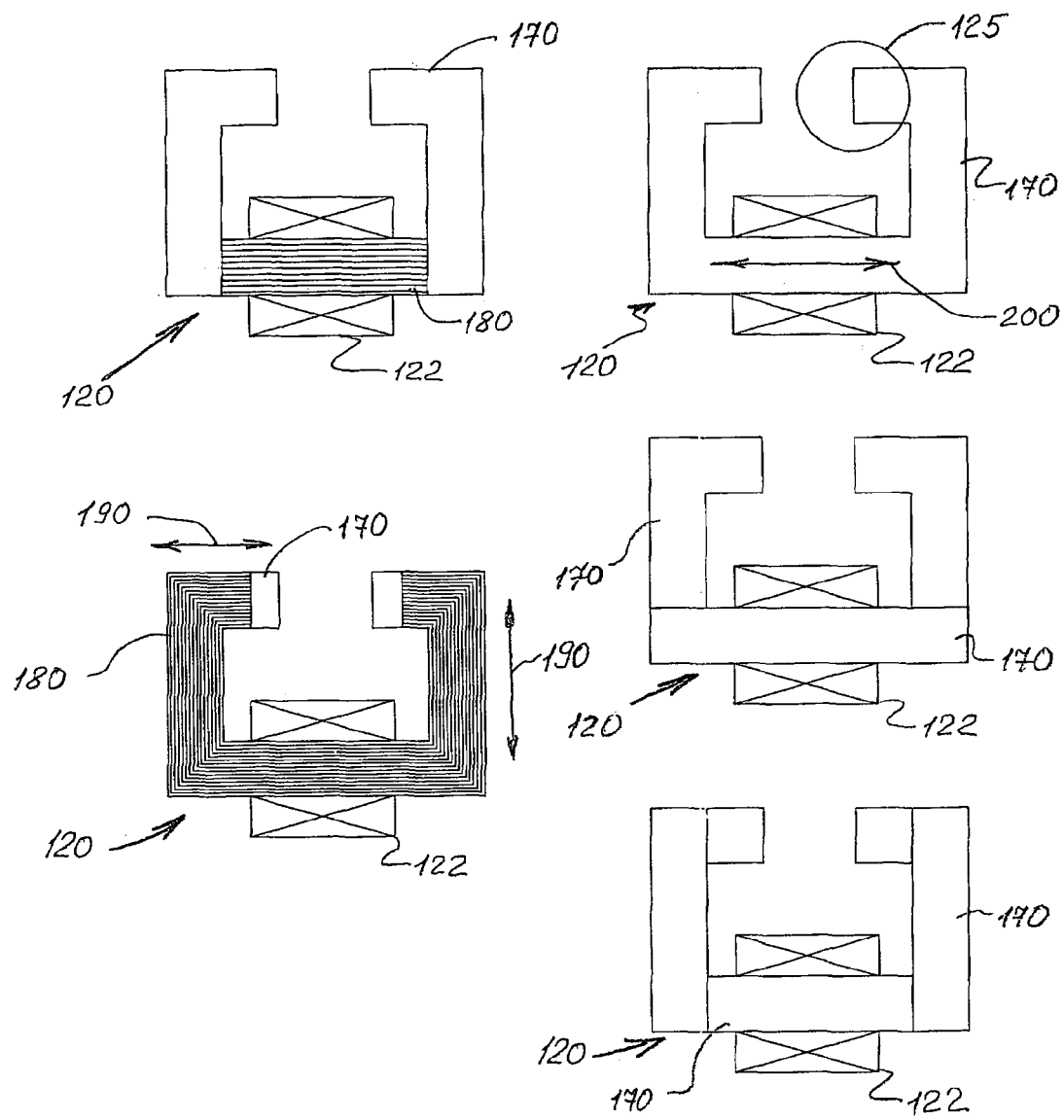
FIG. 20 is a schematic view of the C-like magnetic conductor of the electromagnet made of isotropic and anisotropic materials.

Reference is now made to FIG. 20, showing a design solution of a C-like magnetic conductor 123 of the electromagnet 120 made of an isotropic material 170 and an anisotropic material 180.

Figure 21:
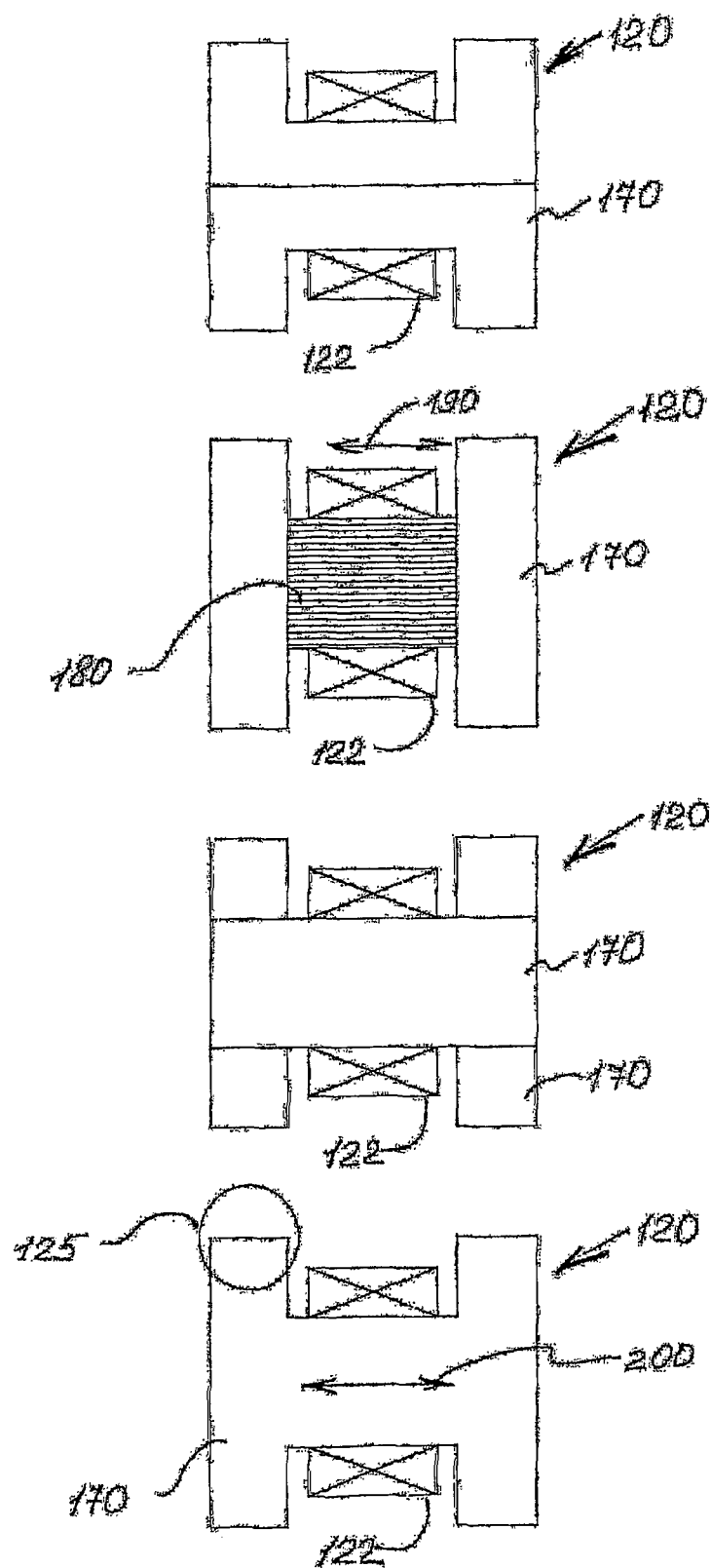
FIG. 21 is a schematic view of the T-like magnetic conductor of the electromagnet made of isotropic and anisotropic materials.

Reference is now made to FIG. 21, showing a design solution of a T-like magnetic conductor 123 of the electromagnet 120 made of an isotropic material 170 and an anisotropic material 180.

Figure 22:
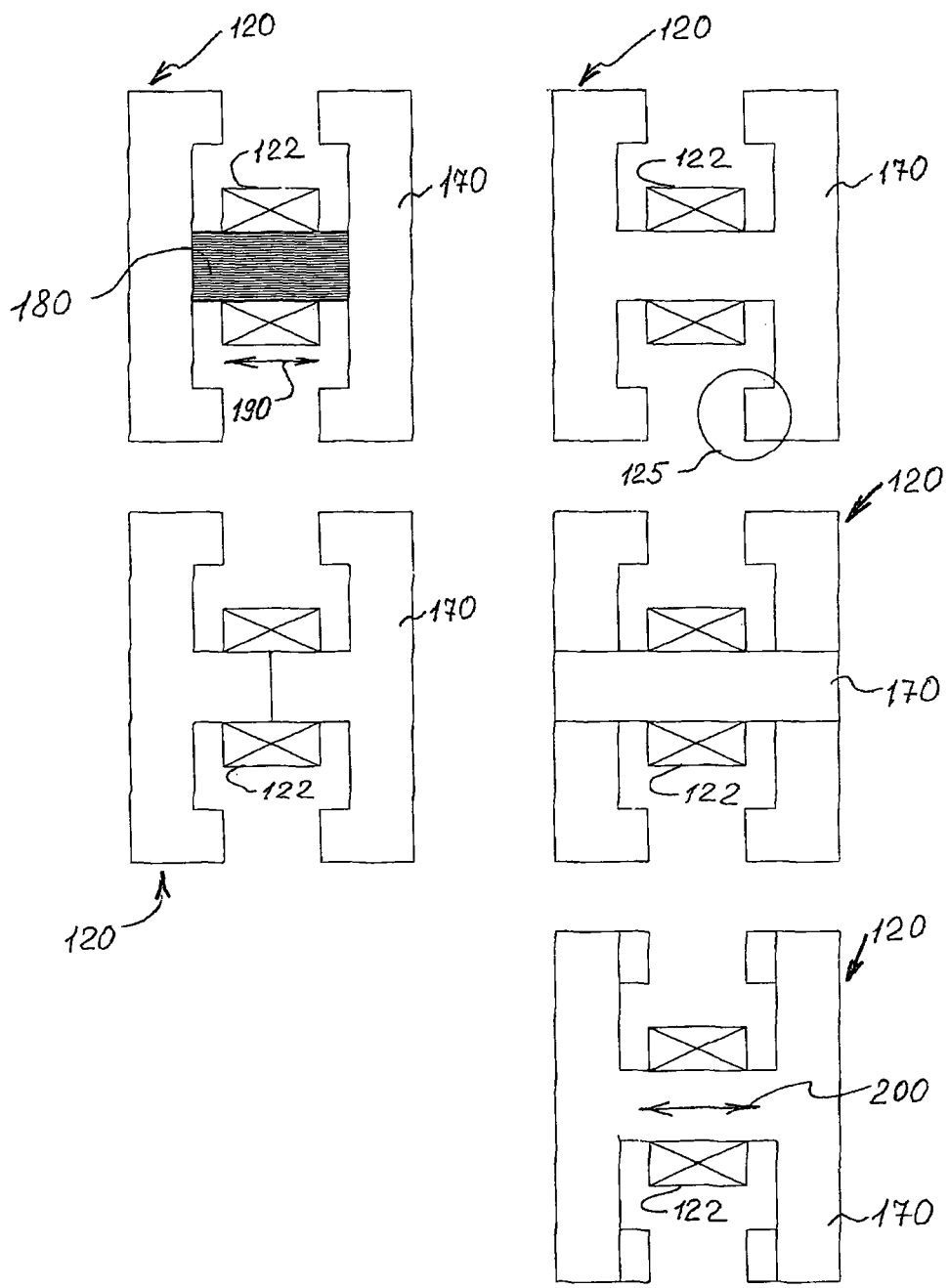
FIG. 22 is a schematic view of the X-like magnetic conductor of the electromagnet made of isotropic and anisotropic materials.

Reference is now made to FIG. 22, showing a design solution of an X-like magnetic conductor 123 of the electromagnet 120 made of an isotropic material 170 and an anisotropic material 180.

Figure 23:
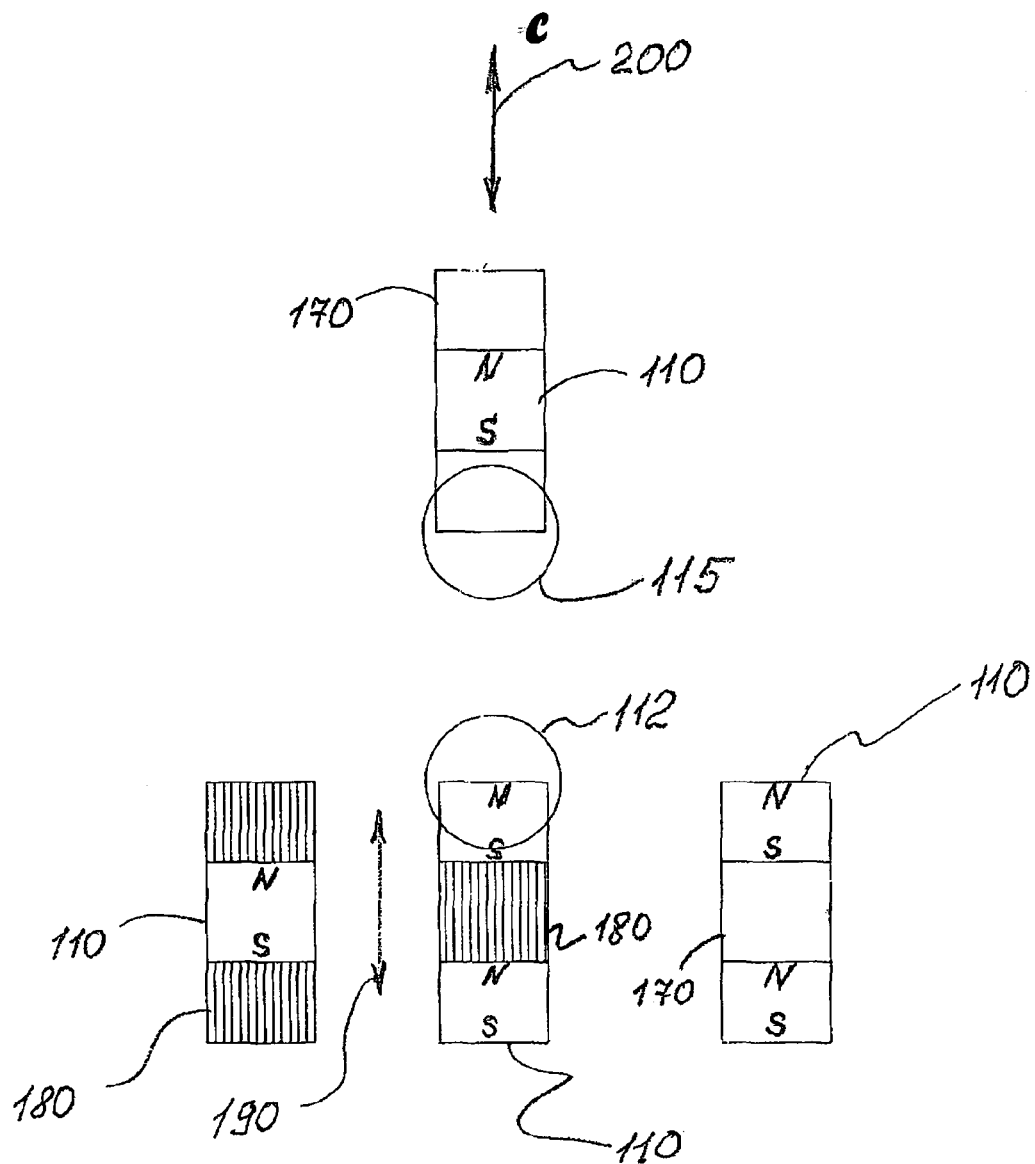
FIG. 23 is a schematic view of the I-like magnetic source comprising the permanent magnet and the magnetic conductor made of isotropic and anisotropic materials.

Reference is now made to FIG. 23, showing design solutions of an I-like magnetic source comprising the permanent magnet 110 and the magnetic conductor 113 made of the isotropic material 170 and the anisotropic material 180.

Figure 24:
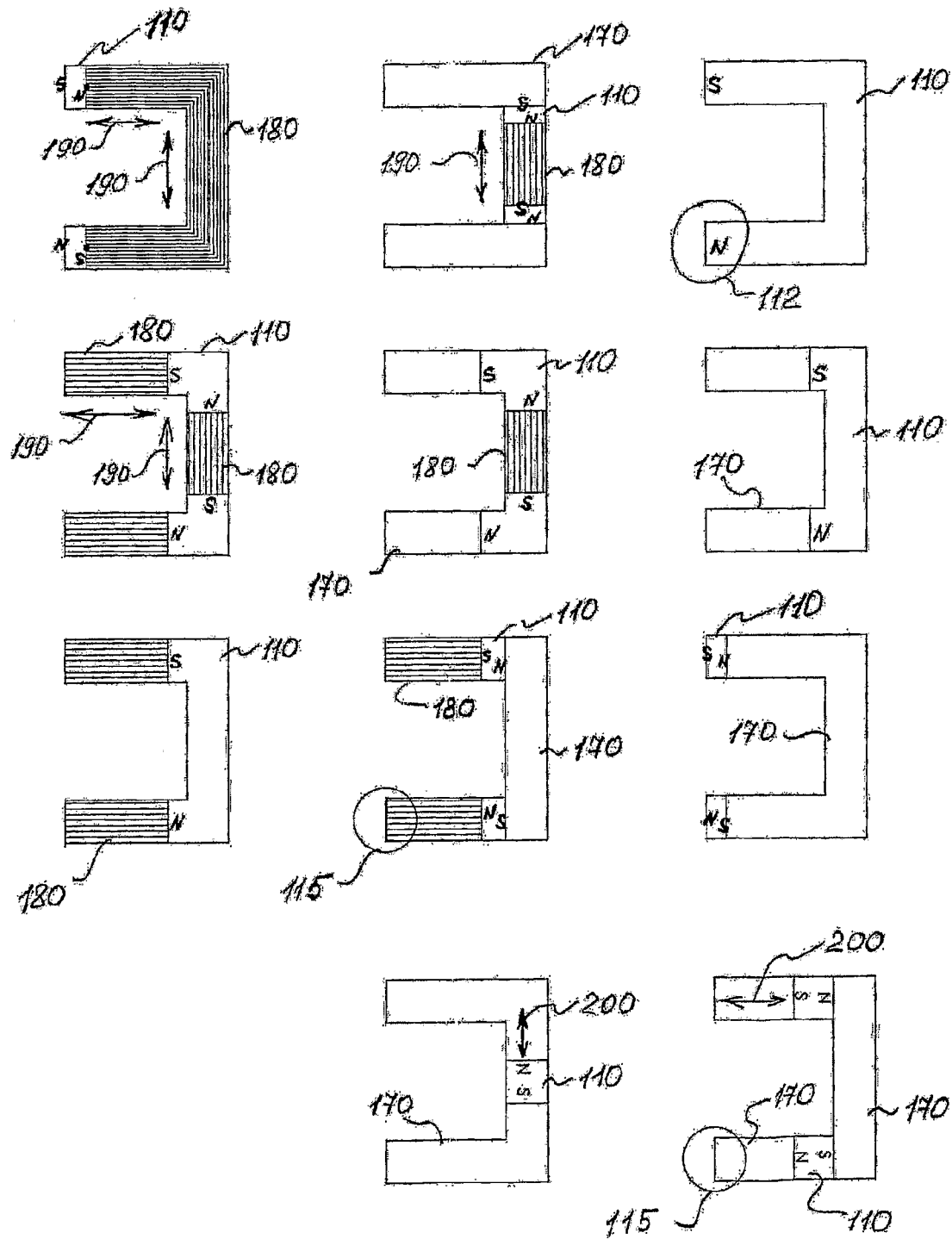
FIG. 24 is a schematic view of the U-like magnetic source comprising the permanent magnet and the magnetic conductor made of isotropic and anisotropic materials.

Reference is now made to FIG. 24, showing design solutions of a U-like magnetic source comprising the permanent magnet 110 and the magnetic conductor 113 made of the isotropic material 170 and the anisotropic material 180.

Figure 25:
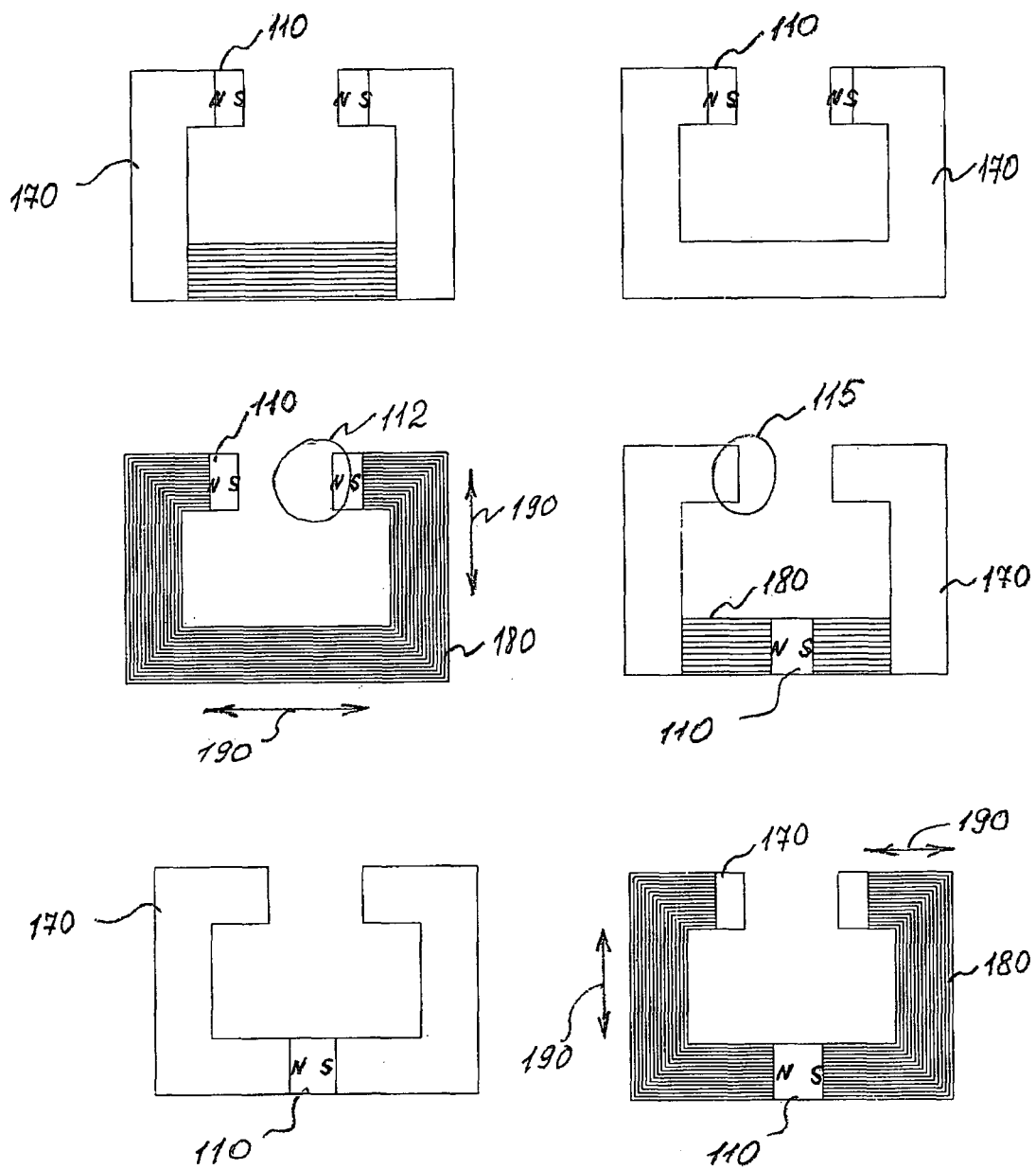
FIG. 25 is a schematic view of the C-like magnetic source comprising the permanent magnet and the magnetic conductor made of isotropic and anisotropic materials.

Reference is now made to FIG. 25, showing design solutions of a C-like magnetic source comprising the permanent magnet 110 and the magnetic conductor 113 made of the isotropic material 170 and the anisotropic material 180.

Figure 26:
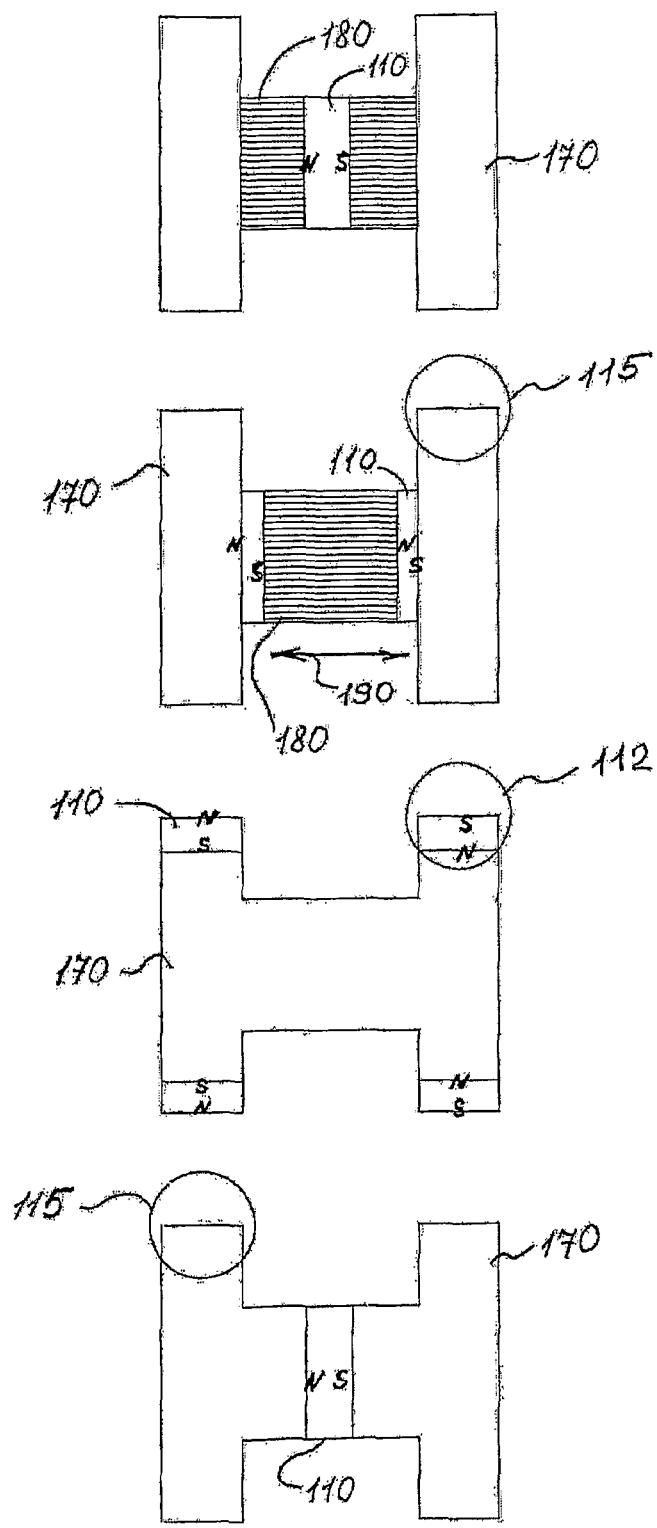
FIG. 26 is a schematic view of the T-like magnetic source comprising the permanent magnet and the magnetic conductor made of isotropic and anisotropic materials.

Reference is now made to FIG. 26, showing design solutions of a T-like magnetic source comprising the permanent magnet 110 and the magnetic conductor 113 made of the isotropic material 170 and the anisotropic material 180.

Figure 27:
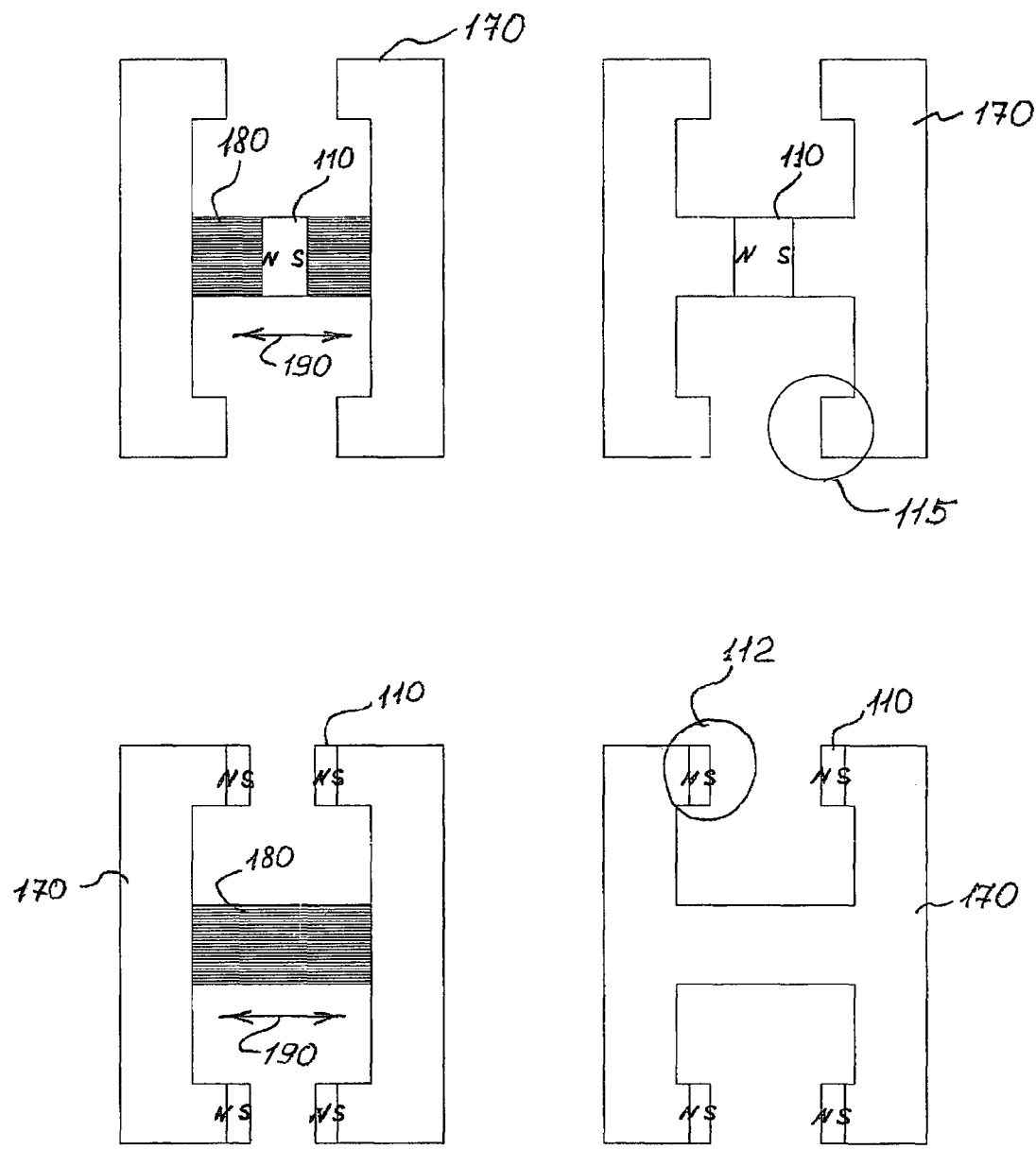
FIG. 27 is a schematic view of the X-like magnetic source comprising the permanent magnet and the magnetic conductor made of isotropic and anisotropic materials.

Reference is now made to FIG. 27, showing design solutions of an X-like magnetic source comprising the permanent magnet 110 and the magnetic conductor 113 made of the isotropic material 170 and the anisotropic material 180.

Figure 28:
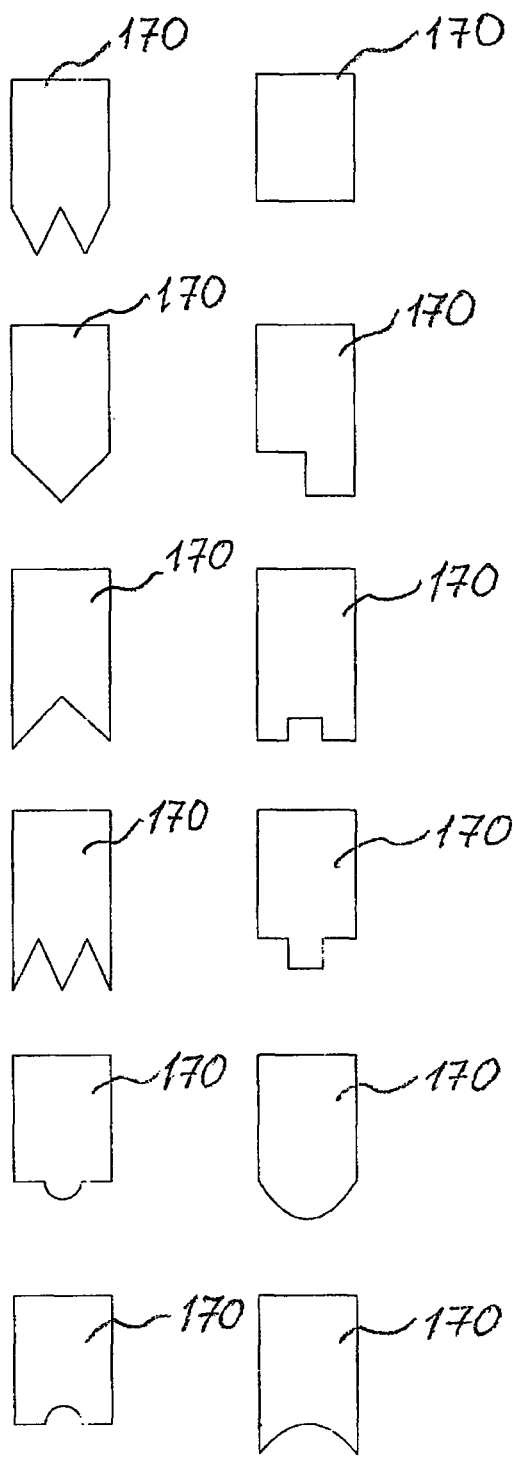
FIG. 28 is a schematic view of the pole extensions of the magnetic conductors made of the isotropic material.

Reference is now made to FIG. 28, showing design solutions of a pole extension of the magnetic conductors 115 and 125 of the magnetic conductors 113 and 123 made of the isotropic material 170.

Figure 29:
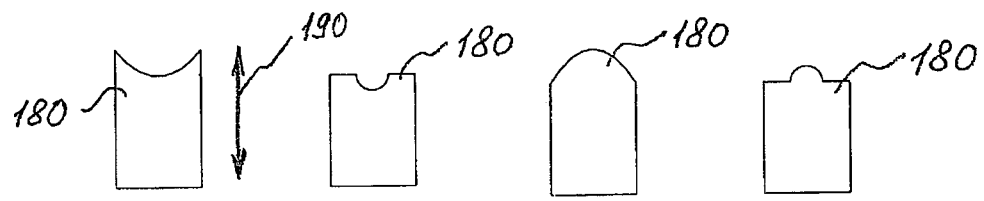
FIG. 29 is a schematic view of the pole extensions of the magnetic conductors made of the anisotropic material.
Figure 29:
Figure 29:
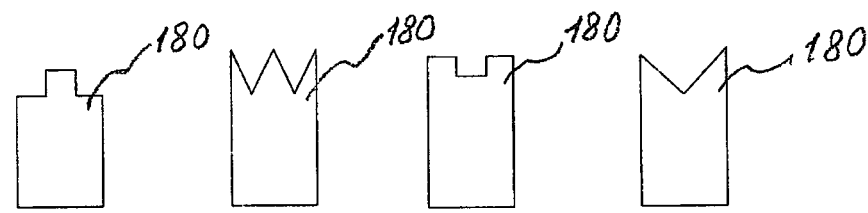
Figure 29:
Figure 29:
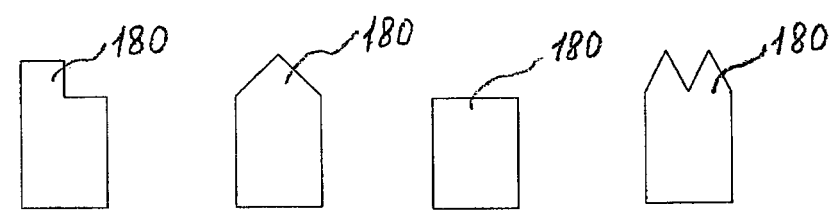
Figure 29:

Reference is now made to FIG. 29, showing design solutions of pole extensions 115 and 125 of the magnetic conductors 113 and 123 made of the anisotropic material 180.

Figure 30:
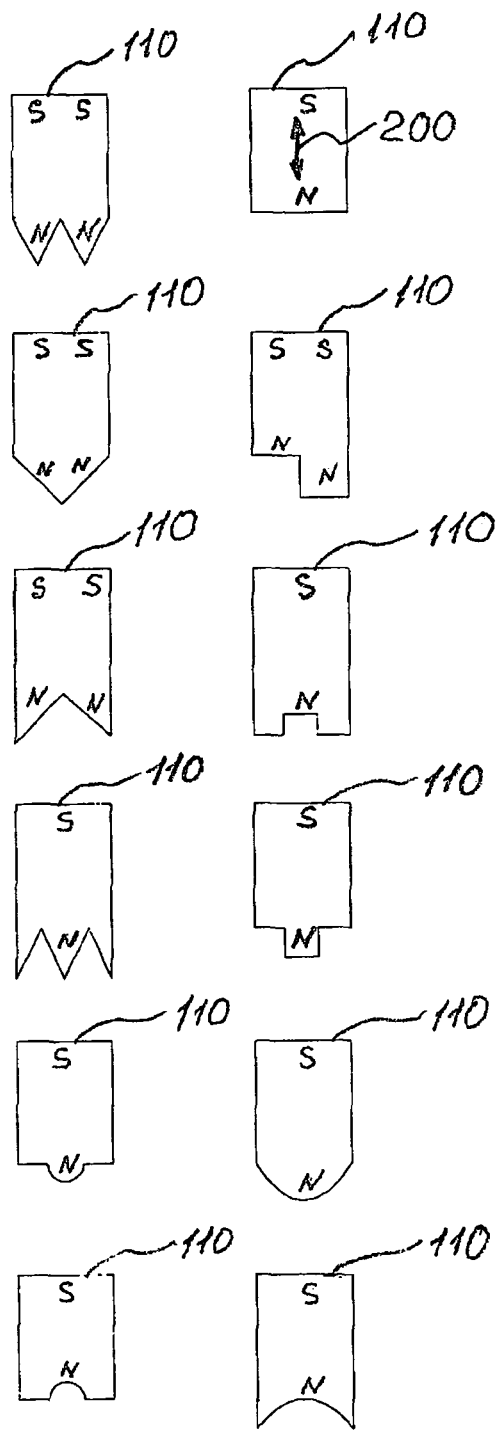
FIG. 30 is a schematic view of the pole extension of the magnetic circuits of the permanent magnet.

Reference is now made to FIG. 30, showing design solutions of a pole extension of the magnetic circuits 112 of the permanent magnet 110.

Figure 31:
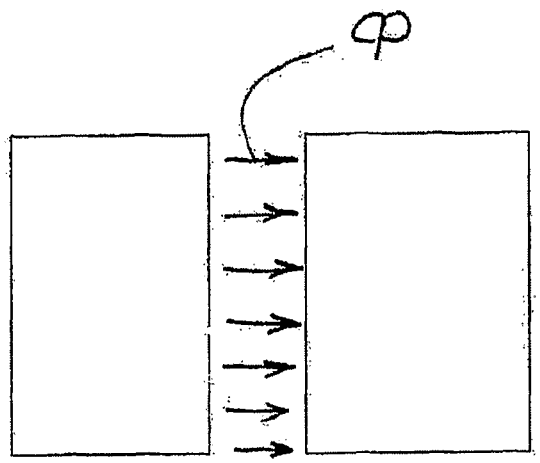
FIG. 31 is a schematic view of the pair of pole extensions with magnetic flux flowing through butt surfaces.

Reference is now made to FIG. 31, showing a design solution of a pair of pole extensions 112 or 115 and 125 in any combination thereof such that a shape of pole extensions provides conduction of the magnetic flux through butt surfaces of the aforesaid extensions.

Figure 32:
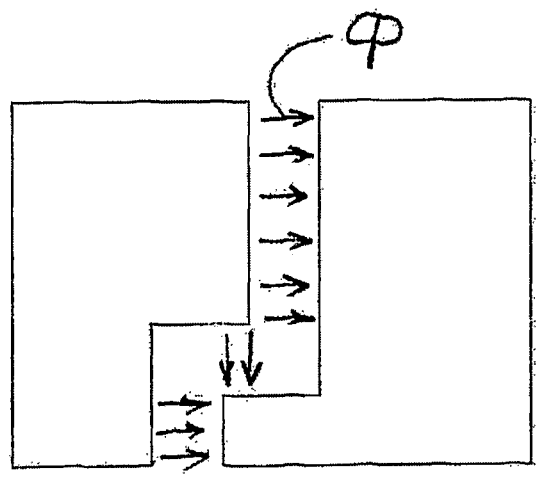
FIGS. 32 and 33 are schematic views of the pair of pole extensions with magnetic flux flowing through butt and side surfaces.
Figure 33:
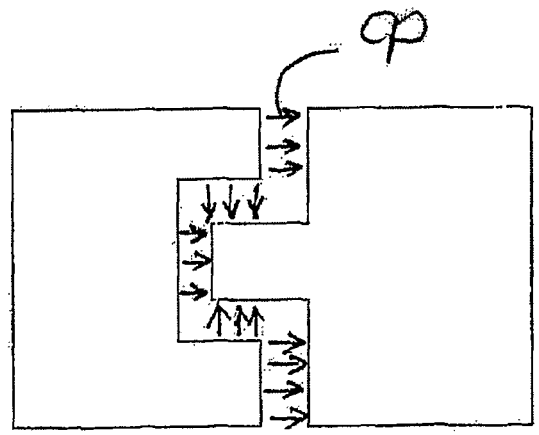

Reference is now made to FIGS. 32 and 33, showing a design solution of a pair of pole extensions 112 or 115 and 125 in any combination thereof such that a shape of pole extensions provides conduction of the magnetic flux through butt and side surfaces of the aforesaid extensions.

Figure 34:
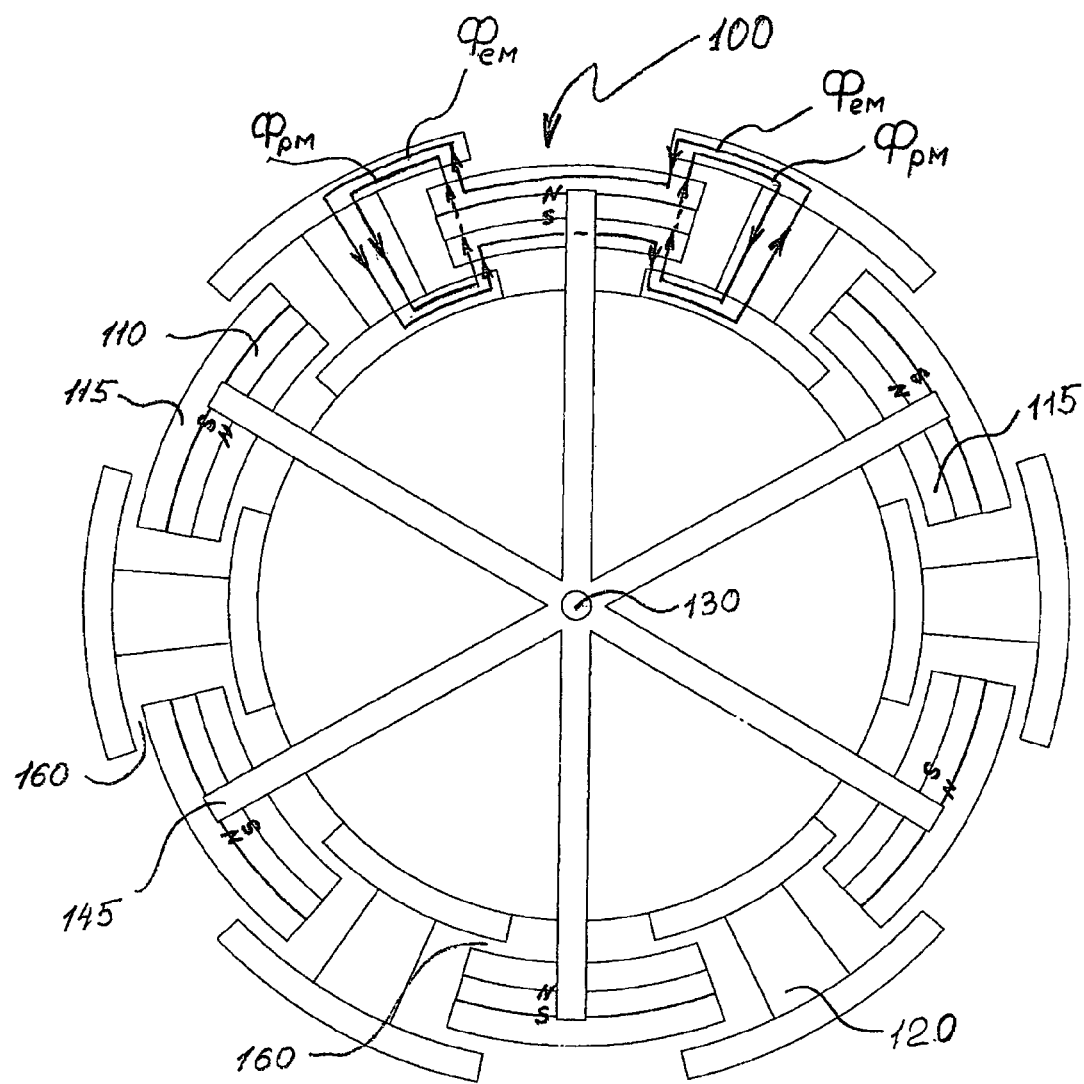
FIGS. 34 and 35 are schematic diagrams of paths of magnetic fluxes $\Phi_{em}$ and $\Phi_{pm}$ of the electrical machine provide with the electromagnets of the U-like form as magnetic sources of the first plurality and the permanent magnets the I-like form as magnetic sources of the second plurality.

Reference is now made to FIG. 34, showing paths of magnetic fluxes $\Phi_{em}$ and $\Phi_{pm}$ of the electrical machine 100. The magnetic sources of the first plurality 153 are the electromagnets 120. The magnetic sources of the second plurality 143 are the permanent magnets 110. The magnetic source 153 is shaped into a U-like form. The magnetic source 143 is shaped into an I-form and disposed inside of the magnetic source 153. The permanent magnet 110 is provided with pole extension 115 and is disposed between two electromagnets 120. A circumferential length of the pole extension 115 is longer than a distance between two neighboring electromagnets 120.

Figure 35:
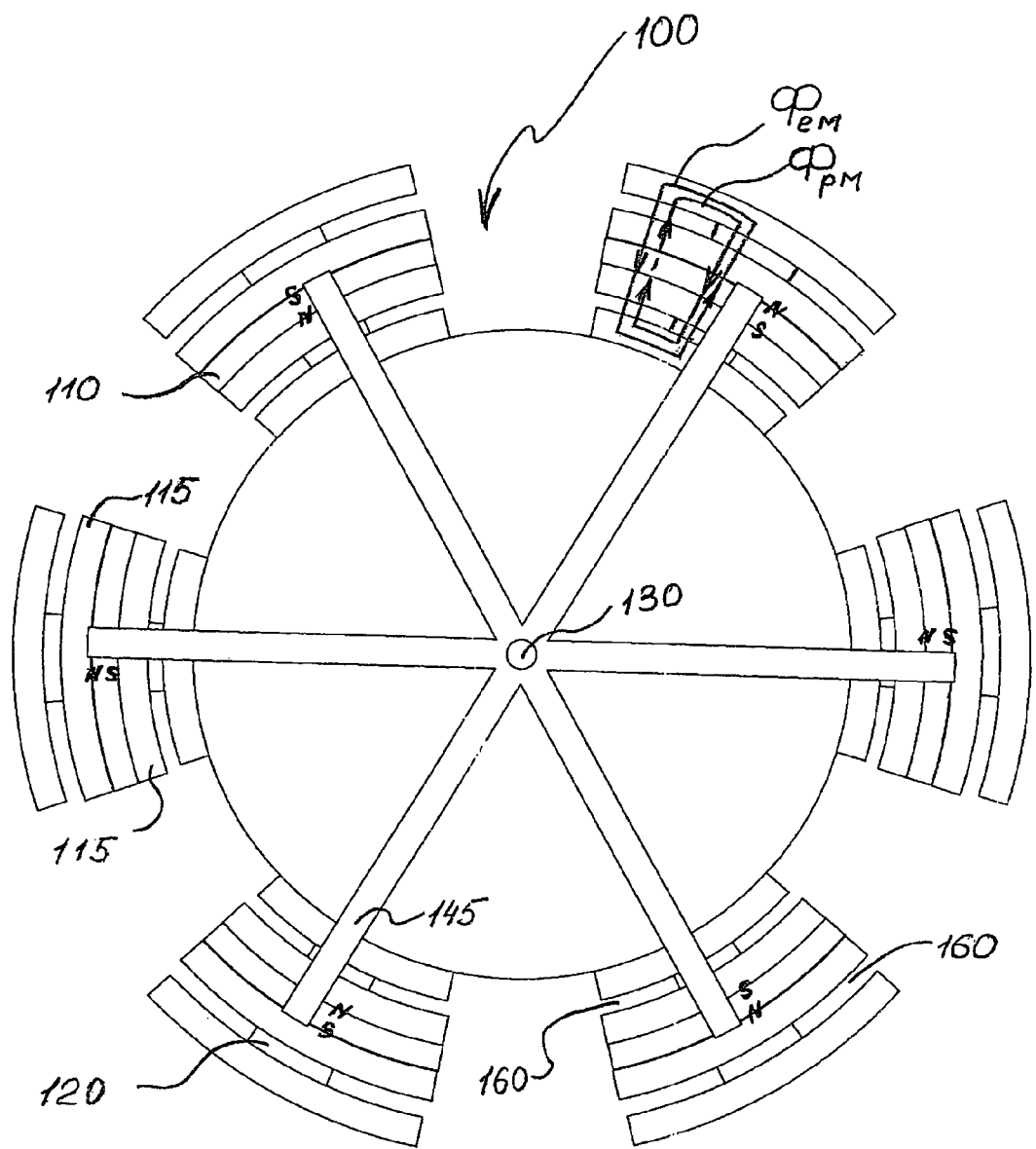

Reference is now made to FIG. 35, showing paths of magnetic fluxes $\Phi_{em}$ and $\Phi_{pm}$ of the electrical machine 100. The magnetic sources of the first plurality 153 are the electromagnets 120. The magnetic sources of the second plurality 143 are the permanent magnets 110. The magnetic source 153 is shaped into a U-like form. The magnetic source 143 is shaped into an I-form and disposed inside of the magnetic source 153. The permanent magnet 110 is provided with pole extension 115 and is disposed inside the electromagnet 120. A circumferential length of the pole extension 115 is longer than a distance between two neighboring electromagnets 120.

Figure 36:
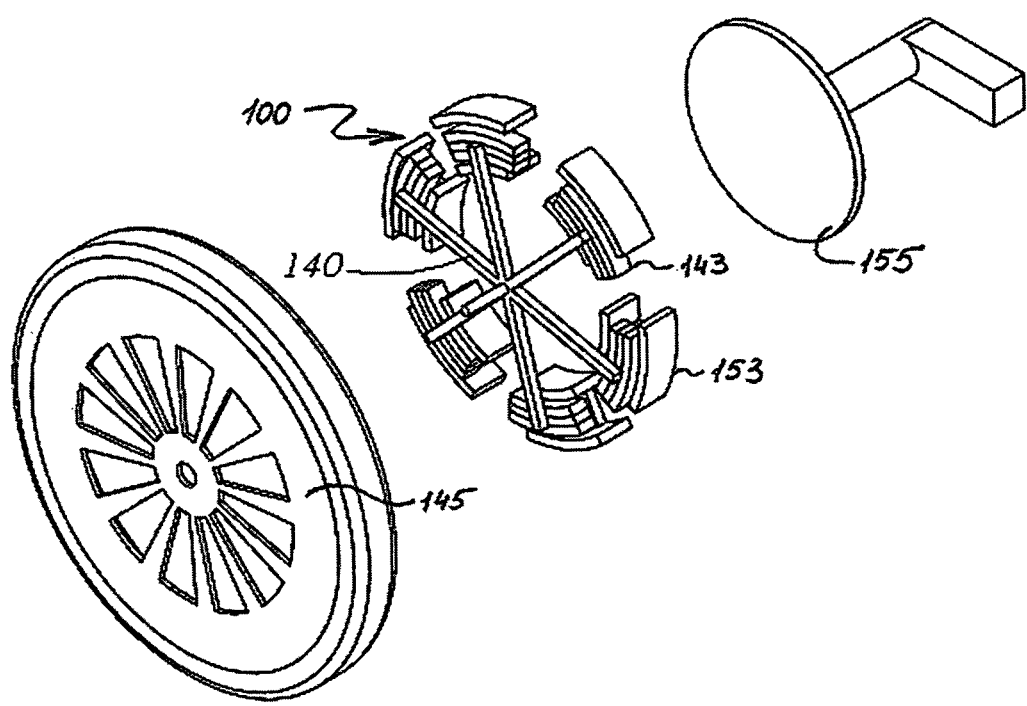
FIG. 36 is an exploded view of the electrical machine adapted for use as a motor-in-wheel.

Reference is now made to FIG. 36, showing the electrical machine 100 adapted for use as a motor-in-wheel of a vehicle. The second plurality of the magnetic field sources 143 of the rotor 140 is mechanically fixed to a wheel crown 145, while the first plurality of the magnetic field sources 153 of stator 150 is mechanically fixed to a vehicle body (stator disk 155).

Figure 37:
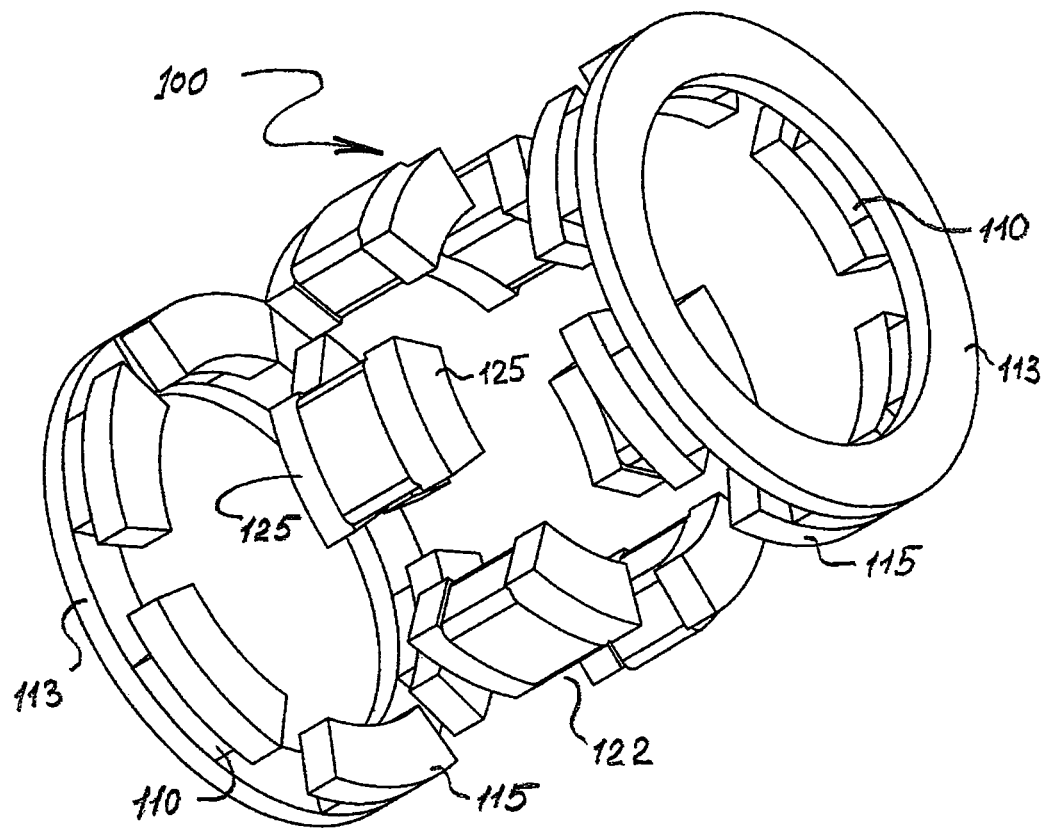
FIG. 37 is an isometric view of the electrical machine provided with electromagnet coil axes parallel to the rotor axis.

Reference is now made to FIG. 37, presenting the electrical machine which is provided with the coils 122 of the electromagnets 120 (not marked). Axes of the aforesaid coils 122 are parallel to the rotational axis of the rotor (not shown). Electromagnets 120 belong to the first plurality of the magnetic field sources 153 of the stator 150 (not shown). The permanent magnets 110 fixed to the magnetic conductors 113 and provided with pole extensions 115 belong to the second plurality of magnetic field sources 143 (not marked) of the rotor 140 (not shown).

Figure 38:
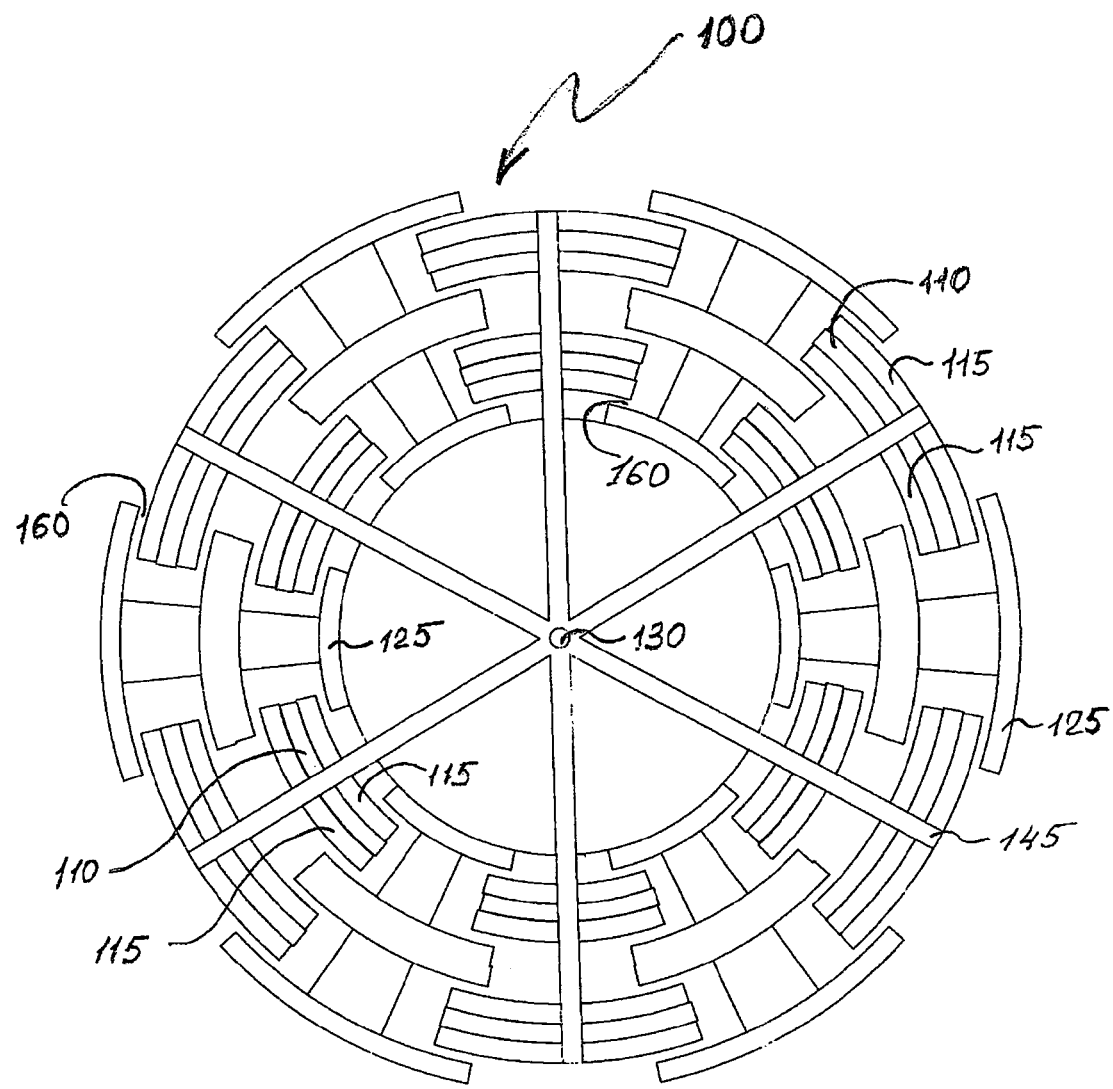
FIGS. 38 and 39 are schematic views of the electrical machine having two layers.
Figure 39:
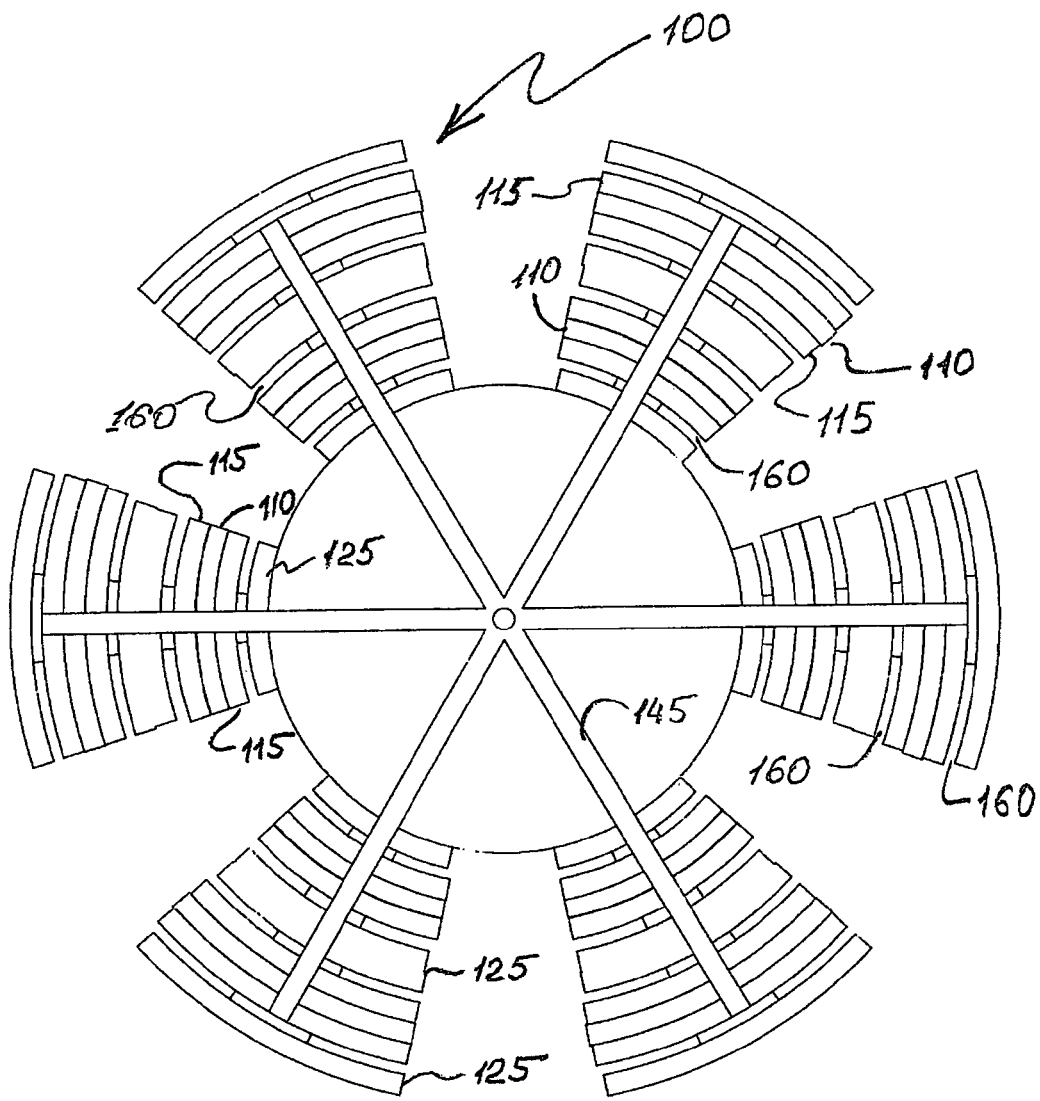

Reference is now made to FIGS. 38-39, presenting the electrical machine 100 having two layers. Both layers are provided with an equal number of the magnet sources (2p=6).

Figure 40:
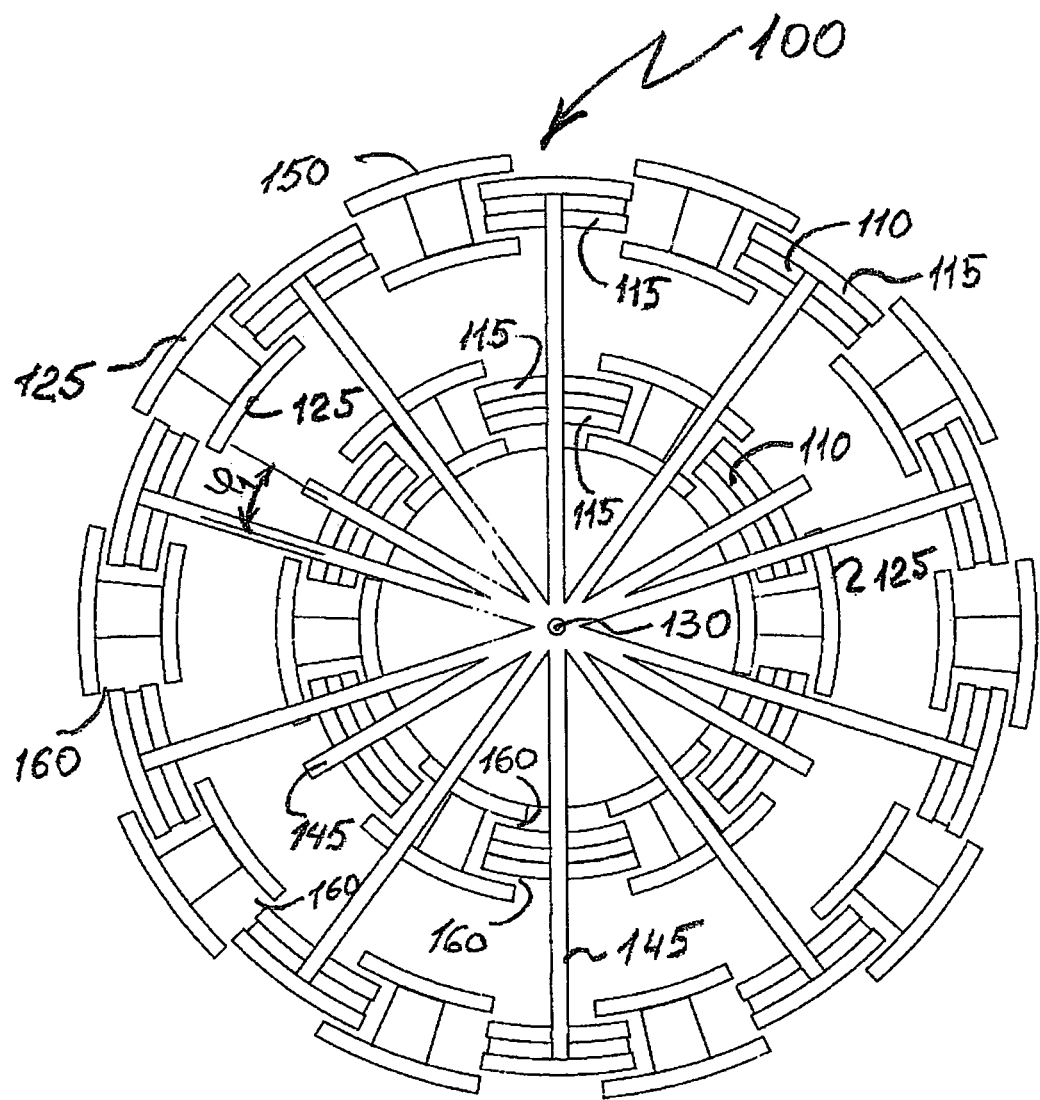
FIG. 40 is a schematic view of the electrical machine having two layers angularly displaced one relative to another with variable pole number.

Reference is now made to FIG. 40, presenting the electrical machine 100 having two layers angularly displaced one relative to another through $\phi_1$. A first layer proximately disposed to the shaft axis 130 has 2p=6, the second layer has 2p=10.

Figure 41:
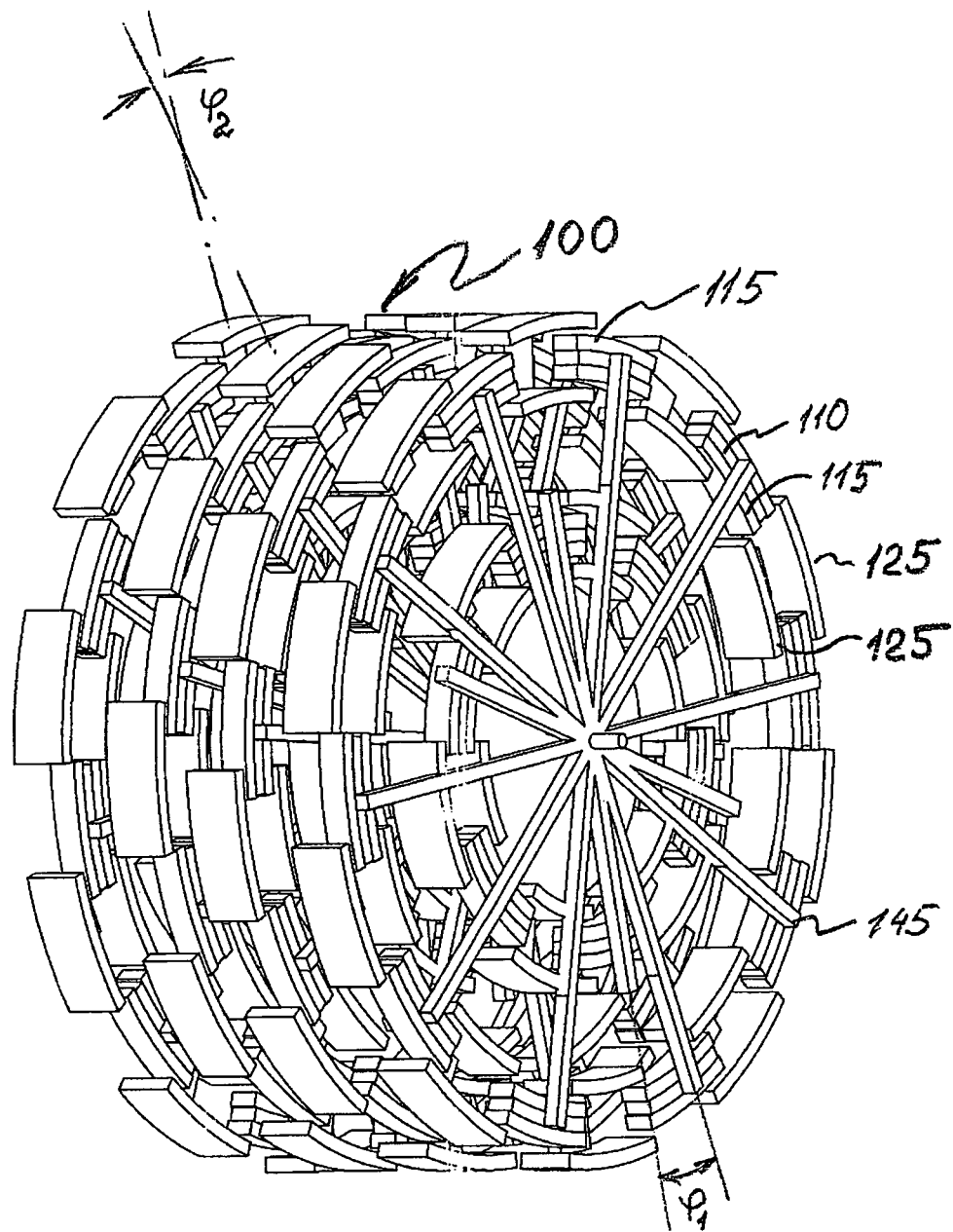
FIGS. 41, 42 and 43 are schematic views of the electrical machine having two sections angularly displaced one relative to another.

Reference is now made to FIG. 41, presenting the electrical machine 100 having four sections angularly displaced one relative to another through $\phi_2$. Each section is provided with two layers presented in FIG. 40.

Figure 42:
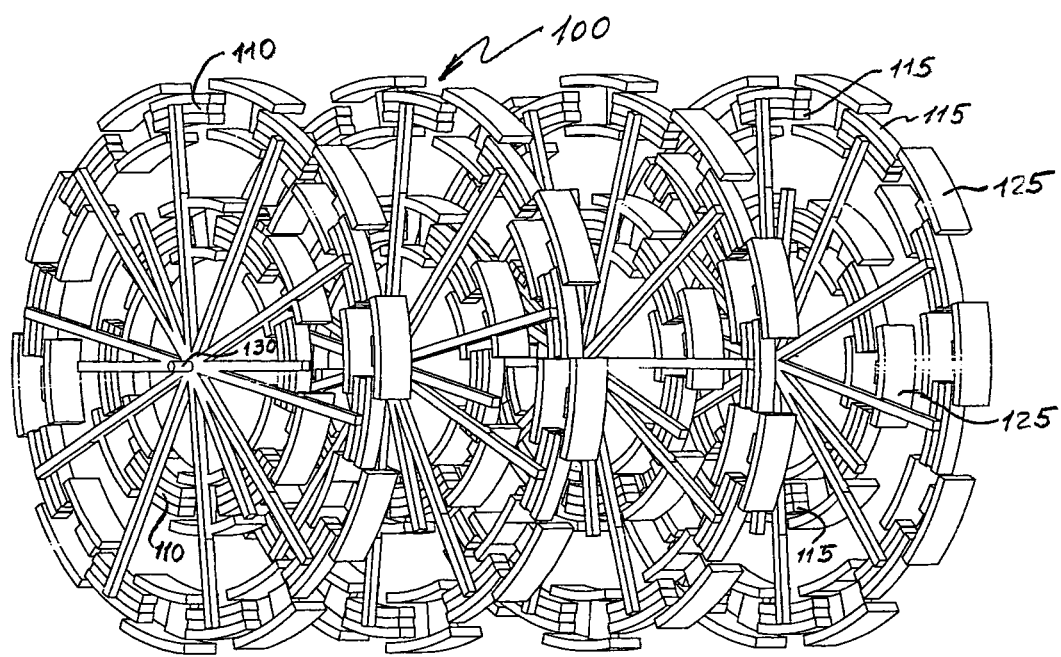

Reference is now made to FIG. 42, presenting the electrical machine 100 presented in FIG. 41. The sections are spaced apart therebetween along the shaft axis 130.

Figure 43:
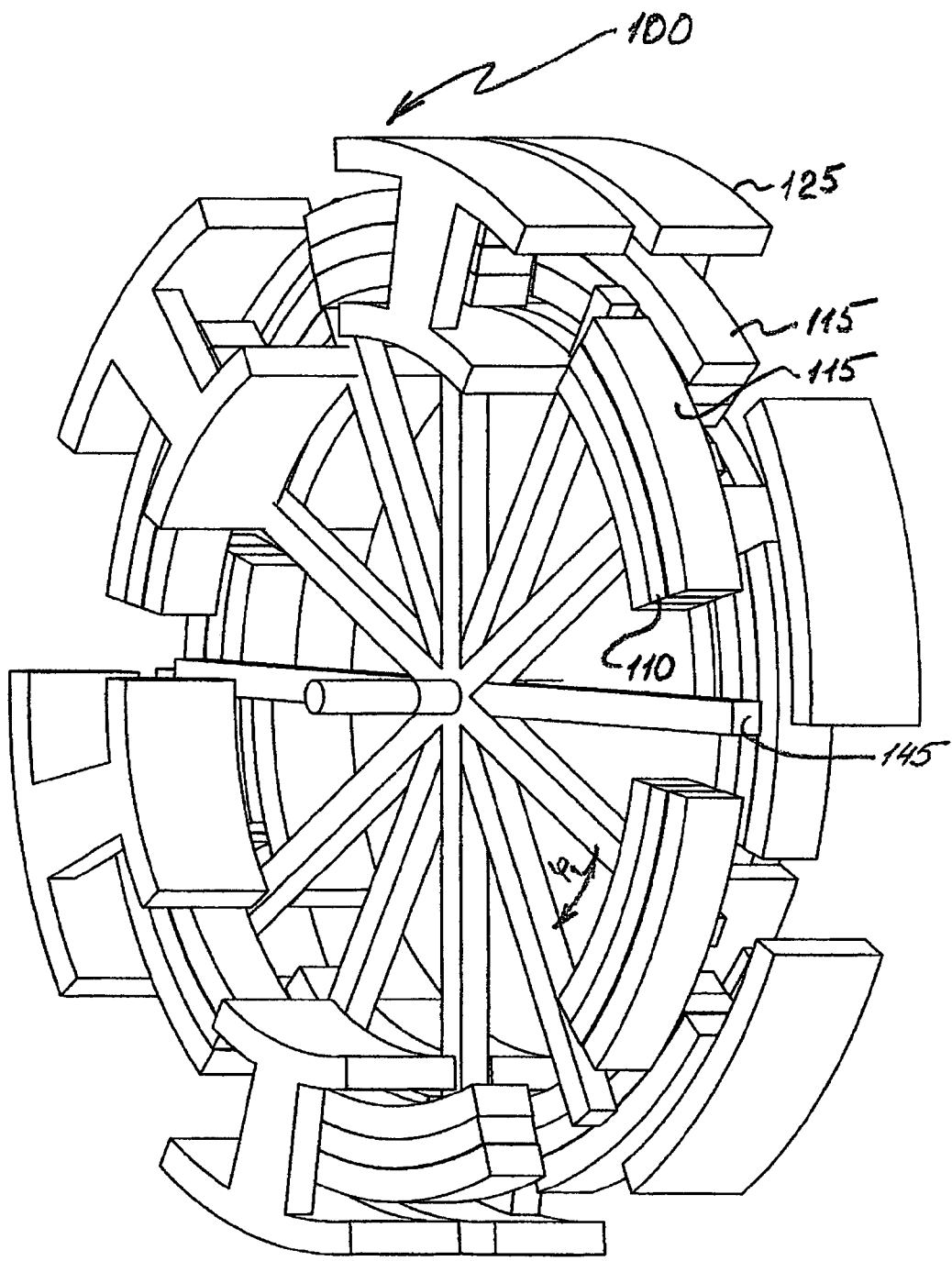

Reference is now made to FIG. 43, presenting the electrical machine provided with magnetic field sources of the second plurality 143 (not marked) which are mechanically connected at both sides of rotor elements 145. The magnetic sources disposed at different sides of the elements 145 are angularly displaced from each other. The angular displacement $\phi_1$ equals to $\tau/m$, where $\tau$ is a value of a polar pitch, m equals to 2 (section number). To simplify understanding of the present embodiment, in FIG. 43, two electromagnets are not shown.

Figure 44:
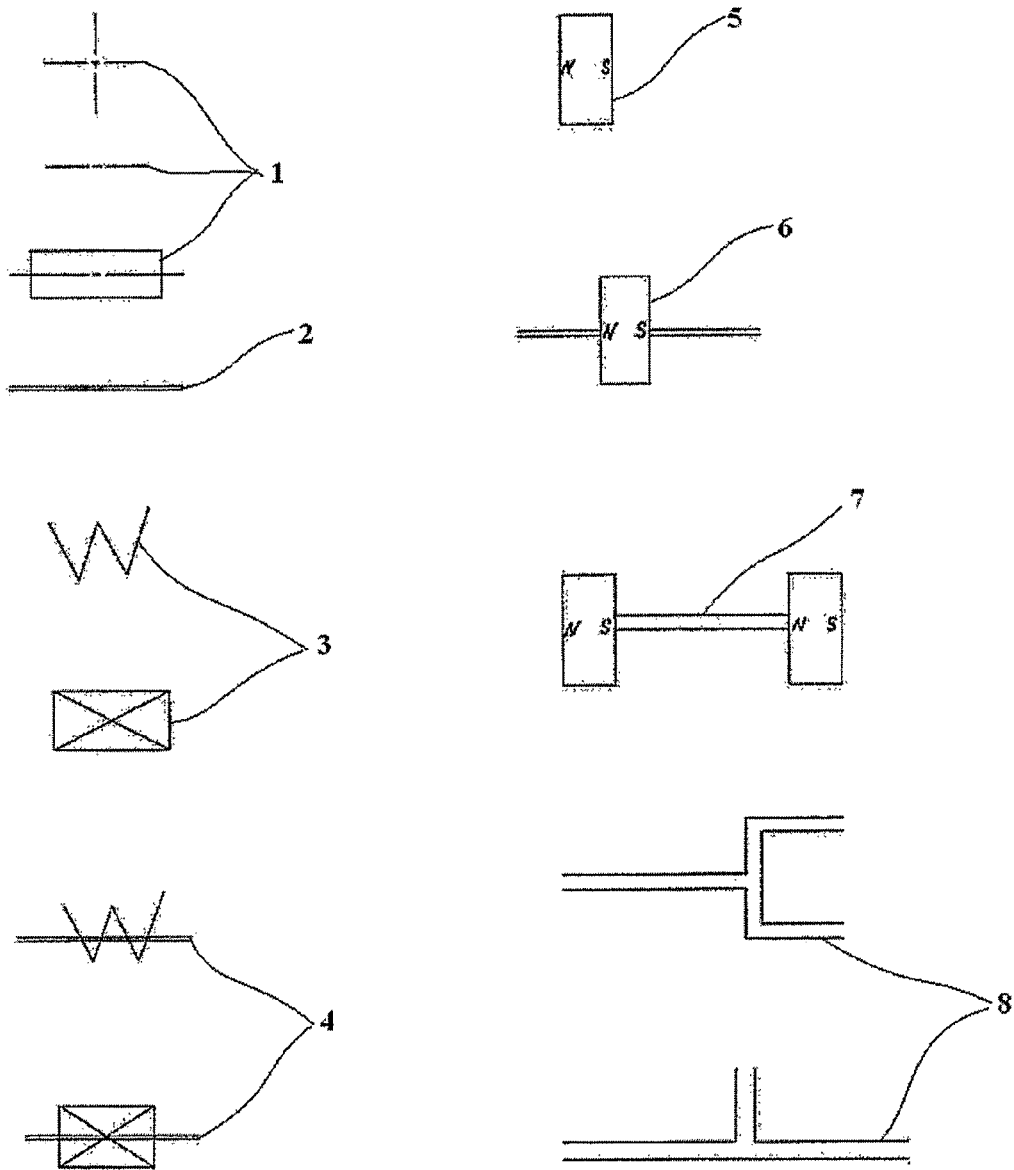
FIGS. 44 to 104 are schematic diagrams of the magnetic circuits of the electrical machine.

Reference is now made to FIG. 44, presenting symbol legend used for depicting magnetic circuits in the electrical machine. Specifically, the numeral 1 refers to an axis of a electrical machine shaft, 2 to a magnetic conductor, 3 to an electromagnet coil, 4 to an electromagnet coil provided with a core, 5 to a permanent magnet, 6 to a permanent magnet provided with polar extensions, 7 to permanent magnets interconnected by a magnetic conductor, 8 to a magnetic conductor provided with polar extensions.

Figure 45:
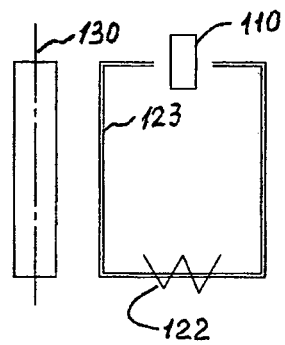
Figure 104:
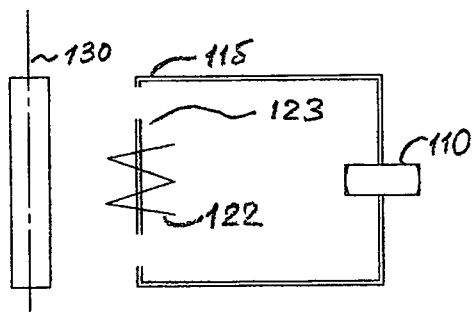

Reference is now made to FIGS. 45 to 104, presenting diagrams of magnetic circuits in the electrical machine 100 and spatial arrangements of the magnetic field sources 153 and 143 of the first and second pluralities, respectively, relative to the shaft axis 130. The magnetic field sources 153 and 143 comprise electromagnets 120 and permanent magnets 110.

Reference is now made to FIGS. 45-49 and 93-104, presenting diagrams of the magnetic circuits in the electrical machine 100, wherein the magnetic field sources are independent of each other.

Figure 47:
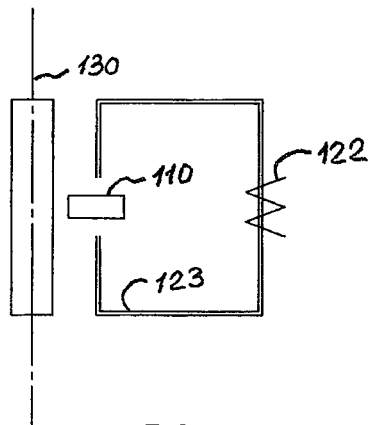
Figure 48:
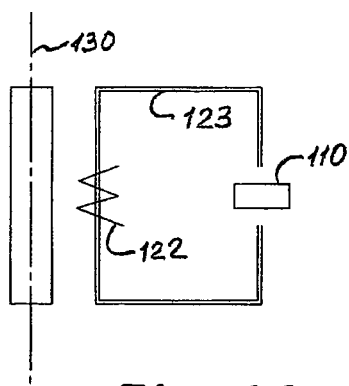

FIGS. 47 and 48 present diagrams of the magnetic circuits in the electrical machine 100, wherein axes of magnetization 200 of the magnetic field sources 143 and 153 are parallel to the rotor axis 130.

Figure 46:
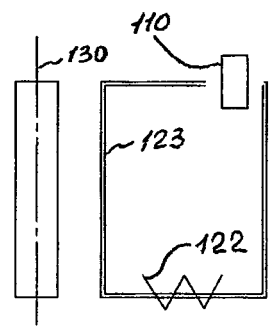
Figure 49:
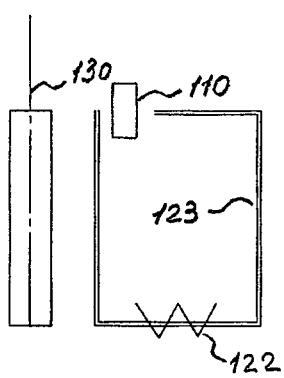
Figure 57:
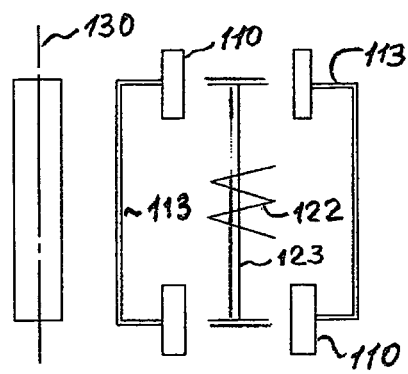
Figure 55:
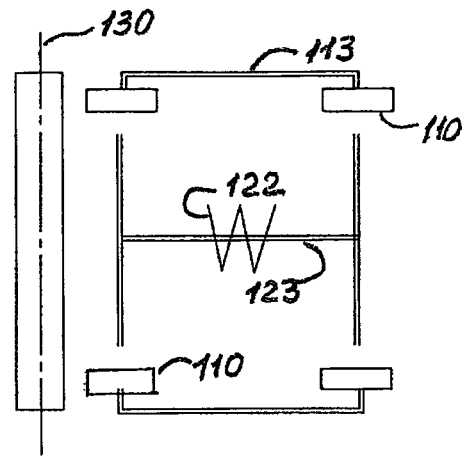

FIGS. 45 and 46 present diagrams of the magnetic circuits in the electrical machine 100, wherein axes of magnetization 200 of the magnetic field sources 143 and 153 are radially directed to the rotor axis 130.

Figure 74:
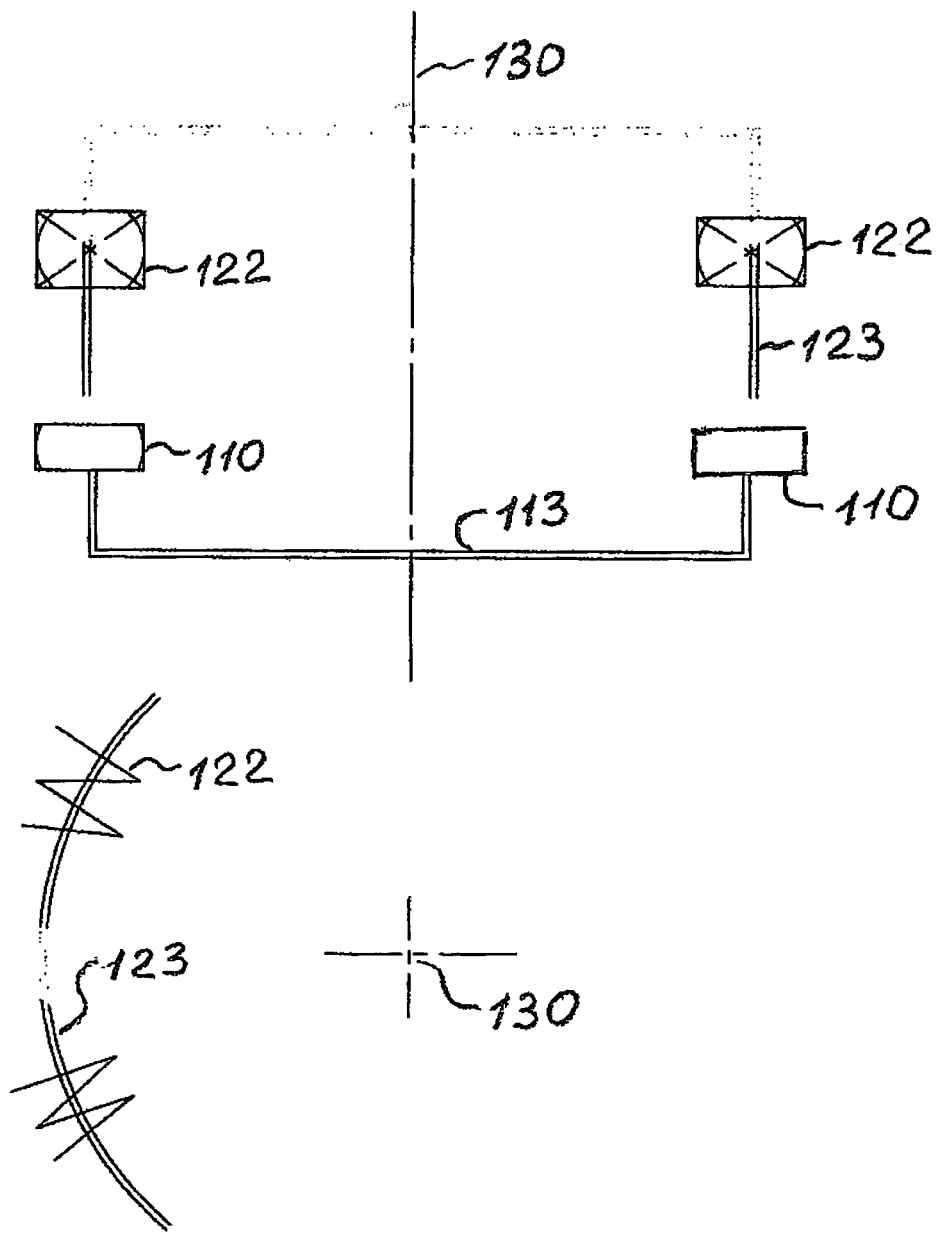
Figure 75:
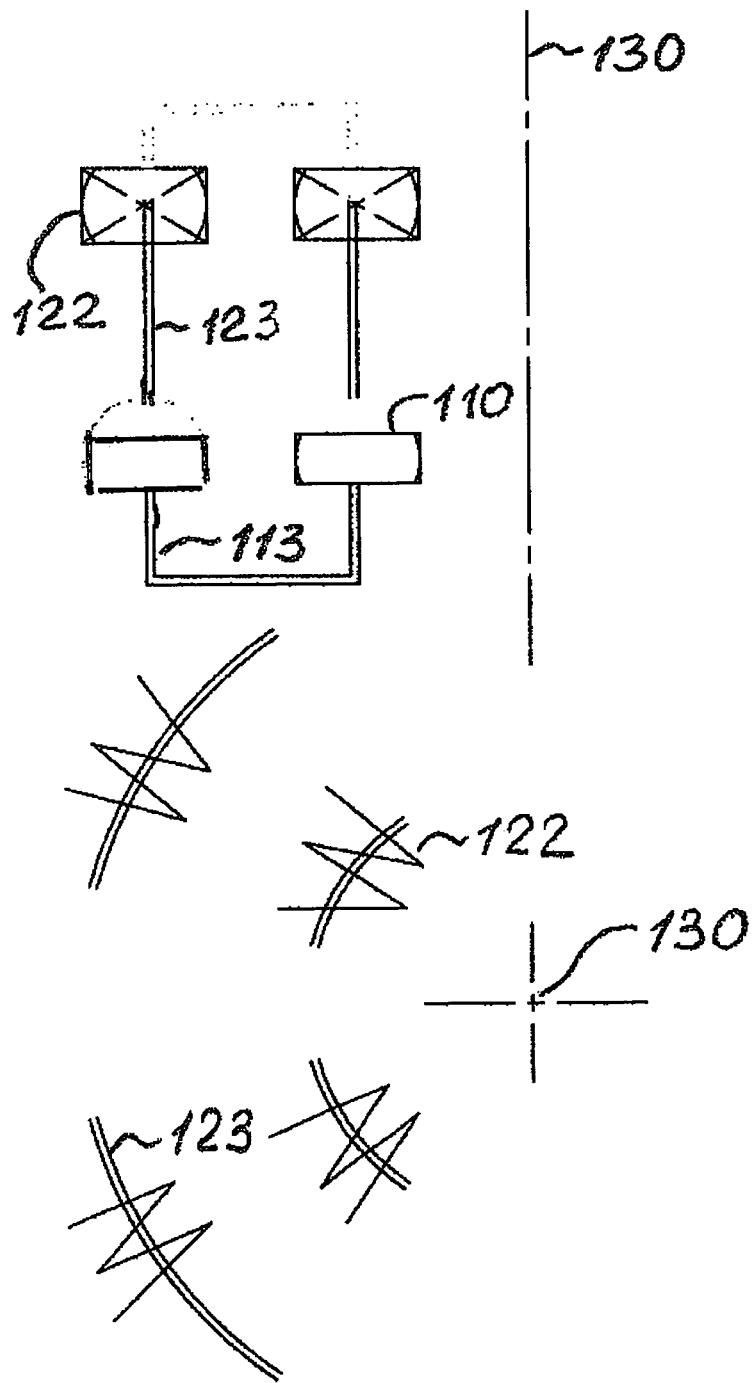
Figure 76:
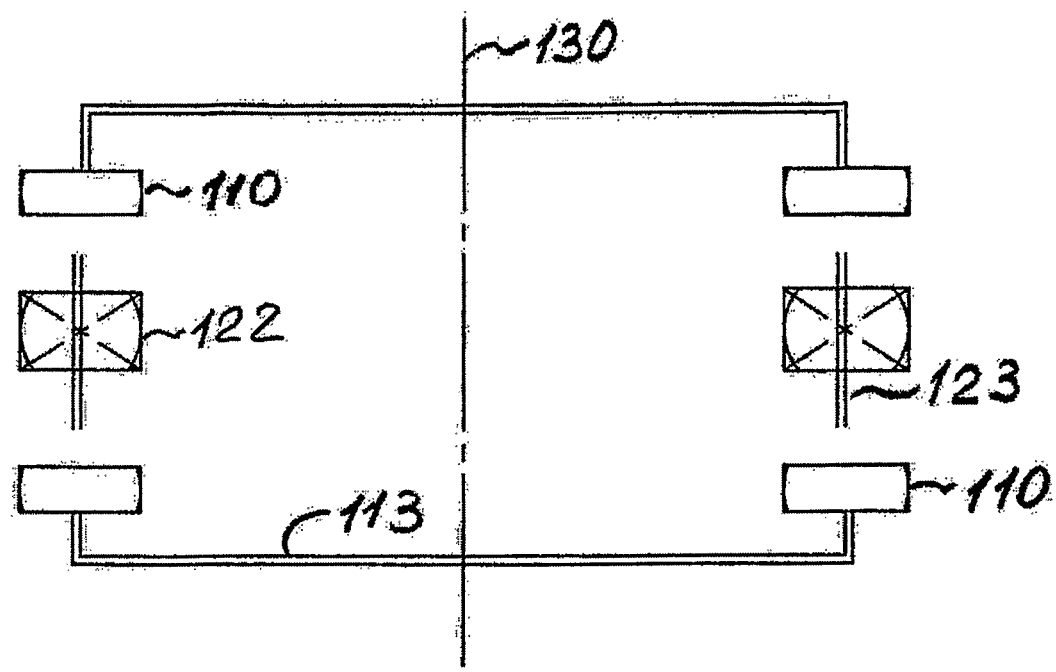
Figure 76:
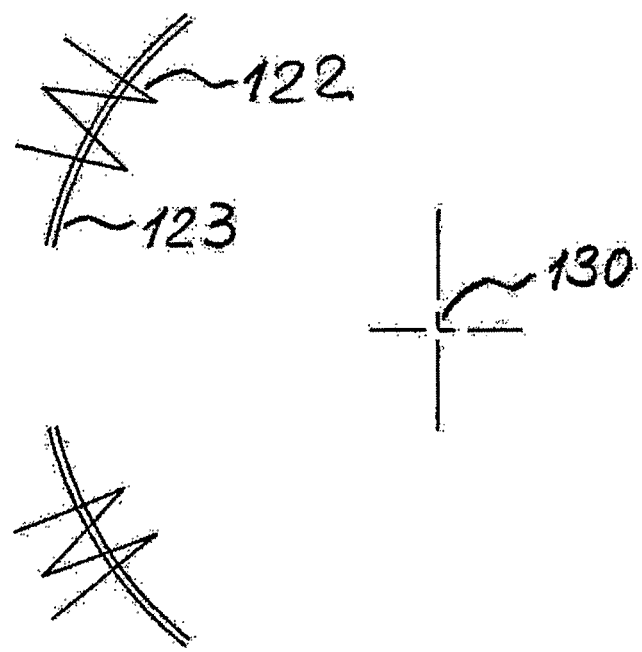
Figure 77:
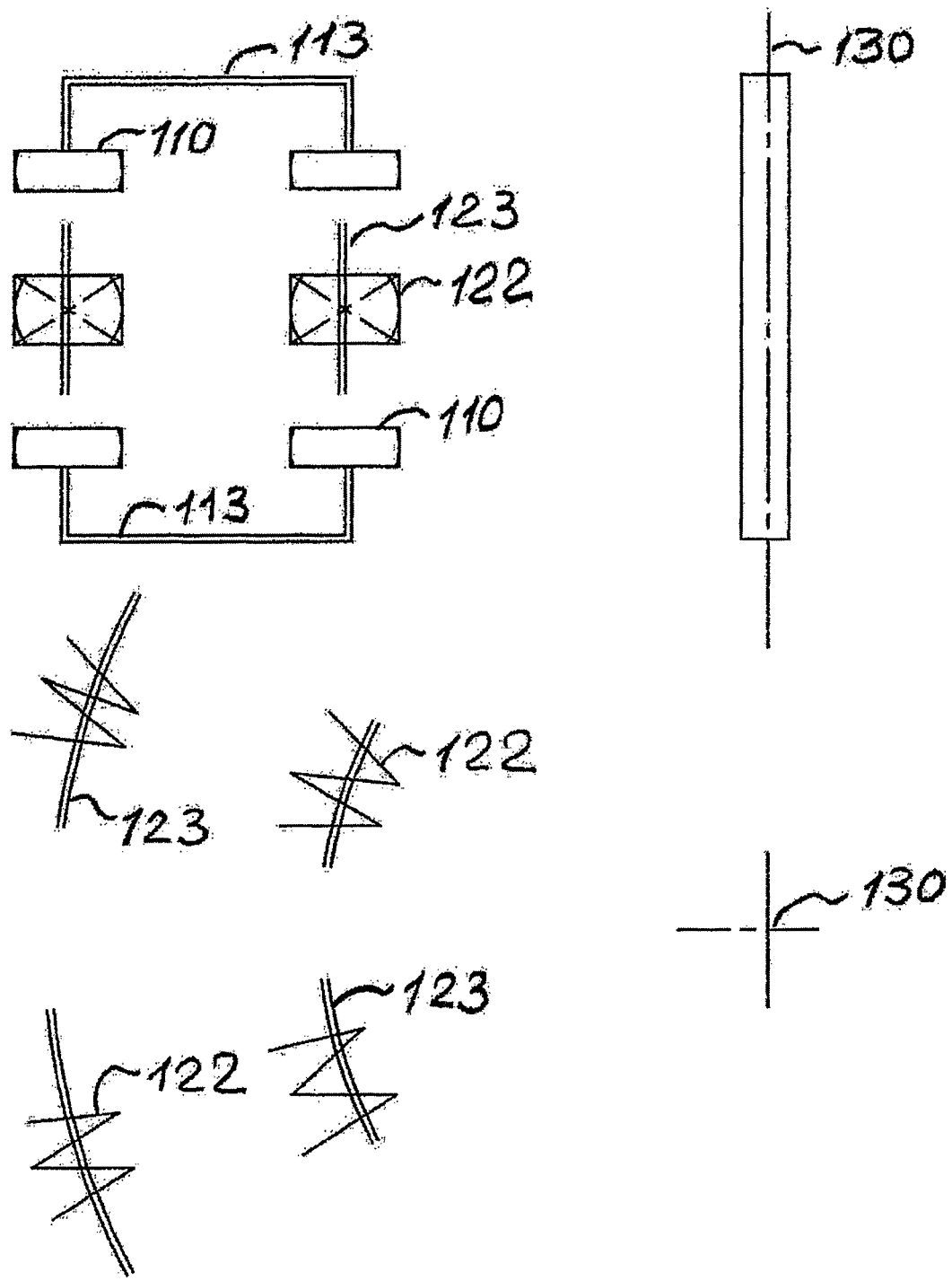
Figure 78:
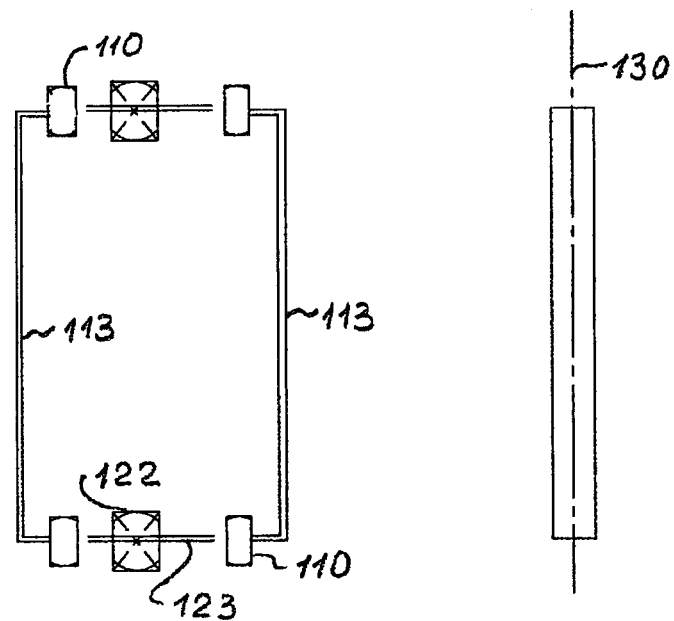
Figure 78:
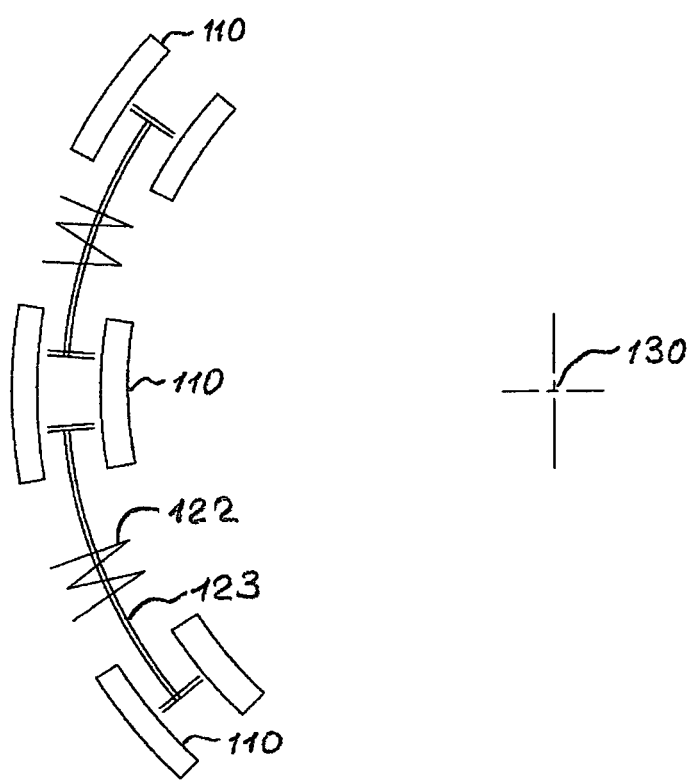
Figure 79:
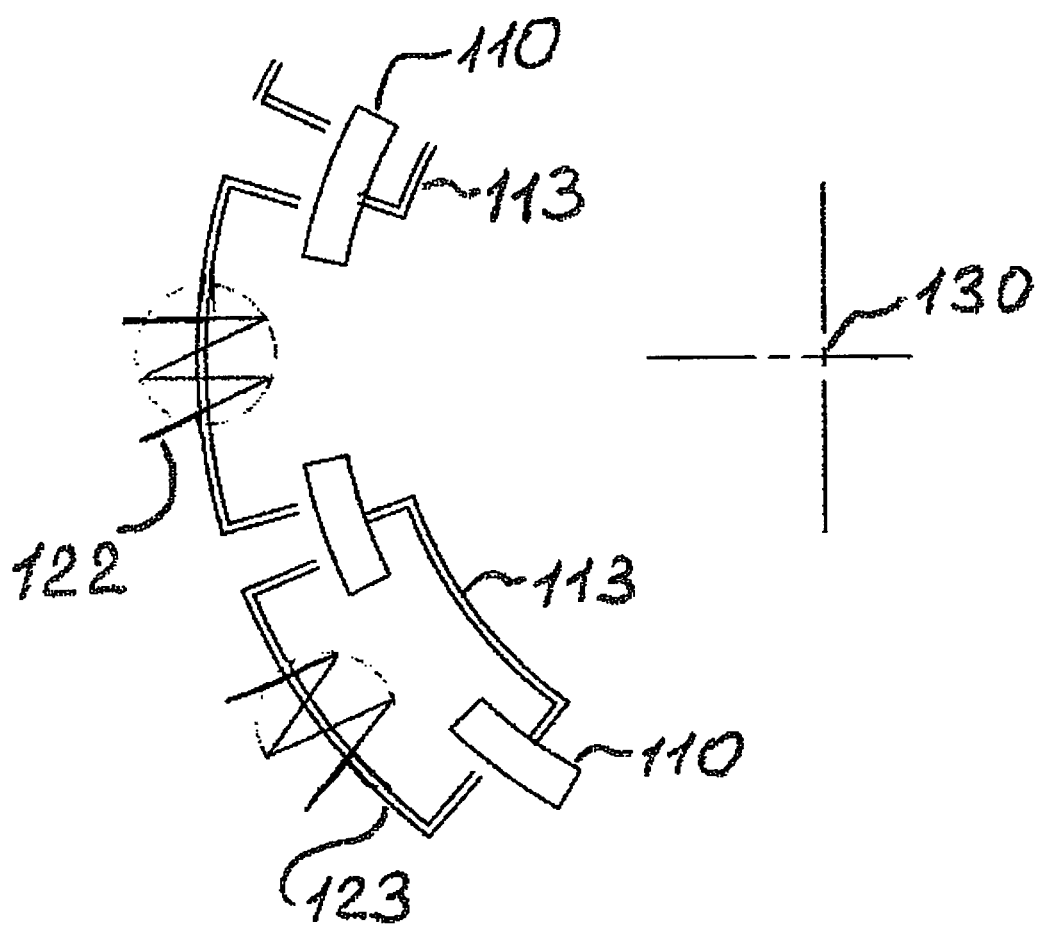
Figure 80:
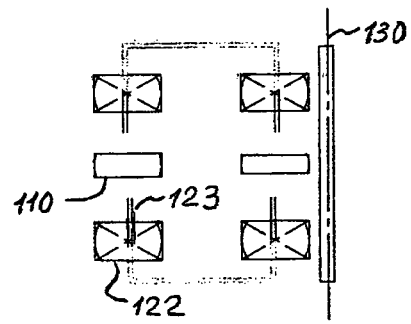
Figure 80:
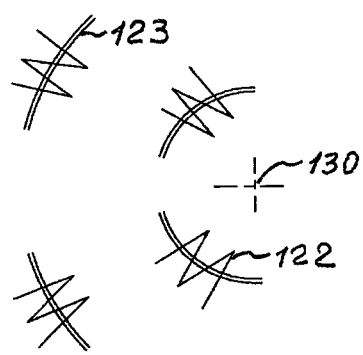
Figure 81:
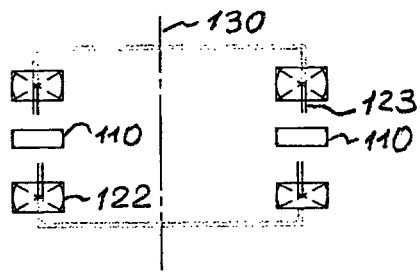
Figure 81:
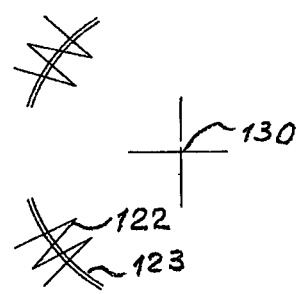
Figure 82:
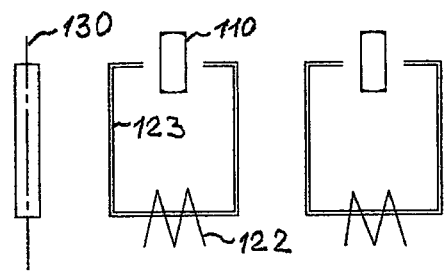
Figure 84:
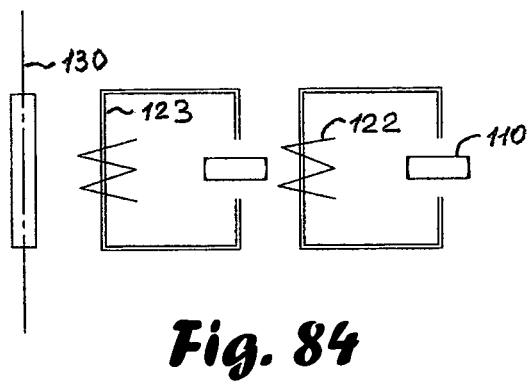
Figure 83:
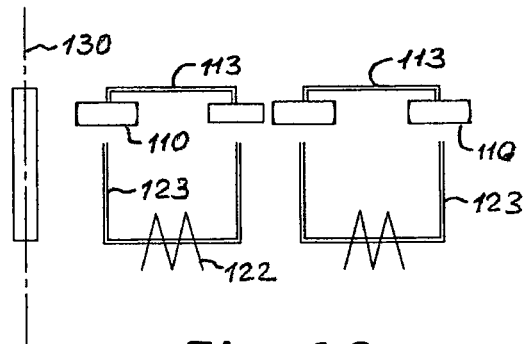
Figure 85:
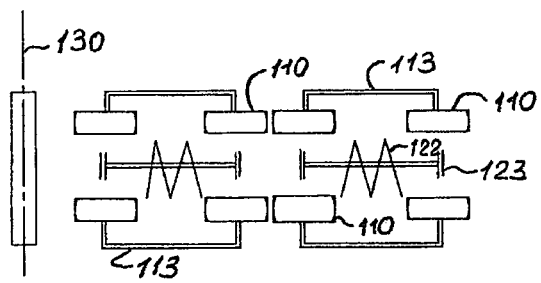
Figure 86:
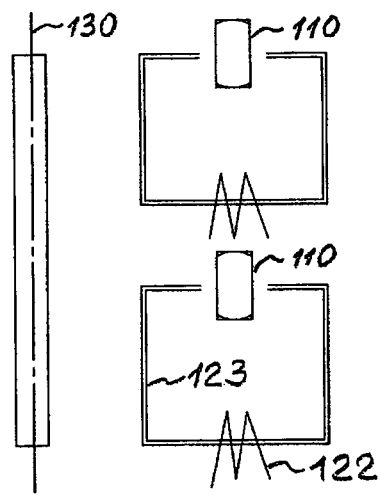
Figure 88:
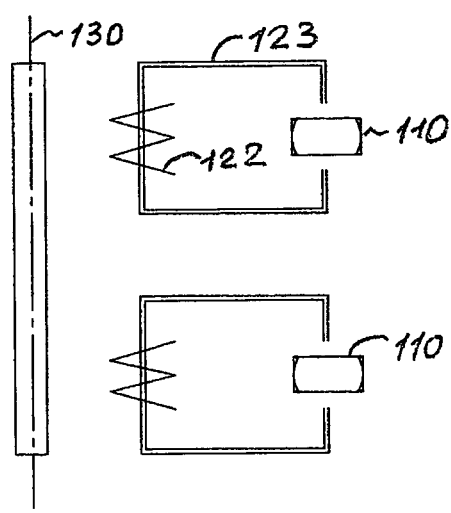
Figure 87:
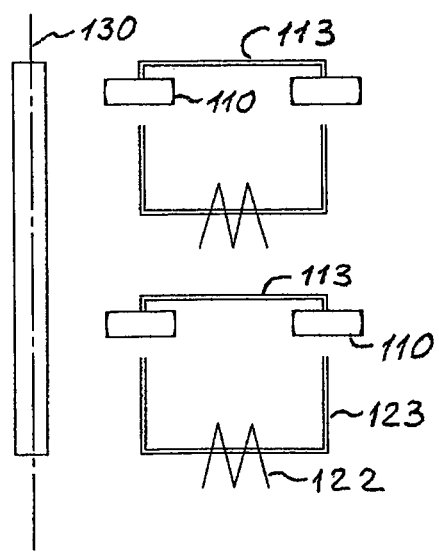
Figure 89:
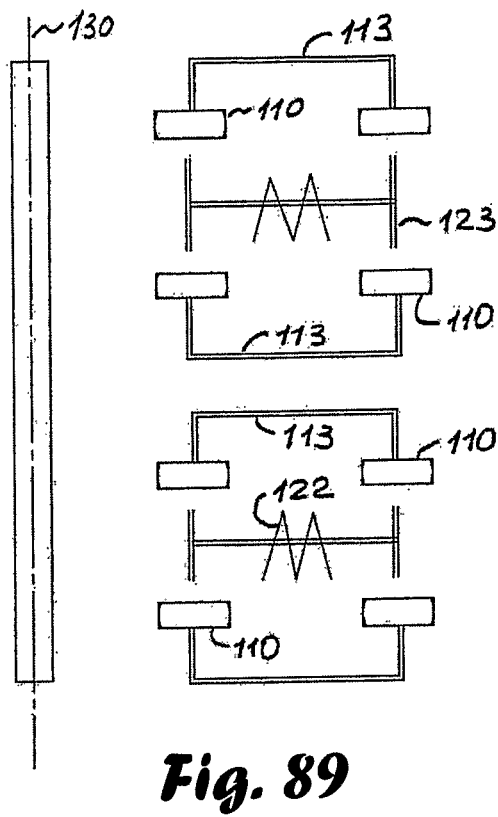
Figure 90:
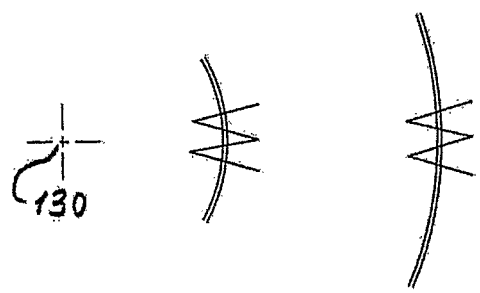
Figure 90:
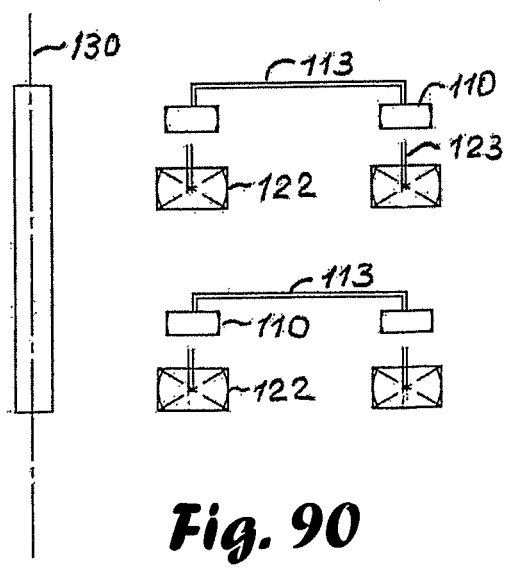

FIGS. 74 and 75 present diagrams of the magnetic, circuits in the electrical machine 100, wherein axes of magnetization 200 of the magnetic field sources 153 are circularly-oriented in a plane which is perpendicular to the rotor axis 130.

FIGS. 45-49 present diagrams of the magnetic circuits in the electrical machine 100, wherein axes of magnetization 200 of the magnetic field sources 143 and 153 are parallel.

FIGS. 50-54 present diagrams of the magnetic circuits in the electrical machine 100, wherein axes of magnetization 200 of the magnetic field sources 143 and 153 are perpendicular.

Figure 71:
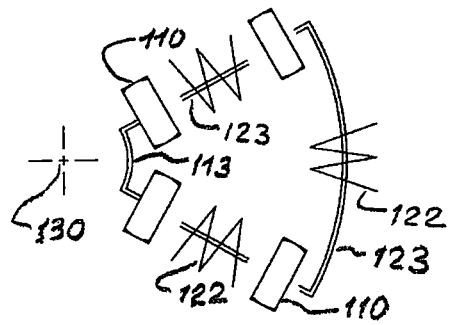

FIG. 71 present diagrams of the magnetic circuits in the electrical machine 100, wherein axes of magnetization 200 of the magnetic field sources 143 and 153 are parallel and perpendicular, respectively.

FIGS. 45 to 49 present diagrams of the magnetic circuits in the electrical machine 100, wherein the magnetic field sources 143 and are disposed inside the magnetic field sources 153.

Figure 58:
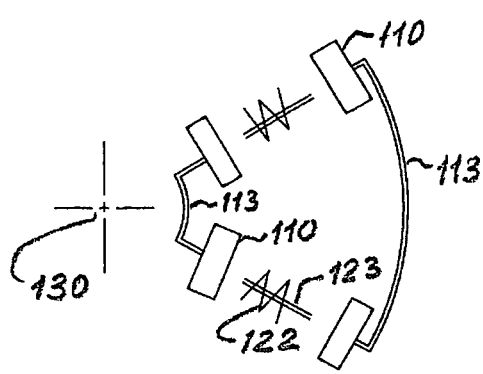
Figure 56:
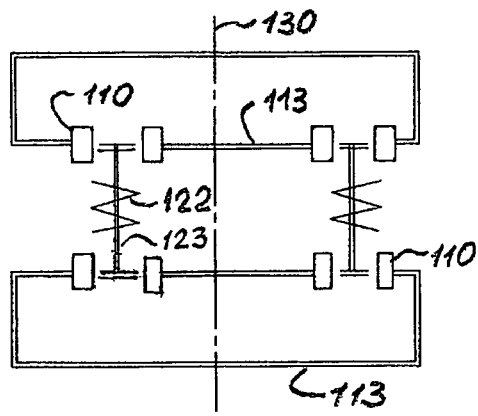
Figure 61:
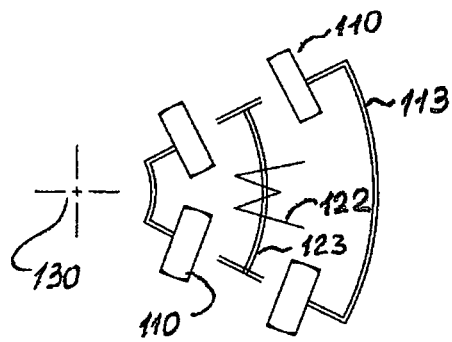
Figure 59:
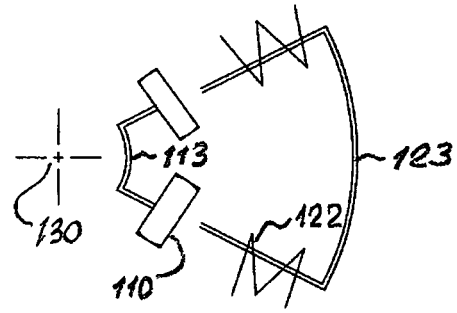
Figure 62:
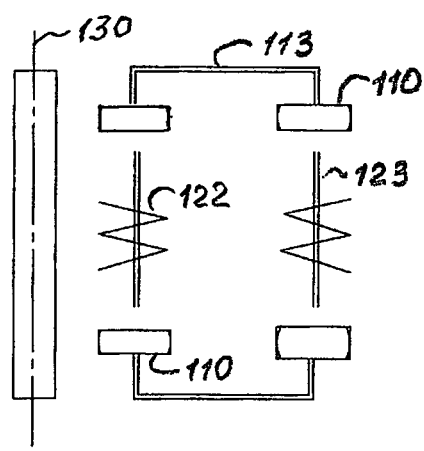
Figure 60:
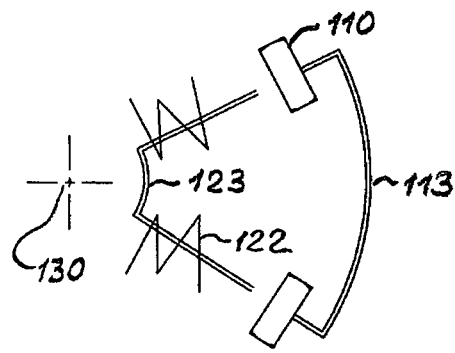
Figure 63:
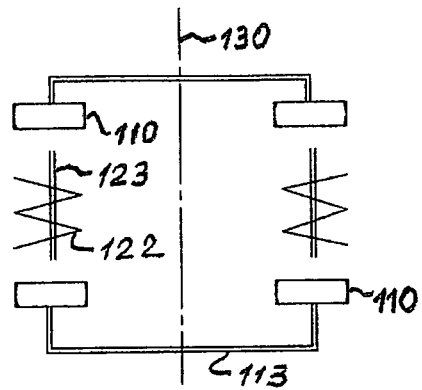
Figure 65:
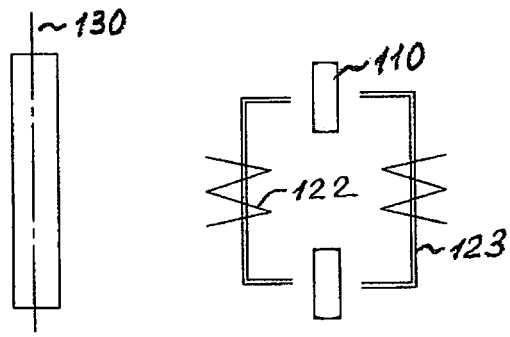
Figure 64:
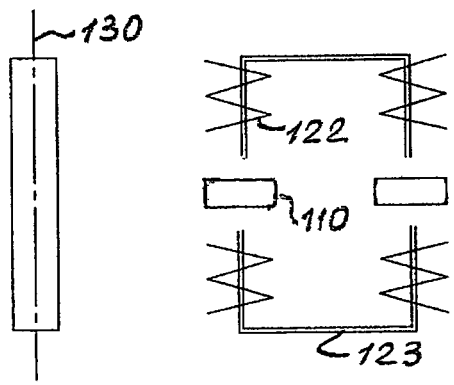
Figure 66:
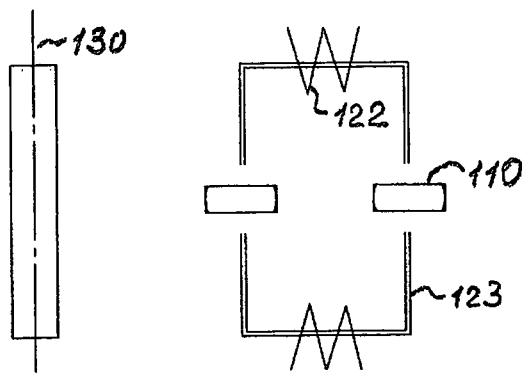
Figure 72:
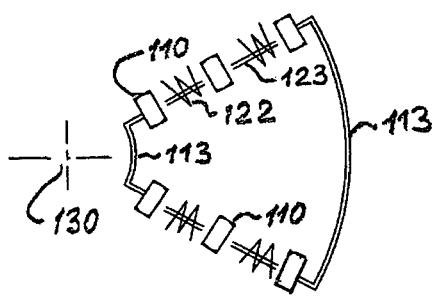
Figure 70:
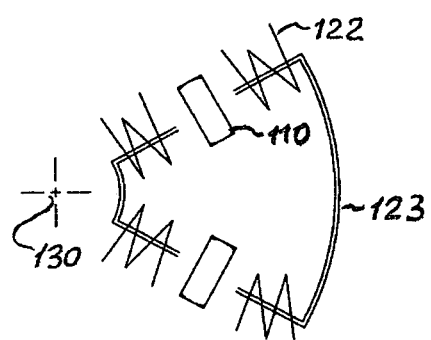
Figure 73:
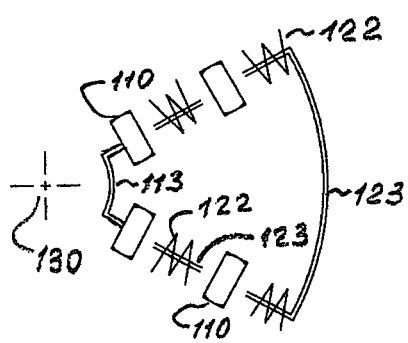

FIGS. 58 and 63 present diagrams of the magnetic circuits in the electrical machine 100, wherein the magnetic field sources 153 and are disposed inside the magnetic field sources 143.

FIGS. 46, 48 and 51 present schemes of the magnetic circuits in the electrical machine 100 adapted for use as an electrical motor.

FIGS. 47, 49, 50 and 54 present schemes of the magnetic circuits in the electrical machine 100 adapted for use as an electrical generator.

FIGS. 93 to 104 present schemes of the magnetic circuits in the electrical machine 100, wherein the permanent magnet 110 is provided with the polar extensions 115.

FIGS. 97 to 104 present schemes of the magnetic circuits in the electrical machine 100, wherein the magnetic flux passes through the air gap between the flat surfaces of the magnetic conductors.

FIGS. 93 to 96 present schemes of the magnetic circuits in the electrical machine 100, wherein the magnetic flux passes through the air gap between the three-dimensionally configured surfaces of the magnetic conductors.

FIGS. 75, 77, and 82-85 present schemes of the magnetic circuits in the electrical machine 100, wherein the aforesaid circuits are configured as layers.

FIGS. 86 to 89 present schemes of the magnetic circuits in the electrical machine 100, wherein the aforesaid circuits are configured as sections.

Figure 91:
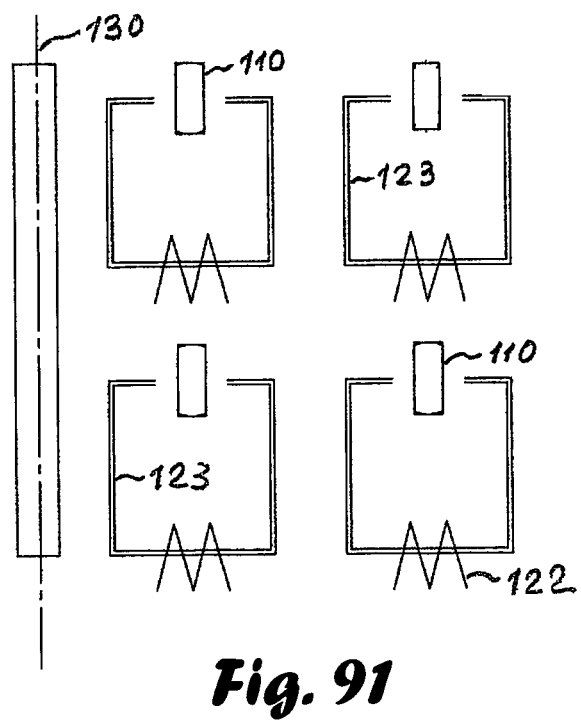
Figure 92:
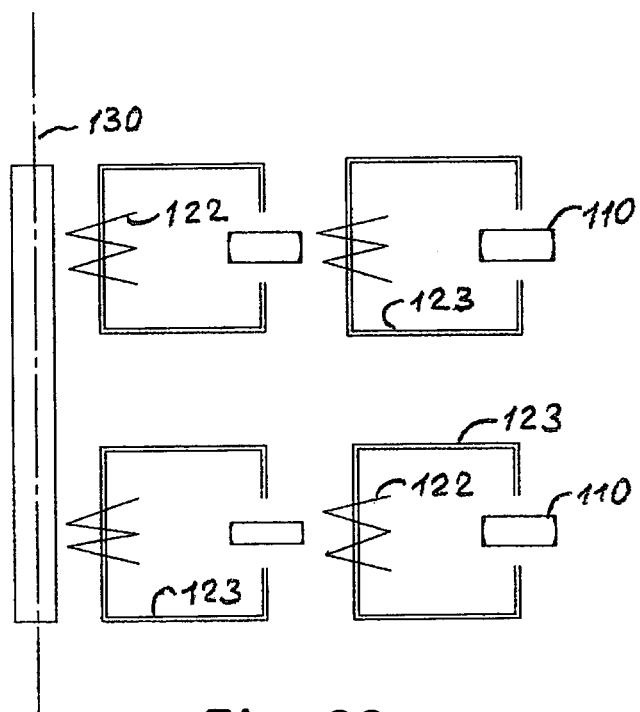
Figure 95:
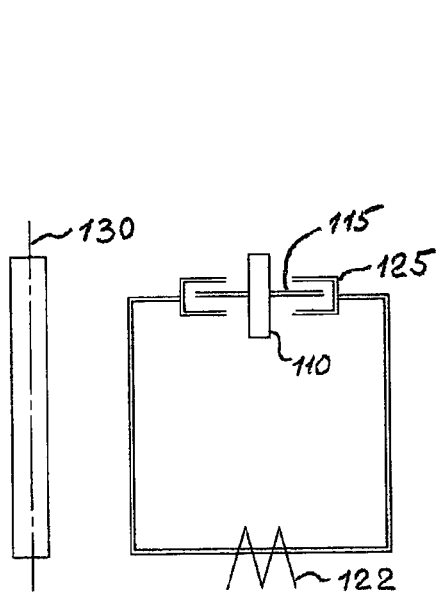
Figure 93:
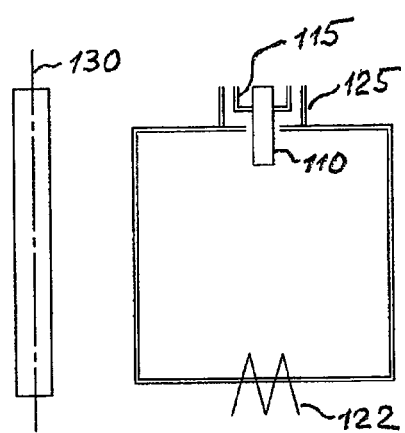
Figure 96:
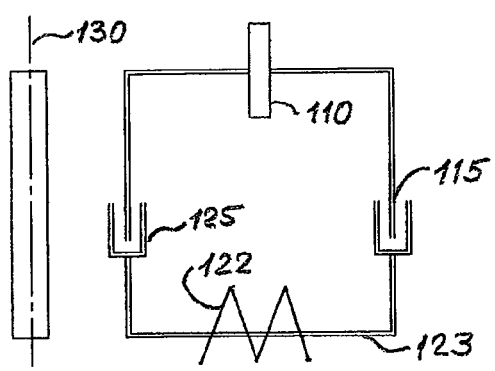
Figure 94:
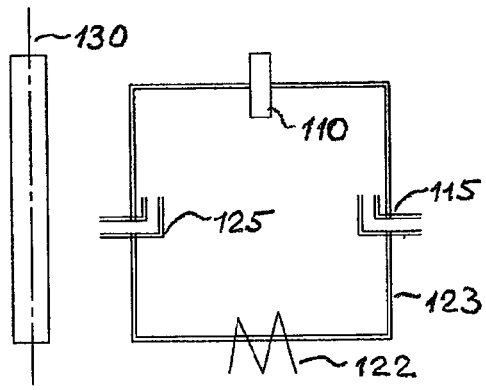
Figure 97:
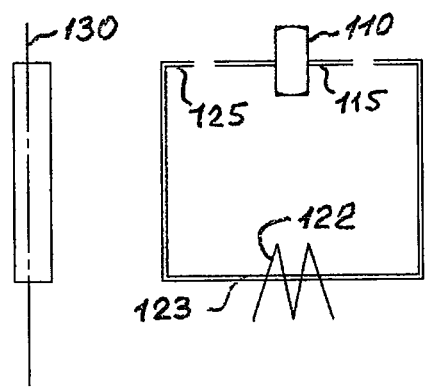
Figure 98:
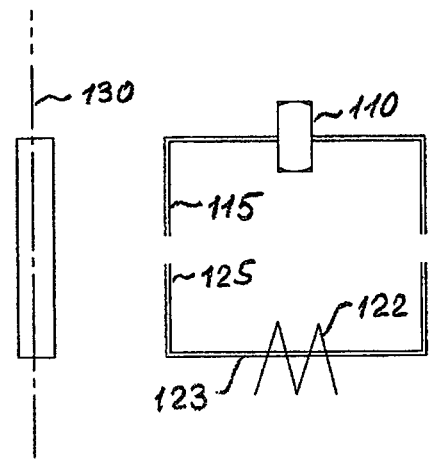
Figure 99:
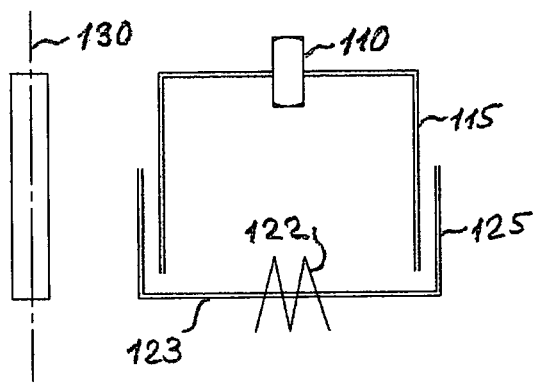
Figure 100:
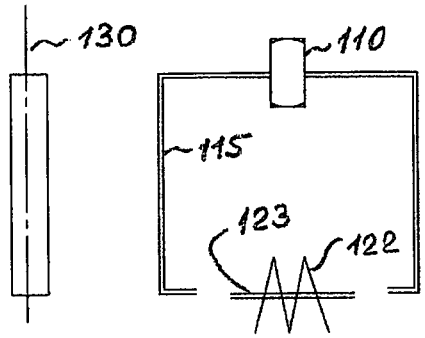
Figure 101:
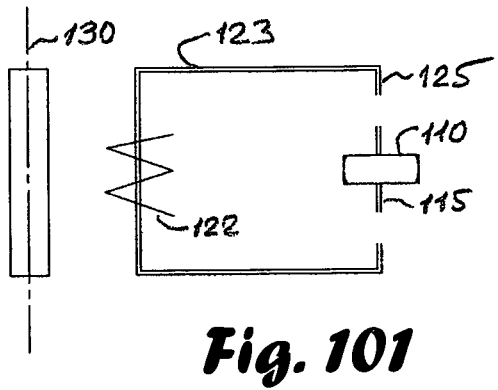
Figure 103:
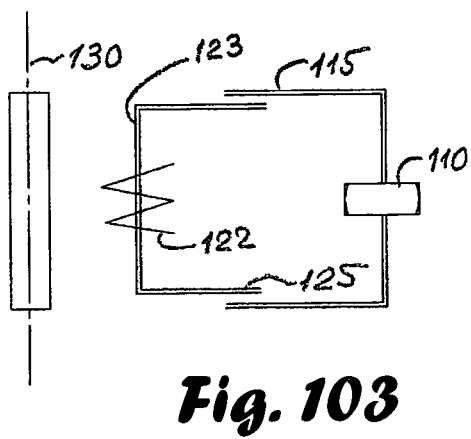
Figure 102:
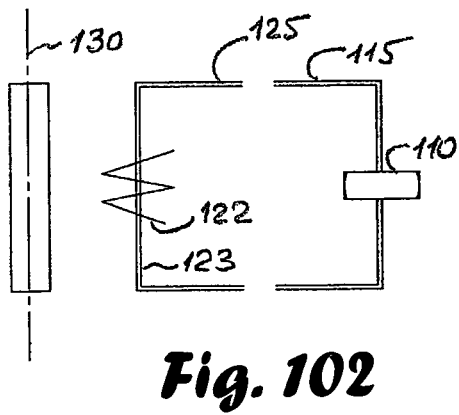

FIGS. 91 and 92 present schemes of the magnetic circuits in the electrical machine 100, wherein the aforesaid circuits are configured as layers and sections.

It should be understood that in FIGS. 45-104 in the magnetic circuits of the electrical machine 100, the magnetic sources 143 and 153 comprising the permanent magnets 110 and/or electromagnets 120 presented in FIGS. 9-11. FIGS. 45-92 in the magnetic circuits of the electrical machine 100, one or both poles 112 of the permanent magnet 110 face through gaps 160 the poles 125 of the electromagnets 120. The polar extensions 112, 115 и 125 are presented in FIGS. 28-33 и 95-104.

In accordance with the current invention, an electrical machine comprising a stator and a rotor rotatable relative to the stator with an air gap therebetween is disclosed. The stator is provided with a first plurality of sources of magnetic field which is equally spaced in a circumferential configuration over the stator. The rotor is provided with a second plurality of sources of magnetic field which is equally spaced in a circumferential configuration over the rotor. The magnetic sources of at least one plurality are electromagnets. Each electromagnet comprises at least one magnet coil resting on a magnet circuit. The circuit comprises at least one member made of a material selected from the group consisting of a magnetically isotropic material, a magnetically anisotropic material and any combination thereof.

The elements of magnetic conductor made of magnetically anisotropic material are configured so that the magnetic flux of magnetic sources goes along the direction of easy magnetization. The material is characterized electric resistance more than about $10^6$ Ohm·m, coercitive force less than about 100 A·m$^{-1}$, relative magnetic permeability more than about 3000 and saturation magnetic induction more than about 0.6 Tl at frequency lower than about 10000 Hz.

In accordance with one embodiment of the current invention, the circuit members made of a magnetically anisotropic material are configured so that a magnet flux created by the magnetic source is conducted along a direction of easy magnetization.

In accordance with another embodiment of the current invention, the magnetic sources of the first plurality are electromagnets spaced over the stator. The magnetic sources of the second plurality are permanent magnets heteropolarly spaced over the rotor.

In accordance with a further embodiment of the current invention, the magnetic sources of the first plurality are permanent magnets heteropolarly spaced over the stator. The magnetic sources of the second plurality are electric magnets spaced over the rotor provided with coils connected with a commutator by means of brushes.

In accordance with a further embodiment of the current invention, the magnetic sources of the first and second pluralities are electric magnets. The electric magnets of the second plurality are provided with coils connected with a commutator by means of brushes.

In accordance with a further embodiment of the current invention, at least one plurality of the magnetic field sources is magnetically independent between each other.

In accordance with a further embodiment of the current invention, an orientation of an axis of the coil of each electric magnet of the first plurality is selected from the group consisting of: an orientation sufficiently parallel to a rotation axis of the rotor, an orientation, sufficiently radially directed relative to the rotor, a circumferential orientation in a plane sufficiently perpendicular the rotation axis of the rotor and any combination thereof.

In accordance with a further embodiment of the current invention, magnetic axes of at least a part of the magnetic sources of the first and second pluralities are parallel each other.

In accordance with a further embodiment of the current invention, magnetic axes of at least a part of the magnetic sources of the first and second pluralities are perpendicular each other.

In accordance with a further embodiment of the current invention, the magnetic circuits of the magnetic sources of the second plurality are disposed inside the magnetic sources of the first plurality.

In accordance with a further embodiment of the current invention, the magnetic circuits of the magnetic sources of the first plurality are disposed inside the magnetic sources of the second plurality.

In accordance with a further embodiment of the current invention, a shape of the magnetic circuits of the electric magnet is selected from the group consisting of an I-like shape; a U-like shape; a T-like shape; a C-like shape, X-like shape and any combination thereof.

In accordance with a further embodiment of the current invention, the permanent magnets are provided with extension members magnetically connected thereto; the extension members are adapted for shunting a magnetic flux generated by the electromagnets. The extension members are adapted for preventing the flux from passing though the permanent magnets when the permanent magnets face to neighbouring electromagnets so that transverse size of the extension members is greater than a distance between neighbouring electric magnets. It is experimentally confirmed that, the proposed technical solution provides reduction of cogging torque ripple. Additionally, resistance of the permanent magnets to demagnetization is improved, due to affection of oppositely directed magnetic fields and temperature.

In accordance with a further embodiment of the current invention, the polar extensions are made from a material selected from the group consisting of a magnetically isotropic material, a magnetically anisotropic material and any combination thereof. The polar extensions are configured so that the magnetic flux of magnetic sources goes along the direction of easy magnetization. The material is characterized electric resistance more than about $10^6$ Ohm·m, coercitive force less than about 100 A·m$^{-1}$, relative magnetic permeability more than about 3000 and saturation magnetic induction more than about 0.6 Tl at frequency lower than about 10000 Hz.

In accordance with a further embodiment of the current invention the extension members are made of the magnetically anisotropic material are configured so that a magnet flux created by the magnetic source is conducted along a direction of easy magnetization.

In accordance with a further embodiment of the current invention, a shape of the magnetic circuits of the source of magnetic field comprising the permanent magnet is selected from the group consisting of an I-like shape; a U-like shape; a T-like shape; a C-like shape, X-like shape and any combination thereof. The proposed technical solutions provide reduction of losses due to hysteresis losses and Foucault currents.

In accordance with a further embodiment of the current invention, the magnetic source extension member of the second plurality is adapted for conducting a magnetic flux which passes through at least one surface of a core of the magnetic sources of the first plurality selected from butt surface and side surface.

In accordance with a further embodiment of the current invention, the magnetic source extension member of the first plurality is adapted for conducting a magnetic flux which passes through at least one surface of a core of the magnetic sources of the second plurality selected from butt surface and side surface. This technical solution provides reduction in magnetic saturation in the polar extensions 115 and 125 and leakage flux.

In accordance with a further embodiment of the current invention, the electrical machine is adapted for using as an electrical motor. The air gap is peripherally located relative to the rotation axis the rotor. This technical solution results in increase in a moment arm, a rotational torque, and a motor output.

In accordance with a further embodiment of the current invention, the electrical machine is adapted for using as an electrical motor of wheel drive of a vehicle. The second plurality of magnetic field sources of the rotor is mechanically connected to the wheel. The first plurality of magnetic field sources of the stator is mechanically connected to a vehicle body.

In accordance with a further embodiment of the current invention, the second plurality of magnetic field sources of the rotor is fastened to a wheel shaft. The first plurality of magnetic field sources of the stator is mechanically connected to a vehicle body.

In accordance with a further embodiment of the current invention, the electrical machine is adapted for using as an electrical generator. The air gap is proximately located relative to the rotation axis the rotor. This technical solution results in increase in a parasite rotational torque which spins down the generator.

In accordance with a further embodiment of the current invention, the first and second pluralities are layered so that layers pertaining to the first and second pluralities are interlayered therebetween.

In accordance with a further embodiment of the current invention, a number of magnetic sources is constant for each layer.

In accordance with a further embodiment of the current invention, a number of magnetic sources is variable for each layer.

In accordance with a further embodiment of the current invention, the number of magnetic sources increases with layer radius.

In accordance with a further embodiment of the current invention, the layers of circumferentially spaced magnetic sources of the first and second pluralities are angularly displaced relative to each other in a successive manner so that an angular displacement $\phi$ between each previous and subsequent layer is less than a polar pitch $\tau$.

In accordance with a further embodiment of the current invention, the spaced magnetic sources of second plurality of each previous layer are angularly shifted relative to spaced magnetic sources of second plurality of each subsequent layer for a predetermined angle which is less than polar pitch.

In accordance with a further embodiment of the current invention, the spaced magnetic sources of first plurality of each previous layer are angularly shifted relative to spaced magnetic sources of first plurality of each subsequent layer for a predetermined angle which is less than the polar pitch.

In accordance with a further embodiment of the current invention, the predetermined angle equals to the polar pitch divided by a number of said layers.

In accordance with a further embodiment of the current invention, the electrical machine has a sliced structure. The electrical machine comprises slices spaced along the shaft axis; each slice comprises magnetic sources of the first and second pluralities facing each other.

In accordance with a further embodiment of the current invention, the rotor comprises a plurality of projections carrying the magnetic field sources of the second plurality at both sides thereof.

In accordance with a further embodiment of the current invention, the stator comprises a plurality of projections carrying the magnetic field sources of the first plurality at both sides thereof.

In accordance with a further embodiment of the current invention, a number of magnetic sources spaced along each slice is constant.

In accordance with a further embodiment of the current invention, a number of magnetic sources spaced along each slice is variable.

In accordance with a further embodiment of the current invention, magnetic sources spaced along a succedent slice is angularly displaced relative to magnetic sources spaced along previous slice for an angular distance $\phi$ which is less than a polar pitch $\tau$.

In accordance with a further embodiment of the current invention, the spaced magnetic sources of first plurality of each previous section are angularly shifted relative to spaced magnetic sources of first plurality of each subsequent section for a predetermined angle which is less than the polar pitch.

In accordance with a further embodiment of the current invention, the spaced magnetic sources of second plurality of each previous section are angularly shifted relative to spaced magnetic sources of second plurality of each subsequent section for a predetermined angle which is less than the polar pitch.

In accordance with a further embodiment of the current invention, the predetermined angle equals to the polar pitch divided by a number of the sections.

It should be emphasized that angular displacement of the magnetic sources spread over the layers and/or sections through the aforesaid angle results in reduction of cogging torque ripple. The disclosed electrical motor arrangement provides easy starting independently on relative position of the stator and rotor.

In accordance with a further embodiment of the current invention, a method of use of an electrical machine is disclosed. The aforesaid method comprises the steps of
(c) providing a electrical machine comprising a stator and a rotor rotatable relative to said stator with an air gap therebetween; the stator provided with a first plurality of sources of magnetic field equally spaced in a circumferential configuration over the stator; the rotor provided with a second plurality of sources of magnetic field equally spaced in a circumferential configuration over the rotor; the magnetic sources of at least one plurality being electromagnets; each electromagnet comprising at least one magnet coil resting on a magnet conductor; and
(d) converting electrical energy into rotation of a machine shaft or inversely;

The conductor is provided with at least one member made of a material selected from the group consisting of a magnetically isotropic material, a magnetically anisotropic material and any combination thereof; said isotropic and anisotropic materials are characterized by an electric resistance greater than about $10^6$ Ohm·m, coercitive force less than about 100 A·m$^{-1}$; relative magnetic permeability greater than about 3000 and saturation magnetic induction greater than about 0.6 Tl at a frequency lower than about 10000 Hz.

The invention claimed is:

1. An electrical machine, comprising:
   a stator; and
   a rotor rotatable relative to said stator with a double air gap therebetween;
   said stator provided with a first plurality of magnetic sources equally spaced in a circumferential configuration over said stator;
   said rotor provided with a second plurality of magnetic sources equally spaced in a circumferential configuration over said rotor; said magnetic sources of at least one plurality being electromagnets, and of the other plurality being permanent magnets, each permanent magnet having its magnetic axis radially disposed;
   each electromagnet comprising at least one magnet coil resting on a magnet conductor and being magnetically independent of the other electromagnet, so that for each electromagnet the magnetic flux contour closes, via a corresponding permanent magnet of the rotor, within said electromagnet; and
   wherein each magnet conductor includes first and second portions that are radially disposed with respect to each other and a radial-extending bridging portion adjoining the first and second portions, the first and second portions defining a gap therebetween that is configured to receive both poles of the same permanent magnet, such that magnetic flux of each permanent magnet and its corresponding embracing electromagnet, is required to cross each of the double radial air gaps radially only once.

2. The electrical machine according to claim 1, wherein said magnetic sources of said first plurality are electromagnets spaced over the stator; said magnetic sources of said second plurality are permanent magnets heteropolarly spaced over said rotor.

3. The electrical machine according to claim 1, wherein said magnetic sources of said first plurality are permanent magnets heteropolarly spaced over said stator; said magnetic sources of said second plurality are electric magnets spaced over said rotor provided with coils connected with a commutator by means of brushes.

4. The electrical machine according to claim 1, wherein said magnetic sources of said first and second pluralities are electric magnets; said electric magnets of said second plurality are provided with coils connected with a commutator by means of brushes.

5. The electrical machine according to claim 1, wherein at least one plurality of said magnetic field-sources are magnetically independent between each other.

6. The electrical machine according to claim 1, wherein an orientation of an axis of said coil of each electromagnet of said first plurality is selected from the group consisting of: an orientation sufficiently parallel to a rotation axis of said rotor, an orientation, sufficiently radially directed relative to said rotor, a circumferential orientation in a plane sufficiently perpendicular said rotation axis of said rotor and any combination thereof.

7. The electrical machine according to claim 6, wherein magnetic axes of at least a part of said magnetic sources of said first and second pluralities are parallel each other.

8. The electrical machine according to claim 6, wherein magnetic axes of at least a part of said magnetic sources of said first and second pluralities are perpendicular each other.

9. The electrical machine according to claim 1, wherein the first and second portions and the radial-extending bridging portion collectively define a shape of said electromagnet that is a U-like shape or a C-like shape.

10. The electrical machine according to claim 1, wherein said permanent magnets are provided with magnetic source extension members magnetically connected thereto; wherein transverse size of said extension members is greater than a distance between neighboring electromagnets, whereby said extension members are configured for shunting a magnetic flux generated by said electromagnets; and for preventing said flux from passing though said permanent magnets when said permanent magnets face to neighbouring electromagnets.

11. The electrical machine according to claim 10, wherein said extension members comprise at least one member made of a material selected from a group consisting of said magnetically isotropic material, said magnetically anisotropic material and any combination thereof.

12. The electrical machine according to claim 10, wherein said extension members are made of said magnetically anisotropic material are configured so that a magnet flux created by said magnetic source is conducted along a direction of easy magnetization.

13. The electrical machine according to claim 1, wherein said magnetic source comprising said permanent magnet the shape of which is selected from the group consisting of an I-like shape; a U-like shape; a T-like shape; a C-like shape, X-like shape and any combination thereof.

14. The electrical machine according to claim 9, wherein said magnetic source of said second plurality has an extension member configured for conducting a magnetic flux which passes through at least one surface of a core of said magnetic sources of said first plurality selected from butt surface and side surface.

15. The electrical machine according to claim 9, wherein said magnetic source of said first plurality has an extension member adapted for conducting a magnetic flux which passes through at least one surface of a core of said magnetic sources of said second plurality selected from butt surface and side surface.

16. The electrical machine according to claim 1 are configured to be used as an electrical motor, wherein said air gap is peripherally located relative to a rotation axis of said rotor.

17. The electrical machine according to claim 1 are configured to be used as an electrical generator, wherein said air gap is proximately located relative to a rotation axis of said rotor.

18. The electrical machine according to claim 1, wherein said first and second pluralities are layered so that layers pertaining to said first and second pluralities are interlayered therebetween.

19. The electrical machine according to claim 18, wherein a number of magnetic sources is constant for each layer.

20. The electrical machine according to claim 18, wherein a number of magnetic sources is variable for each layer.

21. The electrical machine according to claim 18, wherein said number of magnetic sources increases with layer radius.

22. The electrical machine according to claim 18, wherein said layer of circumferentially spaced magnetic sources of said first and second pluralities are angularly displaced relative to each other in a successive manner so that an angular displacement between each previous and subsequent layer is less than a polar pitch.

23. The electrical machine according to claim 18, wherein said spaced magnetic sources of second plurality of each previous layer are angularly shifted relative to spaced magnetic sources of second plurality of each subsequent layer for a predetermined angle which is less than a polar pitch.

24. The electrical machine according to claim 18, wherein said spaced magnetic sources of first plurality of each previous layer are angularly shifted relative to spaced magnetic sources of first plurality of each subsequent layer for a predetermined angle which is less than a polar pitch.

25. The electrical machine according to claim 23, wherein said predetermined angle equals to said polar pitch divided by a number of said layers.

26. The electrical machine according to claim 1, having a sliced structure; electrical machine comprising slices spaced along said rotation axis; each slice comprises magnetic sources of said first and second pluralities facing each other.

27. The electrical machine according to claim 26, wherein said rotor comprises a plurality of projections carrying said magnetic field sources of said second plurality at both sides thereof.

28. The electrical machine according to claim 26, wherein said stator comprises a plurality of projections carrying said magnetic field sources of said first plurality at both sides thereof.

29. The electrical machine according to claim 26, wherein a number of magnetic sources spaced along each slice is constant.

30. The electrical machine according to claim 26, wherein a number of magnetic sources spaced along each slice is variable.

31. The electrical machine according to claim 26, wherein said magnetic sources of said first and second pluralities spaced along a subsequent slice is angularly displaced relative to magnetic sources spaced along previous slice for an angular distance Φ which is less than a polar pitch.

32. The electrical machine according to claim 31, wherein said magnetic sources of said second pluralities of each previous section are angularly displaced relative to each subsequent section so that an angular displacement between each previous and subsequent section is less than a polar pitch.

33. The electrical machine according to claim 31, wherein said spaced magnetic sources of first plurality of each previous section are angularly shifted relative to spaced magnetic sources of first plurality of each subsequent section for a predetermined angle which is less than said polar pitch.

34. The electrical machine according to claim 32, wherein said predetermined angle equals to said polar pitch divided by a number of said sections.

35. An electrical machine, comprising:

a stator; and a rotor rotatable relative to said stator with a double air gap therebetween;

said stator provided with a first plurality of magnetic sources equally spaced in a circumferential configuration over said stator;

said rotor provided with a second plurality of magnetic sources equally spaced in a circumferential configuration over said rotor; said magnetic sources of at least one plurality being electromagnets, and of the other plurality being permanent magnets, each permanent magnet having its magnetic axis radially disposed;

each electromagnet comprising at least one magnet coil resting on a magnet conductor and being magnetically independent of the other electromagnet, so that for each electromagnet the magnetic flux contour closes, via a corresponding permanent magnet of the rotor, within said electromagnet; and wherein each magnet conductor is a unitary body, configured for radially delimiting both poles of the same permanent magnet, such that magnetic flux can pass radially from one side of permanent magnet to an opposite side thereof through the unitary body of the magnet conductor itself.

* * * * *